US012639745B2

(12) United States Patent
Sahoo

(10) Patent No.: US 12,639,745 B2
(45) Date of Patent: May 26, 2026

(54) SYSTEMS AND METHODS FOR END USER VIEW B2B/B2C MODE

(71) Applicant: Ingram Micro Inc., Irvine, CA (US)

(72) Inventor: Sanjib Sahoo, Naperville, IL (US)

(73) Assignee: Ingram Micro Inc., Irvine, CA (US)

( * ) Notice: Subject to any disclaimer, the term of this patent is extended or adjusted under 35 U.S.C. 154(b) by 0 days.

(21) Appl. No.: 18/949,918

(22) Filed: Nov. 15, 2024

(65) Prior Publication Data

US 2025/0078145 A1 Mar. 6, 2025

Related U.S. Application Data

(63) Continuation-in-part of application No. 18/793,346, filed on Aug. 2, 2024, and a continuation-in-part of application No. 18/789,602, filed on Jul. 30, 2024, and a continuation-in-part of application No. 18/768,998, filed on Jul. 10, 2024, now Pat. No.
(Continued)

(51) Int. Cl.
*G06Q 30/0601* (2023.01)
(52) U.S. Cl.
CPC ................................ *G06Q 30/0641* (2013.01)
(58) Field of Classification Search
None
See application file for complete search history.

(56) References Cited

U.S. PATENT DOCUMENTS 5,237,495 A 8/1993 Morii
5,515,269 A 5/1996 Willis
(Continued)

FOREIGN PATENT DOCUMENTS

AU 2019101249 A4 11/2019
CN 101025799 A 8/2007
(Continued)

OTHER PUBLICATIONS

Basumallick C., "What is a Software Engine? Types, Applications, and Importance," Spiceworks, Oct. 7, 2022, 16 Pages, Retrieved from URL: https://www.spiceworks.com/tech/devops/articles/what-is-software-engine/.

(Continued)

*Primary Examiner* — Fateh M Obaid
(74) *Attorney, Agent, or Firm* — Ice Miller LLP

(57) ABSTRACT

Computerized systems and methods are described for enabling resellers to manage their end-user business within their own business environment on a distribution platform. The system includes a server configured to provide a Single Pane of Glass User Interface (SPoG UI) and a Real-Time Data Mesh (RTDM) module for ingesting and standardizing data from multiple sources. Advanced Analytics and Machine Learning (AAML) models analyze the data to provide predictive analytics, anomaly detection, and personalized recommendations. The SPoG UI presents real-time data and insights through interactive visualizations, enabling resellers to perform actions such as creating quotes, placing orders, and managing customer accounts. The system supports real-time negotiation of pricing, compliance management, and integration with external systems via APIs. The method and system generates a real-time, end-to-end view of both supply and end-user customer interactions.

20 Claims, 28 Drawing Sheets

Related U.S. Application Data 12,373,786, and a continuation-in-part of application No. 18/768,971, filed on Jul. 10, 2024, and a continuation-in-part of application No. 18/732,227, filed on Jun. 3, 2024, and a continuation-in-part of application No. 18/614,517, filed on Mar. 22, 2024, and a continuation-in-part of application No. 18/599,388, filed on Mar. 8, 2024, and a continuation-in-part of application No. 18/583,337, filed on Feb. 21, 2024, now Pat. No. 12,493,904, and a continuation-in-part of application No. 18/583,256, filed on Feb. 21, 2024, now Pat. No. 12,488,365, and a continuation-in-part of application No. 18/424,193, filed on Jan. 26, 2024, and a continuation-in-part of application No. 18/349, 836, filed on Jul. 10, 2023, and a continuation-in-part of application No. 18/341,714, filed on Jun. 26, 2023.

(56) References Cited

U.S. PATENT DOCUMENTS

| | | | |
|---|---|---|---|
| 5,870,717 | A | 2/1999 | Wiecha |
| 5,870,719 | A | 2/1999 | Maritzen et al. |
| 6,093,559 | A | 7/2000 | Bookbinder |
| 6,167,383 | A | 12/2000 | Henson |
| 6,272,472 | B1 * | 8/2001 | Danneels .......... G06Q 30/0641 705/14.51 |
| 6,385,543 | B1 | 5/2002 | Keiser |
| 7,024,459 | B2 | 4/2006 | McNamara |
| 7,039,604 | B1 | 5/2006 | Srinivasan |
| 7,065,499 | B1 | 6/2006 | Seth |
| 7,085,729 | B1 | 8/2006 | Kennedy |
| 7,130,853 | B2 | 10/2006 | Roller |
| 7,151,438 | B1 | 12/2006 | Hall |
| 7,188,075 | B1 | 3/2007 | Smirnov |
| 7,302,405 | B2 | 11/2007 | Hoskin |
| 7,471,990 | B2 | 12/2008 | Hotta |
| 7,548,612 | B2 * | 6/2009 | Weissman ................ H04Q 3/64 379/221.06 |
| 7,584,155 | B1 | 9/2009 | Carter, III |
| 7,698,170 | B1 | 4/2010 | Darr et al. |
| 7,720,720 | B1 | 5/2010 | Sharma et al. |
| 7,912,899 | B2 | 3/2011 | Beauchamp |
| 8,015,021 | B2 | 9/2011 | Boyle |
| 8,024,059 | B2 | 9/2011 | Kienzle |
| 8,024,217 | B2 | 9/2011 | Sadre |
| 8,069,435 | B1 | 11/2011 | Lai |
| 8,091,065 | B2 | 1/2012 | Mir et al. |
| 8,127,278 | B2 | 2/2012 | Bohle |
| 8,237,792 | B2 | 8/2012 | Uehara |
| 8,255,454 | B2 | 8/2012 | Broda |
| 8,301,522 | B2 | 10/2012 | Sun |
| 8,386,296 | B2 | 2/2013 | Hage |
| 8,386,299 | B2 | 2/2013 | Kumble |
| 8,443,036 | B2 | 5/2013 | Li et al. |
| 8,452,636 | B1 * | 5/2013 | Verastigui .......... G06Q 30/0201 705/7.29 |
| 8,589,444 | B2 | 11/2013 | Alcorn |
| 8,738,421 | B1 | 5/2014 | Ali |
| 8,781,882 | B1 | 7/2014 | Arboletti et al. |
| D718,324 | S | 11/2014 | Lee et al. |
| 8,914,544 | B2 | 12/2014 | Lalji et al. |
| 9,063,943 | B1 | 6/2015 | Smith |
| 9,317,807 | B1 | 4/2016 | Staddon |
| 9,390,089 | B2 | 7/2016 | Pitzo et al. |
| 9,652,530 | B1 | 5/2017 | Bendersky et al. |
| 9,727,906 | B1 | 8/2017 | Sarmento |
| 9,727,909 | B2 | 8/2017 | Mackay |
| 9,781,212 | B2 | 10/2017 | Briere |
| 9,792,597 | B1 | 10/2017 | Jen et al. |
| 9,805,412 | B1 | 10/2017 | Joseph |
| 9,958,291 | B1 | 5/2018 | Shunturov et al. |
| 9,959,551 | B1 | 5/2018 | Schermerhorn |
| 9,965,526 | B1 | 5/2018 | Chanda |
| 10,114,964 | B2 | 10/2018 | Ramesh |
| 10,134,003 | B1 | 11/2018 | Loyens |
| 10,146,751 | B1 | 12/2018 | Zhang |
| 10,277,672 | B2 | 4/2019 | Kung |
| D851,110 | S | 6/2019 | Bang et al. |
| 10,373,105 | B2 | 8/2019 | Feng et al. |
| 10,410,125 | B1 | 9/2019 | Finkelstein et al. |
| 10,417,728 | B1 * | 9/2019 | Yoggi .................... G06Q 50/60 |
| 10,489,845 | B2 | 11/2019 | Mullakkara Azhuvath et al. |
| 10,592,852 | B1 | 3/2020 | Karipides |
| D880,498 | S | 4/2020 | Shahidi et al. |
| 10,616,347 | B1 | 4/2020 | Van Oort et al. |
| 10,650,449 | B2 | 5/2020 | Courbage |
| 10,664,799 | B2 | 5/2020 | O'Brien et al. |
| 10,693,824 | B2 | 6/2020 | Silva |
| 10,699,329 | B2 | 6/2020 | Zakula |
| 10,718,632 | B1 | 7/2020 | Platt et al. |
| 10,757,154 | B1 | 8/2020 | Jacobs et al. |
| D898,759 | S | 10/2020 | Carrigan et al. |
| 10,839,029 | B2 | 11/2020 | Lawrence |
| 10,861,077 | B1 | 12/2020 | Liu |
| 10,891,105 | B1 | 1/2021 | Gates et al. |
| 10,893,036 | B2 | 1/2021 | Chang et al. |
| D912,694 | S | 3/2021 | Clarke et al. |
| D920,351 | S | 5/2021 | Zhang |
| 11,036,713 | B2 | 6/2021 | Inturi |
| 11,062,319 | B1 | 7/2021 | Hecht et al. |
| 11,074,643 | B1 | 7/2021 | Ellithorpe et al. |
| 11,080,239 | B2 | 8/2021 | Demoor |
| 11,113,770 | B1 | 9/2021 | Magoon et al. |
| 11,120,038 | B1 | 9/2021 | Ossher et al. |
| 11,151,608 | B1 | 10/2021 | Guo |
| D937,299 | S | 11/2021 | Varga et al. |
| 11,163,846 | B1 | 11/2021 | Kadayam et al. |
| 11,171,950 | B1 | 11/2021 | Zhuravlev et al. |
| 11,176,693 | B1 | 11/2021 | Gonzalez-Nicolas |
| D937,851 | S | 12/2021 | Patel et al. |
| 11,205,147 | B1 | 12/2021 | Anderson |
| 11,222,003 | B1 | 1/2022 | Jones et al. |
| 11,282,145 | B2 | 3/2022 | Ehrhart |
| 11,334,554 | B2 | 5/2022 | Andreakis |
| 11,343,142 | B1 | 5/2022 | Wang et al. |
| 11,379,219 | B2 | 7/2022 | Bhalla et al. |
| 11,386,456 | B1 | 7/2022 | Lightbody |
| 11,487,797 | B2 | 11/2022 | Shukla |
| 11,556,864 | B2 | 1/2023 | Yuan |
| 11,620,310 | B1 | 4/2023 | Akidau |
| 11,714,537 | B2 | 8/2023 | Lin et al. |
| 11,714,698 | B1 | 8/2023 | Curtis |
| 11,729,058 | B1 | 8/2023 | Agarwal et al. |
| 11,770,304 | B1 | 9/2023 | McNally |
| 11,798,058 | B2 | 10/2023 | Silverstein |
| 11,811,928 | B2 | 11/2023 | Shaaban et al. |
| 11,816,721 | B2 | 11/2023 | Ksyta |
| D1,009,077 | S | 12/2023 | Matlin et al. |
| D1,011,377 | S | 1/2024 | Ye |
| 11,860,613 | B2 | 1/2024 | Maury et al. |
| 11,886,965 | B1 | 1/2024 | Schwartz |
| D1,013,709 | S | 2/2024 | Callanta et al. |
| 11,892,817 | B2 | 2/2024 | Jacobs, II |
| 11,899,678 | B2 | 2/2024 | Kadel |
| 11,906,415 | B1 | 2/2024 | Galburt |
| 11,977,964 | B1 | 5/2024 | Winstead |
| 11,983,806 | B1 | 5/2024 | Ramesh et al. |
| 12,014,375 | B2 | 6/2024 | Brakob et al. |
| 12,077,313 | B1 | 9/2024 | Whaley et al. |
| D1,044,841 | S | 10/2024 | Shriniwar |
| 12,106,621 | B2 | 10/2024 | Boerger |
| 12,107,934 | B1 | 10/2024 | Bailey et al. |
| 12,142,091 | B2 | 11/2024 | Fang |
| 12,204,323 | B1 | 1/2025 | Malviya et al. |
| D1,061,571 | S | 2/2025 | Arora |
| 12,242,491 | B2 | 3/2025 | Li |
| 12,248,962 | B2 | 3/2025 | Qu |
| 12,271,491 | B2 | 4/2025 | Cameron et al. |
| D1,078,763 | S | 6/2025 | Arora |
| D1,080,661 | S | 6/2025 | Shope |
| 12,333,412 | B1 | 6/2025 | Mazed |
| 12,346,702 | B1 | 7/2025 | Burbine et al. |
| D1,091,608 | S | 9/2025 | Li et al. |

(56) References Cited

U.S. PATENT DOCUMENTS

| | | | |
|---|---|---|---|
| D1,101,762 S | 11/2025 | Gordonov et al. | |
| D1,102,464 S | 11/2025 | Varga et al. | |
| D1,110,338 S | 1/2026 | Goodrich et al. | |
| 12,537,998 B1 | 1/2026 | Perelli-Minetti et al. | |
| 2001/0042036 A1 | 11/2001 | Sanders | |
| 2002/0015480 A1* | 2/2002 | Daswani | H04L 65/1101 |
| | | | 707/E17.119 |
| 2002/0023046 A1 | 2/2002 | Callahan | |
| 2002/0042755 A1 | 4/2002 | Kumar | |
| 2002/0059201 A1 | 5/2002 | Work | |
| 2002/0062262 A1* | 5/2002 | Vasconi | G06Q 10/06 |
| | | | 705/26.25 |
| 2002/0087438 A1 | 7/2002 | Kunieda | |
| 2002/0091991 A1 | 7/2002 | Castro | |
| 2002/0120521 A1 | 8/2002 | Forth et al. | |
| 2002/0138358 A1 | 9/2002 | Scheer | |
| 2002/0165747 A1 | 11/2002 | Shriver | |
| 2002/0188514 A1 | 12/2002 | Kritt | |
| 2002/0198743 A1 | 12/2002 | Ariathurai | |
| 2003/0009397 A1* | 1/2003 | Whitenack | G06Q 30/06 |
| | | | 705/28 |
| 2003/0018546 A1 | 1/2003 | Ayala | |
| 2003/0028451 A1 | 2/2003 | Ananian | |
| 2003/0050819 A1 | 3/2003 | Koenigbauer | |
| 2003/0055700 A1 | 3/2003 | Hoffman et al. | |
| 2003/0070061 A1 | 4/2003 | Wong et al. | |
| 2003/0074248 A1 | 4/2003 | Braud et al. | |
| 2003/0078846 A1 | 4/2003 | Burk | |
| 2003/0084053 A1 | 5/2003 | Govrin | |
| 2003/0130863 A1 | 7/2003 | Grey et al. | |
| 2003/0144858 A1 | 7/2003 | Jain et al. | |
| 2003/0149608 A1* | 8/2003 | Kall | G06Q 10/0631 |
| | | | 700/99 |
| 2003/0163513 A1 | 8/2003 | Schaeck | |
| 2003/0171962 A1 | 9/2003 | Hirth et al. | |
| 2003/0173403 A1 | 9/2003 | Vogler | |
| 2003/0216950 A1 | 11/2003 | Chen | |
| 2003/0229550 A1 | 12/2003 | DiPrima | |
| 2003/0233264 A1 | 12/2003 | Jones | |
| 2004/0006516 A1 | 1/2004 | Anagol-Subbarao | |
| 2004/0019494 A1 | 1/2004 | Ridgeway | |
| 2004/0044565 A1 | 3/2004 | Kumar et al. | |
| 2004/0044582 A1 | 3/2004 | Chowdhary | |
| 2004/0054800 A1 | 3/2004 | Shah et al. | |
| 2004/0102981 A1 | 5/2004 | Schuh | |
| 2004/0111304 A1 | 6/2004 | Meka | |
| 2004/0111327 A1 | 6/2004 | Kidd | |
| 2004/0267674 A1 | 12/2004 | Feng et al. | |
| 2005/0049938 A1 | 3/2005 | Venkiteswaran | |
| 2005/0138642 A1 | 6/2005 | Breh | |
| 2005/0144082 A1 | 6/2005 | Coolman | |
| 2005/0163951 A1 | 7/2005 | Oles | |
| 2005/0262196 A1 | 11/2005 | Mueller | |
| 2005/0283410 A1 | 12/2005 | Gosko | |
| 2006/0100889 A1 | 5/2006 | Gosko | |
| 2006/0178918 A1 | 8/2006 | Mikurak | |
| 2006/0277086 A1 | 12/2006 | Ball | |
| 2006/0287932 A1 | 12/2006 | Wulteputte | |
| 2007/0033569 A1 | 2/2007 | Davidson et al. | |
| 2007/0050229 A1 | 3/2007 | Tatro et al. | |
| 2007/0192216 A1 | 8/2007 | Arnold et al. | |
| 2007/0203798 A1 | 8/2007 | Caballero et al. | |
| 2007/0233574 A1 | 10/2007 | Koegler | |
| 2007/0250545 A1 | 10/2007 | Surlaker | |
| 2008/0052205 A1 | 2/2008 | Dolley | |
| 2008/0082426 A1 | 4/2008 | Gokturk et al. | |
| 2008/0133569 A1 | 6/2008 | Vu et al. | |
| 2008/0228657 A1 | 9/2008 | Nabors | |
| 2008/0270256 A1 | 10/2008 | Caballero | |
| 2008/0319849 A1 | 12/2008 | Rapoport | |
| 2009/0063305 A1 | 3/2009 | Kreifels | |
| 2009/0063309 A1 | 3/2009 | Stephens | |
| 2009/0112727 A1 | 4/2009 | Chi | |
| 2009/0150663 A1 | 6/2009 | Perry | |
| 2009/0171816 A1 | 7/2009 | del Rosario | |
| 2009/0177714 A1 | 7/2009 | Obermeyer et al. | |
| 2010/0005085 A1 | 1/2010 | Millmore | |
| 2010/0145831 A1 | 6/2010 | Esfandiari et al. | |
| 2010/0161364 A1 | 6/2010 | Lokowandt | |
| 2010/0211550 A1 | 8/2010 | Daniello | |
| 2010/0250598 A1 | 9/2010 | Brauer et al. | |
| 2011/0029345 A1 | 2/2011 | Kienzle | |
| 2011/0156651 A1 | 6/2011 | Christensen | |
| 2011/0238484 A1 | 9/2011 | Toumayan | |
| 2011/0313882 A1 | 12/2011 | Barthes | |
| 2012/0036089 A1 | 2/2012 | Washington et al. | |
| 2012/0071999 A1 | 3/2012 | Trammell | |
| 2012/0084215 A1 | 4/2012 | Trier | |
| 2012/0209824 A1 | 8/2012 | Morimoto | |
| 2012/0226573 A1 | 9/2012 | Zakas et al. | |
| 2012/0226612 A1 | 9/2012 | Kurtis | |
| 2012/0232952 A1 | 9/2012 | Leonard | |
| 2012/0259675 A1 | 10/2012 | Roehrs | |
| 2012/0316935 A1 | 12/2012 | Feuerstin | |
| 2012/0323933 A1 | 12/2012 | He et al. | |
| 2012/0330918 A1 | 12/2012 | Carey | |
| 2012/0330973 A1 | 12/2012 | Ghuneim | |
| 2013/0013346 A1 | 1/2013 | O'Connor | |
| 2013/0041781 A1 | 2/2013 | Freydberg | |
| 2013/0066745 A1 | 3/2013 | De Heer et al. | |
| 2013/0091033 A1 | 4/2013 | Goodman | |
| 2013/0117080 A1 | 5/2013 | Madsen | |
| 2013/0159145 A1 | 6/2013 | Stevens | |
| 2013/0166403 A1 | 6/2013 | Jin et al. | |
| 2013/0191185 A1 | 7/2013 | Galvin | |
| 2013/0191481 A1 | 7/2013 | Prevost | |
| 2013/0246215 A1 | 9/2013 | Faith et al. | |
| 2013/0311271 A1 | 11/2013 | Rahul | |
| 2014/0025529 A1 | 1/2014 | Honeycutt et al. | |
| 2014/0052491 A1 | 2/2014 | Narayanan | |
| 2014/0052840 A1 | 2/2014 | Shukla | |
| 2014/0059144 A1 | 2/2014 | Lehmann | |
| 2014/0095265 A1 | 4/2014 | Steinman | |
| 2014/0095343 A1 | 4/2014 | Daniel | |
| 2014/0095488 A1 | 4/2014 | Malone et al. | |
| 2014/0122377 A1 | 5/2014 | Goodman | |
| 2014/0200965 A1 | 7/2014 | McConnell | |
| 2014/0222453 A1 | 8/2014 | Wills | |
| 2014/0222641 A1 | 8/2014 | Køber et al. | |
| 2014/0278804 A1 | 9/2014 | Lanxner | |
| 2014/0279254 A1 | 9/2014 | Hastman | |
| 2014/0322678 A1 | 10/2014 | Briancon et al. | |
| 2014/0324530 A1 | 10/2014 | Thompson | |
| 2014/0324549 A1 | 10/2014 | Chelap et al. | |
| 2014/0358723 A1 | 12/2014 | Ballaro et al. | |
| 2014/0379422 A1 | 12/2014 | Chapman et al. | |
| 2015/0032526 A1 | 1/2015 | Calman et al. | |
| 2015/0066570 A1 | 3/2015 | Hellen et al. | |
| 2015/0189014 A1 | 7/2015 | Grunenberger | |
| 2015/0203673 A1 | 7/2015 | Alric | |
| 2015/0281148 A1 | 10/2015 | Masterson | |
| 2015/0286645 A1 | 10/2015 | Sinha et al. | |
| 2015/0295766 A1 | 10/2015 | Dickey | |
| 2015/0302303 A1 | 10/2015 | Hakim | |
| 2016/0092474 A1* | 3/2016 | Stojanovic | G06F 16/211 |
| | | | 707/805 |
| 2016/0203319 A1 | 7/2016 | Coen | |
| 2016/0232624 A1 | 8/2016 | Goldberg et al. | |
| 2016/0239855 A1 | 8/2016 | Feng et al. | |
| 2016/0267102 A1 | 9/2016 | Klein | |
| 2016/0300144 A1 | 10/2016 | Santhanam | |
| 2016/0321344 A1 | 11/2016 | Aragone | |
| 2016/0335345 A1 | 11/2016 | Wang | |
| 2017/0006135 A1 | 1/2017 | Siebel et al. | |
| 2017/0017677 A1 | 1/2017 | Jolfaei | |
| 2017/0017969 A1 | 1/2017 | Noursalehi et al. | |
| 2017/0053558 A1 | 2/2017 | Zhou | |
| 2017/0060641 A1 | 3/2017 | Ramaswamy et al. | |
| 2017/0063750 A1 | 3/2017 | Vardhan | |
| 2017/0091327 A1 | 3/2017 | Bostic et al. | |
| 2017/0109675 A1 | 4/2017 | Hosny | |
| 2017/0134516 A1 | 5/2017 | Gutman et al. | |
| 2017/0193412 A1 | 7/2017 | Easton | |
| 2017/0193433 A1 | 7/2017 | Qin et al. | |

(56) References Cited

U.S. PATENT DOCUMENTS

| | | |
|---|---|---|
| 2017/0193527 A1 | 7/2017 | Backer et al. |
| 2017/0243465 A1 | 8/2017 | Bourne, Jr. |
| 2017/0255903 A1 | 9/2017 | Chowdhry et al. |
| 2017/0255987 A1 | 9/2017 | Bacharach |
| 2017/0278173 A1 | 9/2017 | Ettl |
| 2017/0286909 A1 | 10/2017 | Baynes |
| 2017/0287038 A1 | 10/2017 | Krasadakis |
| 2017/0364046 A1 | 12/2017 | Westrick, Jr. et al. |
| 2017/0364534 A1 | 12/2017 | Zhang |
| 2017/0364796 A1 | 12/2017 | Wiebe et al. |
| 2018/0005296 A1 | 1/2018 | Eades |
| 2018/0024986 A1 | 1/2018 | Singh et al. |
| 2018/0136992 A1 | 5/2018 | Solinger et al. |
| 2018/0143975 A1 | 5/2018 | Casal et al. |
| 2018/0165604 A1 | 6/2018 | Minkin |
| 2018/0210937 A1 | 7/2018 | Shi |
| 2018/0218322 A1 | 8/2018 | Bhargava et al. |
| 2018/0240158 A1 | 8/2018 | Peng |
| 2018/0285790 A1 | 10/2018 | Huynh |
| 2018/0288363 A1 | 10/2018 | Amengual Galdon |
| 2018/0293640 A1 | 10/2018 | Krappe |
| 2018/0308151 A1 | 10/2018 | Ainsworth, III |
| 2018/0314925 A1 | 11/2018 | Gauci |
| 2018/0315141 A1 | 11/2018 | Hunn |
| 2018/0332102 A1 | 11/2018 | Sheidaei |
| 2018/0336514 A1 | 11/2018 | Ranjanghatmuralidhar et al. |
| 2018/0337798 A1 | 11/2018 | Ilic |
| 2018/0343491 A1 | 11/2018 | Loheide et al. |
| 2018/0349793 A1 | 12/2018 | Triolo et al. |
| 2019/0034838 A1 | 1/2019 | Canis |
| 2019/0050688 A1 | 2/2019 | Iyer |
| 2019/0095992 A1 | 3/2019 | Soh |
| 2019/0102162 A1 | 4/2019 | Pitre |
| 2019/0102418 A1 | 4/2019 | Vasudevan |
| 2019/0102753 A1 | 4/2019 | Harrison et al. |
| 2019/0114689 A1 | 4/2019 | Wang |
| 2019/0147400 A1 | 5/2019 | Knight |
| 2019/0149725 A1 | 5/2019 | Adato et al. |
| 2019/0163985 A1 | 5/2019 | Wang |
| 2019/0192074 A1 | 6/2019 | Smets |
| 2019/0215424 A1 | 7/2019 | Adato et al. |
| 2019/0220914 A1 | 7/2019 | Flannery et al. |
| 2019/0243836 A1 | 8/2019 | Nanda et al. |
| 2019/0251457 A1 | 8/2019 | Byrnes et al. |
| 2019/0286759 A1 | 9/2019 | Wilkins |
| 2019/0303487 A1 | 10/2019 | Mehta |
| 2019/0303579 A1 | 10/2019 | Reddy |
| 2020/0026552 A1 | 1/2020 | Zhang |
| 2020/0045519 A1 | 2/2020 | Raleigh et al. |
| 2020/0073642 A1 | 3/2020 | Koryakin |
| 2020/0117757 A1 | 4/2020 | Yanamandra |
| 2020/0134683 A1 | 4/2020 | Boren |
| 2020/0143313 A1 | 5/2020 | Ohlsson et al. |
| 2020/0184416 A1 | 6/2020 | Javaheri |
| 2020/0210947 A1 | 7/2020 | Devarakonda |
| 2020/0219159 A1 | 7/2020 | Choudhary |
| 2020/0235941 A1 | 7/2020 | Nguyen et al. |
| 2020/0265512 A1 | 8/2020 | James |
| 2020/0272981 A1 | 8/2020 | Kirkegaard |
| 2020/0279200 A1 | 9/2020 | Makhija et al. |
| 2020/0320095 A1 | 10/2020 | Haase et al. |
| 2020/0327252 A1 | 10/2020 | McFall et al. |
| 2020/0334608 A1 | 10/2020 | Ramanathan |
| 2020/0349624 A1 | 11/2020 | Ramanathan |
| 2020/0394398 A1 | 12/2020 | Pamarthi et al. |
| 2020/0394455 A1 | 12/2020 | Lee et al. |
| 2021/0012329 A1 | 1/2021 | Gandhi |
| 2021/0012358 A1 | 1/2021 | Wical |
| 2021/0036889 A1 | 2/2021 | Jain et al. |
| 2021/0065134 A1 | 3/2021 | Chhabra |
| 2021/0065294 A1 | 3/2021 | Trevathan et al. |
| 2021/0117384 A1 | 4/2021 | Leite Pinheiro De Paiva |
| 2021/0125144 A1 | 4/2021 | Liu |
| 2021/0133788 A1 | 5/2021 | Jacobs |
| 2021/0133850 A1 | 5/2021 | Ayush |
| 2021/0142385 A1 | 5/2021 | Alahmady |
| 2021/0144250 A1 | 5/2021 | Mahar et al. |
| 2021/0158259 A1 | 5/2021 | Evans et al. |
| 2021/0166179 A1 | 6/2021 | Pande |
| 2021/0166251 A1 | 6/2021 | Mehmanpazir et al. |
| 2021/0182730 A1 | 6/2021 | Clarke |
| 2021/0182746 A1 | 6/2021 | Muthukrishnan |
| 2021/0201346 A1 | 7/2021 | Dejardins |
| 2021/0226573 A1 | 7/2021 | George |
| 2021/0233129 A1 | 7/2021 | Bikumala |
| 2021/0241299 A1 | 8/2021 | Ramini et al. |
| 2021/0241301 A1 | 8/2021 | Christensen et al. |
| 2021/0241337 A1 | 8/2021 | Bikumala |
| 2021/0248151 A1 | 8/2021 | Kadel et al. |
| 2021/0269244 A1 | 9/2021 | Ahmann |
| 2021/0287275 A1 | 9/2021 | Karlan-Mason |
| 2021/0303420 A1 | 9/2021 | Willoughby |
| 2021/0334871 A1 | 10/2021 | Quinn et al. |
| 2021/0350429 A1 | 11/2021 | Gangadarappa |
| 2021/0350432 A1 | 11/2021 | Kushner |
| 2021/0357959 A1 | 11/2021 | Cella et al. |
| 2021/0377203 A1 | 12/2021 | Hou |
| 2021/0378779 A1 | 12/2021 | Lenzenhuber |
| 2021/0383316 A1 | 12/2021 | Mimassi |
| 2021/0397989 A1 | 12/2021 | Mayers |
| 2022/0019204 A1 | 1/2022 | Maury |
| 2022/0051183 A1 | 2/2022 | Franzo |
| 2022/0058723 A1 | 2/2022 | Swett |
| 2022/0067085 A1 | 3/2022 | Nihas et al. |
| 2022/0114509 A1 | 4/2022 | Pinheiro et al. |
| 2022/0116470 A1 | 4/2022 | Sethi |
| 2022/0122134 A1 | 4/2022 | Hoffman et al. |
| 2022/0122142 A1 | 4/2022 | Cao |
| 2022/0129477 A1 | 4/2022 | Son |
| 2022/0129803 A1 | 4/2022 | Bikumala et al. |
| 2022/0156275 A1 | 5/2022 | Burke |
| 2022/0197246 A1 | 6/2022 | Cella et al. |
| 2022/0198431 A1 | 6/2022 | Foster, Jr. |
| 2022/0245008 A1* | 8/2022 | Deljavan Farshi ..... G06F 9/542 |
| 2022/0245115 A1 | 8/2022 | Kulkarni et al. |
| 2022/0245727 A1 | 8/2022 | Roll |
| 2022/0253775 A1 | 8/2022 | Burkhead |
| 2022/0270160 A1 | 8/2022 | Sadhankar |
| 2022/0284459 A1 | 9/2022 | Kwok |
| 2022/0292160 A1 | 9/2022 | Mehta |
| 2022/0309436 A1 | 9/2022 | Evans |
| 2022/0319504 A1 | 10/2022 | Owhadi |
| 2022/0327119 A1 | 10/2022 | Gasper |
| 2022/0327597 A1 | 10/2022 | Griesmer |
| 2022/0329595 A1 | 10/2022 | Wynter |
| 2022/0357971 A1 | 11/2022 | Feliciano |
| 2022/0373346 A1 | 11/2022 | Abhishek |
| 2022/0374737 A1 | 11/2022 | Dhara |
| 2022/0383400 A1 | 12/2022 | Wade et al. |
| 2022/0405775 A1 | 12/2022 | Siebel et al. |
| 2023/0005330 A1* | 1/2023 | Hartwig .............. G07F 17/3234 |
| 2023/0012041 A1 | 1/2023 | Holloran |
| 2023/0012650 A1 | 1/2023 | Aggarwal |
| 2023/0030234 A1 | 2/2023 | Fichuk et al. |
| 2023/0030262 A1 | 2/2023 | Springer |
| 2023/0032447 A1 | 2/2023 | Mackie |
| 2023/0051934 A1 | 2/2023 | Devan et al. |
| 2023/0055677 A1 | 2/2023 | Dhelaria |
| 2023/0059565 A1 | 2/2023 | Karthik |
| 2023/0064747 A1 | 3/2023 | Inoue Sardenberg |
| 2023/0067777 A1 | 3/2023 | Hadar |
| 2023/0074782 A1 | 3/2023 | Tendulkar et al. |
| 2023/0075794 A1 | 3/2023 | Muttreja |
| 2023/0091441 A1 | 3/2023 | Go et al. |
| 2023/0102048 A1 | 3/2023 | Cella |
| 2023/0113006 A1 | 4/2023 | Liu |
| 2023/0125533 A1 | 4/2023 | Estes |
| 2023/0162258 A1 | 5/2023 | Das Gupta |
| 2023/0185878 A1 | 6/2023 | Makhija et al. |
| 2023/0206251 A1 | 6/2023 | Acharya et al. |
| 2023/0206265 A1 | 6/2023 | Girija |
| 2023/0214773 A1 | 7/2023 | Ha |
| 2023/0214854 A1 | 7/2023 | Colombier et al. |
| 2023/0214864 A1 | 7/2023 | Colombier et al. |

(56) References Cited

U.S. PATENT DOCUMENTS

| | | |
|---|---|---|
| 2023/0222536 A1 | 7/2023 | Hoang et al. |
| 2023/0259521 A1 | 8/2023 | Alfons |
| 2023/0273915 A1 | 8/2023 | Dev |
| 2023/0316377 A1 | 10/2023 | Harrison |
| 2023/0325900 A1 | 10/2023 | Edwards |
| 2023/0342344 A1 | 10/2023 | Brown |
| 2023/0350963 A1 | 11/2023 | Saad |
| 2023/0359161 A1 | 11/2023 | O'Rourke |
| 2023/0367696 A1 | 11/2023 | Liu et al. |
| 2023/0385288 A1 | 11/2023 | Kulkarni et al. |
| 2023/0394426 A1 | 12/2023 | Bauders |
| 2023/0410095 A1 | 12/2023 | Cella |
| 2023/0418980 A1 | 12/2023 | Abrougui et al. |
| 2023/0419387 A1 | 12/2023 | Ballaro et al. |
| 2024/0004860 A1 | 1/2024 | Soundararajan et al. |
| 2024/0022492 A1 | 1/2024 | Nanda |
| 2024/0037115 A1 | 2/2024 | Simanjuntak et al. |
| 2024/0062099 A1 | 2/2024 | Crockett |
| 2024/0070750 A1 | 2/2024 | Smith, Jr. |
| 2024/0095788 A1 | 3/2024 | Vaishnav |
| 2024/0095789 A1 | 3/2024 | Vaishnav |
| 2024/0106828 A1 | 3/2024 | Jain et al. |
| 2024/0107122 A1 | 3/2024 | Akhoury |
| 2024/0118702 A1 | 4/2024 | Cella |
| 2024/0144170 A1 | 5/2024 | Kim et al. |
| 2024/0169410 A1 | 5/2024 | Zhao |
| 2024/0184650 A1 | 6/2024 | O'Kelley et al. |
| 2024/0211828 A1 | 6/2024 | Iwamoto |
| 2024/0232941 A1 | 7/2024 | Vajge |
| 2024/0248919 A1 | 7/2024 | Kumar |
| 2024/0266010 A1 | 8/2024 | Adhikari |
| 2024/0281419 A1 | 8/2024 | Alfaras |
| 2024/0281423 A1 | 8/2024 | Perrin |
| 2024/0311853 A1 | 9/2024 | Rendahl et al. |
| 2024/0330983 A1 | 10/2024 | Isaacs |
| 2024/0354423 A1 | 10/2024 | Mardikar |
| 2024/0354686 A1 | 10/2024 | Hegde |
| 2024/0354867 A1 | 10/2024 | Young |
| 2024/0362576 A1 | 10/2024 | Rajagopal |
| 2024/0370902 A1 | 11/2024 | Miglani |
| 2024/0372856 A1 | 11/2024 | Black et al. |
| 2024/0419678 A1 | 12/2024 | Sharma |
| 2024/0420012 A1 | 12/2024 | Austin |
| 2024/0427789 A1 | 12/2024 | Sahoo |
| 2024/0428166 A1 | 12/2024 | Sahoo |
| 2024/0428318 A1 | 12/2024 | Sahoo |
| 2025/0005479 A1 | 1/2025 | Sanjib |
| 2025/0036648 A1 | 1/2025 | Hunter |
| 2025/0047663 A1 | 2/2025 | Brennan et al. |
| 2025/0062949 A1 | 2/2025 | Nimmagadda |
| 2025/0077601 A1 | 3/2025 | Liu |
| 2025/0139656 A1 | 5/2025 | Durvasula |
| 2025/0217114 A1 | 7/2025 | Roper, Jr. et al. |
| 2025/0259032 A1 | 8/2025 | Crabtree et al. |
| 2025/0301489 A1 | 9/2025 | Gabizon et al. |
| 2025/0355656 A1 | 11/2025 | Khalil et al. |

FOREIGN PATENT DOCUMENTS

| | | |
|---|---|---|
| CN | 108122157 A | 6/2018 |
| CN | 110570245 A | 12/2019 |
| CN | 118536118 A | 8/2024 |
| JP | 2001005863 A | 1/2001 |
| JP | 2002108668 A | 4/2002 |
| JP | 2004538542 A | 12/2004 |
| JP | 2020514860 A | 5/2020 |
| JP | 2020514860 A5 | 2/2021 |
| JP | 2021532444 A | 11/2021 |
| JP | 2022175317 A | 11/2022 |
| JP | 2023508188 A | 3/2023 |
| KR | 20070057806 A | 6/2007 |
| WO | 9425161 A1 | 11/1994 |
| WO | 0233581 A2 | 4/2002 |
| WO | 02063530 A2 | 8/2002 |
| WO | 2004104739 A2 | 12/2004 |
| WO | 2006026673 A2 | 3/2006 |
| WO | 2010107730 A1 | 9/2010 |
| WO | 2010151368 A2 | 12/2010 |
| WO | 2012019097 A2 | 2/2012 |
| WO | 2013181736 A1 | 12/2013 |
| WO | 2014060050 A1 | 4/2014 |
| WO | 2016013972 A1 | 1/2016 |
| WO | 2016118979 A2 | 7/2016 |
| WO | 2018116252 A1 | 6/2018 |
| WO | 2018231850 A1 | 12/2018 |
| WO | 2019157399 A1 | 8/2019 |
| WO | 2021171250 A1 | 9/2021 |
| WO | 2021262530 A1 | 12/2021 |
| WO | 2022008567 A1 | 1/2022 |
| WO | 2022132040 A1 | 6/2022 |
| WO | 2023026313 A1 | 3/2023 |
| WO | 2023174562 A1 | 9/2023 |
| WO | 2024073505 A1 | 4/2024 |
| WO | 2024226421 A1 | 10/2024 |
| WO | 2024233674 A2 | 11/2024 |

OTHER PUBLICATIONS

Biswas S., et al., "A Proposed Architecture for Big Data Driven Supply Chain Analytics," ICFAI University Press (IUP) Journal of Supply Chain Management, 2016, vol. 13, No. 3, pp. 7-34 (24 Pages), Retrieved from URL: https://arxiv.org/abs/1705.04958.

European Search Report for European Application No. 24186933, dated Nov. 25, 2024, 09 Pages.

Extended European Search Report for European Application No. 24184819.1, dated Nov. 27, 2024, 10 Pages.

Extended European Search Report for European Application No. 24187943.6, dated Nov. 19, 2024, 8 Pages.

Extended European Search Report for European Application No. 24187967.5, dated Nov. 25, 2024, 8 Pages.

Holzer D., et al., "Developing a Framework for Linking Design Intelligence from Multiple Professions in the AEC Industry," CAAD Futures, 2007, pp. 303-316, Retrieved from URL: ttps://link.springer.com/content/pdf/10.1007/978-1-4020-6528-6_23.pdf.

Machado I.A., et al., "Data Mesh: Concepts and Principles of a Paradigm Shift in Data Architectures," Procedia Computer Science, Amsterdam, NL, Jan. 10, 2022, vol. 196, pp. 263-271, DOI: 10.1016/j.procs.2021.12.013, ISSN: 1877-0509, XP093050267, Retrieved from URL: https://www.sciencedirect.com/science/article/pii/S1877050921022365.

Office Action for Japanese Application No. 2024-101794, dated Sep. 13, 2024, 21 Pages.

Office Action for Japanese Application No. 2024-108629, dated Oct. 29, 2024, 10 Pages.

Office Action for Japanese Application No. 2024-112073, dated Oct. 15, 2024, 9 Pages.

PCMAG: "Engine," Definition, Dec. 1, 2020, 1 Page, Snapshot via Archive.org, Retrieved from URL: https://www.pcemag.com/encyclopedia/term/engine.

Suzumura K., "Latest IT Trends by Field: Inter-System Integration: The Key Lies in the Use of Open Technology, Performance and Reliability," Nikkei Computer, Japan, Nikkei BP, Sep. 23, 2002, No. 557, pp. 28-29 (6 Pages), ISSN 0285-4619.

Techopedia: "Engine," Definition, Oct. 19, 2012, 12 Pages, Retrieved from URL: https://www.techopedia.com/definition/24155/engine.

Wikipedia: "Data Mesh," May 25, 2023, 3 Pages, XP093199672, Retrieved from URL: https://en.Wikipedia.org/w/index.php?title=Data_mesh&oldid=1157039904.

Zhamak Dehghani, "How to move beyond a monolithic data lake to a distributed data mesh", published by martinfowler.com on May 20, 2019 (Year: 2019).

Agarwal, Saloni et al., "Improving Bundles Recommendation Coverage in Sparse Product Graphs," WWW 22 Companion, 2022, all pgs.

Carlos, Rafael et al., "Framework for Continuous Agile Technology Roadmap Updating," Emeraldinsight. com, 2017, all pages.

Decision of Refusal issued in Japanese Patent Application No. 2024-108629, dated Apr. 11, 2025, 5 pgs.

(56) References Cited

OTHER PUBLICATIONS

English Translation of Decision of Refusal issued in Japanese Patent Application No. 2024-108629, dated Apr. 11, 2025, 7 pgs.
Office Action issued in Japanese Patent Application No. 2024-101794, dated May 16, 2025, 6 pgs.
English Translation of Office Action issued in Japanese Patent Application No. 2024-101794, dated May 16, 2025, 5 pgs.
European Search Report issued in European Patent Application No. 25163362.4 , dated May 2, 2025, 10 pgs.
European Search Report issued in European Patent Application No. EP25156175.9, dated Mar. 13, 2025.
Examination Report issued in Australian Patent Application No. 2024204660, dated Apr. 16, 2025, 4 pgs.
Examination Report issued in Australian Patent Application No. 20244204340, dated 2025-02-28, 5 pgs.
Examination Report issued in Australian Patent Application No. 2025200528, dated 2025-03-06, 5 pgs.
Examination Report issued in Australian Patent Application No. 2025200535, dated 2025-04-07, 7 pgs.
Examination Report issued in Australian Patent Application No. 2025200793, dated 2025-04-01, 9 pgs.
Examination Report issued in Australian Patent Application No. 2025201639, dated Apr. 30, 2025, 6 pgs.
Examination Report issued in Australian Patent Application No. 2025201740, dated Mar. 18, 2025, 5 pgs.
Kohut, Yurii et al., "Recommendation System for Purchasing Goods based on the Decision Tree Algorithm," Advances in Cyber-Physical Systems, vol. 6, No. 2, 2021, 7 pgs.
Palo, Joonas, "Product Roadmapping Tool and Process Unification as part of a Global End-to-End Repeatability Operating Model Development," Haaga-helia, 2023, all pgs.
Sutton, Rowan et al., "A Reinforcement Learning and Synthetic Data Approach to Mobile Notification Management," ACM, 2019, all pgs.
Sun, Zhu et al., "Revisiting Bundle Recommendation: Datasets, Tasks, Challenges and Opportunities for Intent Aware Product Bundling," Association for Computing Machinery, Spain, SIGIR 2022, 12 pgs.
International Search Report and Written Opinion for International Application No. PCT/US2024/037624, dated Oct. 28, 2024, 9 Pages.
Johnson, Renee, "Everything you Need to Know About Global Distribution System", Mar. 2, 2022, itilite. com, 6 pages (Year: 2022).
Channelpro Network: "Ingram Micro's New Xvantage Mobile Application is Simplifying How the IT Channel Works," Ingram Macro Inc, Dec. 20, 2023, 2 Page, [Retrieved on Sep. 18, 2025] Retrieved from URL: https://www.channelpronetwork.com/2023/12/20/ingram-micros-new-xvantage-mobile-application-is-simplifying-how-the-it-channel- works/.

Costa C., "Data Mesh: Concepts and Principles of a Paradigm Shift in Data Architectures," published by ScienceDirect in 2022 (Year: 2022), 9 pages.
Dehghani Z., "Data Mesh Principles and Logical Architecture", published by martinfowler.com on May 20, 2019 (Year: 2019), 9 pages.
Dey D., et al., "Appraise: A Governance Framework for Innovation with Artificial Intelligence Systems," ACM, 2024, 13 Pages.
Extended European Search Report for European Application No. 25154210.6, dated Jun. 11, 2025, 09 Pages.
Extended European Search Report for European Application No. 25154230.4, dated Jul. 10, 2025, 9 Pages.
Extended European Search Report for European Application No. 25161920.1, dated Jul. 24, 2025, 15 Pages.
Gately E., "Ingram Micro Debuts Xvantage Mobile App," Channel Futures, Dec. 20, 2023, 1 Page, [Retrieved on Sep. 2, 2025] Retrieved from URL: https://www.channelfutures.com/channel-sales-marketing/ingram-micro-debuts-xvantage-mobile-app.
He Z., et al., "Enhancing Web Accessibility: Automated Detection of Issues with Generative AI," Proceedings of the ACM on Software Engineering, Jul. 2025, vol. 2, No. FSE, Article FSE101, pp. 1-24.
Ingram Industries Inc: "Ingram Micro," Registered Trademark U.S. Appl. No. 86/365,487, filed May 30, 2017, 3 Pages, [Retrieved on Aug. 13, 2025] Retrieved from URL: https://tsdr.USPTO.gov/#caseNumber=86365487&caseSearchType=US_APPLICATION&caseType=DEFAULT&searchType=statusSearch.
Kundu S., et al., "Detecting Functional Safety Violations in Online AI Accelerators," IEEE, 2022, pp. 1-4.
Mailparser, "Enter Mailparser: Your Solution for Data Entry," 2024, 7 Pages, [Retrieved on Dec. 2, 2025] Retrieved from URL: https://mailparser.io/email-to-erp.
Robert J.E., "Applying Generative AI to Detect Document Incompleteness, Inconsistencies, and Discrepancies," Acm, Fse Companion'25, Jun. 23-28, 2025, pp. 1381-1385.
Sryheni S., "Introduction to Depth First Search Algorithm (DFS)," Baeldung.com, Mar. 24, 2023, 6 Pages.
Wolfart D., et al., "Modernizing Legacy Systems with Microservices: A Roadmap," Association for Computing Machinery, Jun. 21-23, 2021, 11 Pages.
YouTube.COM: "Welcome to Xvantage Mobile-Your Anywhere, Anytime App," Ingram Micro USA, Oct. 24, 2023, 3 Pages, [Retrieved on Aug. 13, 2025] Retrieved from URL: https://www.youtube.com/watchv=QyZOeBLJODM.
Pfefferle, J.," Moving from data lakes to data mesh", Oct. 18, 2022, medium.com, 22 pages (Year: 2022).
European Search Report for European Application No. 25201138.2, dated Jan. 7, 2026, 12 Pages.
Rahm E., et al., "A survey of approaches to automatic schema matching," the VLDB Journal, vol. 10, No. 4, 2001, pp. 334-350.
Sahay T., et al., "Schema Matching using Machine Learning," 2019, 07 Pages, arXiv: 1911.1154 [5].

* cited by examiner

800

900

1000

Figure 12I:
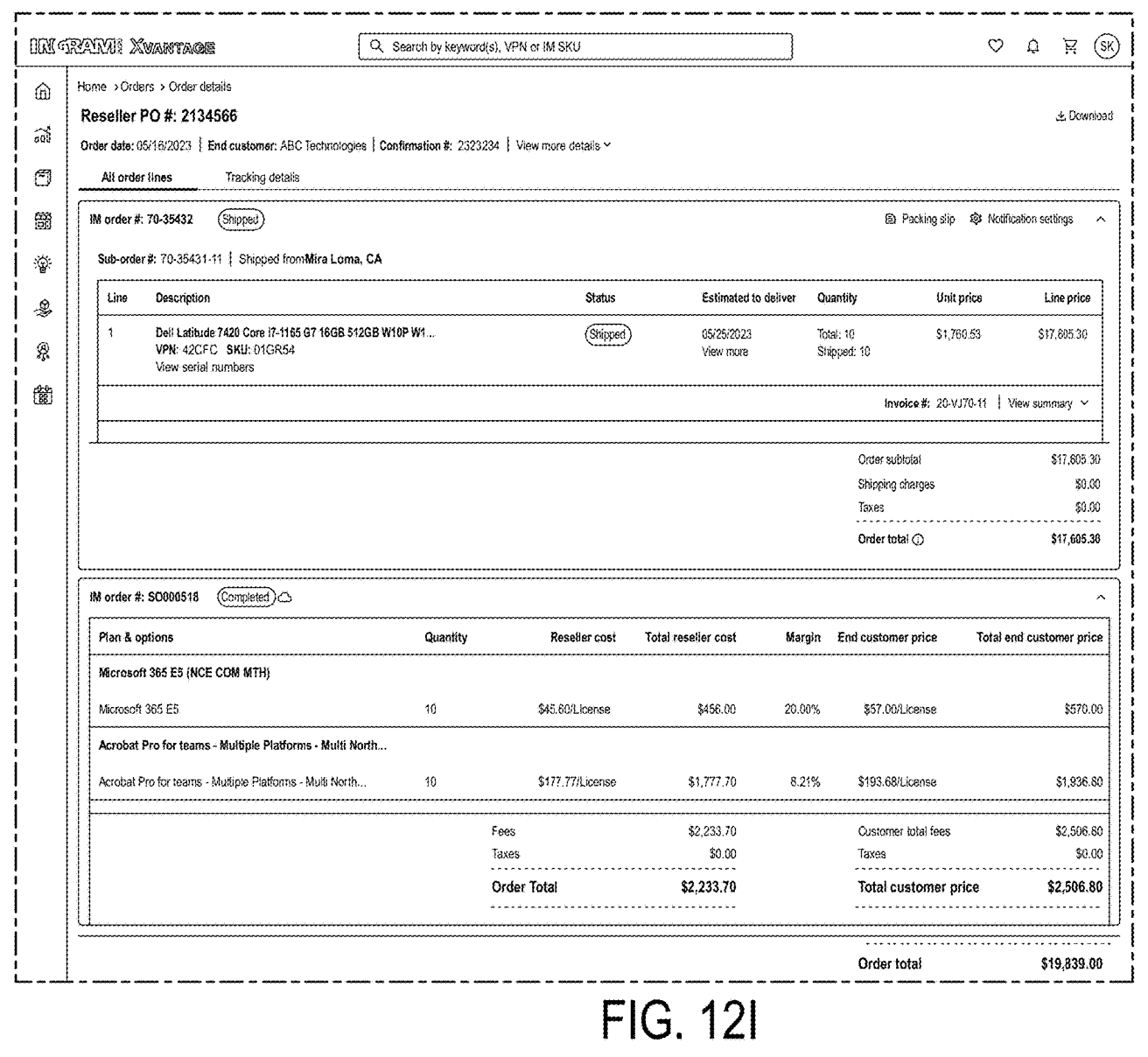

IM GRAM XVANTAGE

Q Search by keyword(s), VPN or IM SKU

Home > Orders > Order details

Reseller PO #: 2134566

Order date: 05/16/2023 | End customer: ABC Technologies | Confirmation #: 2323234 | View more details ∨

Alt order lines | Tracking details

IM order #: 70-35432  (Shipped)

Sub-order #: 70-35431-11 | Shipped from Mira Loma, CA

| Line | Description | Status | Estimated to deliver | Quantity | Unit price | Line price |
|---|---|---|---|---|---|---|
| 1 | Dell Latitude 7420 Core i7-1165 G7 16GB 512GB W10P W1...  VPN: 42CFC  SKU: 01GR54  View serial numbers | (Shipped) | 05/26/2023  View more | Total: 10  Shipped: 10 | $1,760.53 | $17,605.30 |

🖶 Packing slip  ⚙ Modification settings   ‹

Order subtotal          $17,605.30
Shipping charges        $0.00
Taxes                   $0.00
Order total ⓘ           $17,605.30

Invoice #: 20-VU70-11 | View summary ∨

IM order #: SO000518  (Completed) ⟲   ‹

| Plan & options | Quantity | Reseller cost | Total reseller cost | Margin | End customer price | Total end customer price |
|---|---|---|---|---|---|---|
| Microsoft 365 E5 (NCE COM MTH) | | | | | | |
| Microsoft 365 E5 | 10 | $45.60/License | $456.00 | 20.00% | $57.00/License | $570.00 |
| Acrobat Pro for teams – Multiple Platforms – Multi North... | | | | | | |
| Acrobat Pro for teams – Multiple Platforms – Multi North... | 10 | $177.77/License | $1,777.70 | 8.21% | $193.68/License | $1,936.80 |
| | | Fees | $2,233.70 | | Customer total fees | $2,506.80 |
| | | Taxes | $0.00 | | Taxes | $0.00 |
| | | Order Total | $2,233.70 | | Total customer price | $2,506.80 |

Order total          $19,839.00

⬇ Download

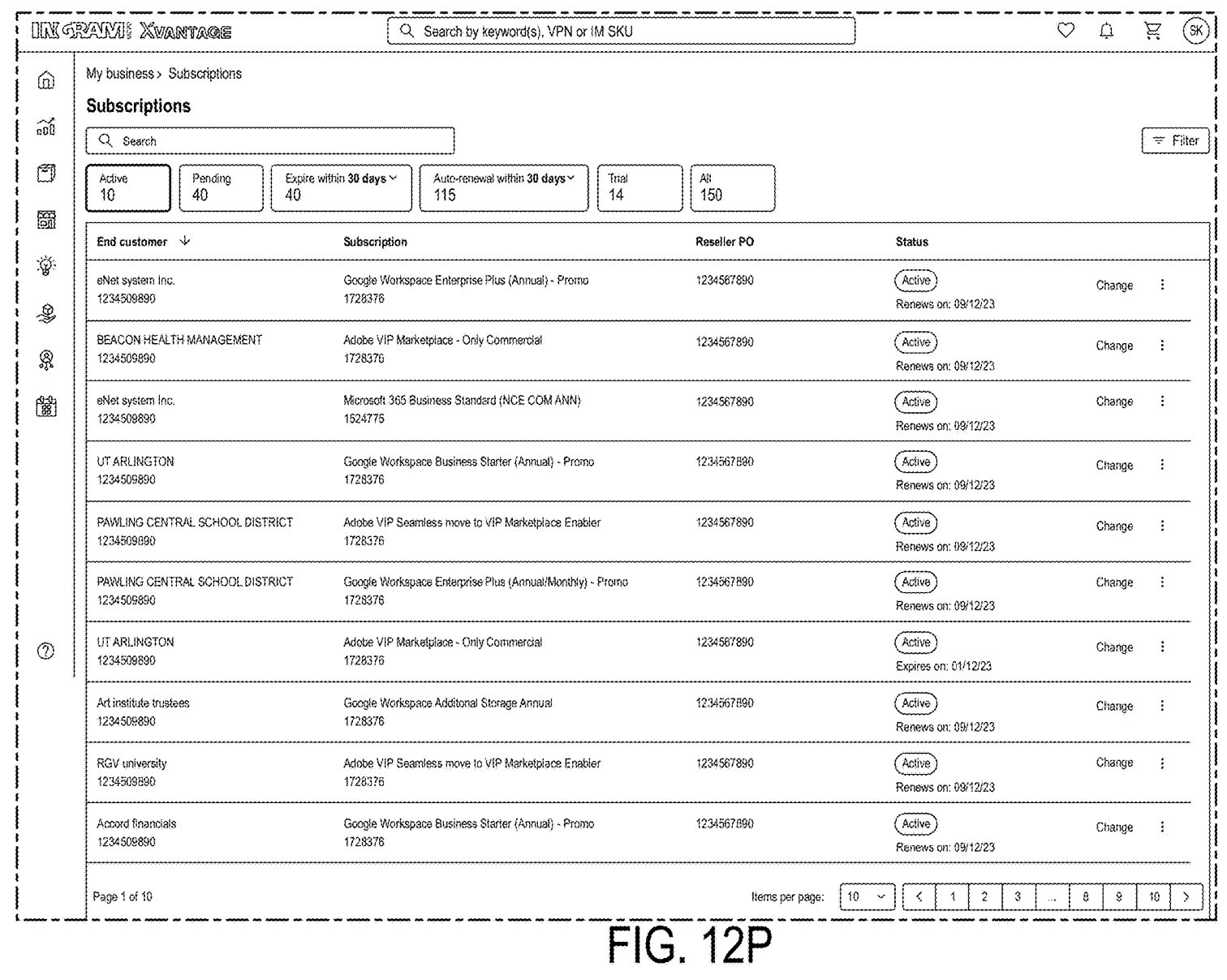

INGRAM XVANTAGE

My business > Subscriptions

Subscriptions

Q Search by keyword(s), VPN or IM SKU

≡ Filter

| Active 10 | Pending 40 | Expire within 30 days ⌄ 40 | Auto-renewal within 30 days ⌄ 115 | Trial 14 | All 150 |

| End customer ↓ | Subscription | Reseller PO | Status |
|---|---|---|---|
| eNet system Inc. 1234508890 | Google Workspace Enterprise Plus (Annual) - Promo 1728376 | 1234567890 | Active   Renews on: 09/12/23   Change   ⋯ |
| BEACON HEALTH MANAGEMENT 1234509890 | Adobe VIP Marketplace - Only Commercial 1728376 | 1234567890 | Active   Renews on: 09/12/23   Change   ⋯ |
| eNet system Inc. 1234508890 | Microsoft 365 Business Standard (NCE COM ANN) 1524775 | 1234567890 | Active   Renews on: 09/12/23   Change   ⋯ |
| UT ARLINGTON 1234509890 | Google Workspace Business Starter (Annual) - Promo 1728376 | 1234567890 | Active   Renews on: 09/12/23   Change   ⋯ |
| PAWLING CENTRAL SCHOOL DISTRICT 1234509990 | Adobe VIP Seamless move to VIP Marketplace Enabler 1728376 | 1234567890 | Active   Renews on: 09/12/23   Change   ⋯ |
| PAWLING CENTRAL SCHOOL DISTRICT 1234509890 | Google Workspace Enterprise Plus (Annual/Monthly) - Promo 1728376 | 1234567890 | Active   Renews on: 09/12/23   Change   ⋯ |
| UT ARLINGTON 1234509890 | Adobe VIP Marketplace - Only Commercial 1728376 | 1234567890 | Active   Expires on: 01/12/23   Change   ⋯ |
| Art institute trustees 1234509890 | Google Workspace Additional Storage Annual | 1234567890 | Active   Renews on: 09/12/23   Change   ⋯ |
| RGV university 1234509890 | Adobe VIP Seamless move to VIP Marketplace Enabler 1728376 | 1234567890 | Active   Renews on: 09/12/23   Change   ⋯ |
| Accord financials 1234508890 | Google Workspace Business Starter (Annual) - Promo 1728376 | 1234567890 | Active   Renews on: 09/12/23   Change   ⋯ |

Page 1 of 10

Items per page: 10 ⌄   <   1 2 3 … 8 9 10   >

FIG. 12P

SYSTEMS AND METHODS FOR END USER VIEW B2B/B2C MODE

CROSS REFERENCE TO RELATED APPLICATIONS

This application is a Continuation-In-Part (CIP) of U.S. patent application Ser. No. 18/341,714, filed on Jun. 26, 2023 and U.S. patent application Ser. No. 18/349,836, filed on Jul. 10, 2023; U.S. patent application Ser. No. 18/424, 193, filed Jan. 26, 2024; U.S. patent application Ser. No. 18/583,256, filed Feb. 21, 2024; U.S. patent application Ser. No. 18/583,337, filed Feb. 21, 2024; U.S. patent application Ser. No. 18/599,388, filed Mar. 8, 2024; U.S. patent application Ser. No. 18/614,517, filed Mar. 22, 2024; U.S. patent application Ser. No. 18/732,227, filed Jun. 3, 2024; U.S. patent application Ser. No. 18/768,998, filed Jul. 10, 2024; U.S. patent application Ser. No. 18/768,971, filed Jul. 10, 2024; U.S. patent application Ser. No. 18/789,602, filed Jul. 30, 2024; and U.S. patent application Ser. No. 18/793,346, filed Aug. 2, 2024. Each of these applications is incorporated herein by reference in its entirety.

BACKGROUND

The traditional IT distribution model has long been characterized by its fragmented nature, with various systems and touchpoints required to manage different aspects of business operations. Resellers, vendors, and customers often face challenges related to data consistency, real-time visibility, and operational efficiency. The need for a unified platform that integrates business-to-business (B2B) and business-to-consumer (B2C) transactions has become increasingly evident, as businesses strive to enhance their decision-making capabilities and provide an efficient and intuitive user experience.

In response to these challenges, there is a growing demand for platforms that can provide end-users with a comprehensive, real-time view of their entire business environment. Such platforms must integrate data from multiple sources, including customer relationship management (CRM) systems, enterprise resource planning (ERP) systems, vendor databases, and third-party applications. By leveraging advanced Artificial Intelligence (AI) and Machine Learning (ML) technologies, these platforms can harmonize and process data, ensuring accuracy and consistency across all interactions.

The traditional IT distribution industry has long struggled with fragmentation, forcing resellers and vendors to navigate complex, disconnected systems to manage business operations. These systems typically target either business-to-business (B2B) or business-to-consumer (B2C) transactions but rarely both. As a result, resellers and distributors often need to develop their own solutions to bridge the gap between B2B and B2C transactions, leading to inefficiencies, increased operational costs, and a lack of real-time connectivity. Current solutions in the market fail to provide a comprehensive platform that integrates both B2B and B2C transactions within a single, unified system.

One of the key challenges in the distribution industry is the lack of end-to-end connectivity across the supply chain. Vendors, resellers, and customers often operate in silos, with disparate systems managing inventory, pricing, customer interactions, and order fulfillment. This fragmentation creates a lack of visibility and control for resellers, who are unable to provide a cohesive experience for end customers. Additionally, resellers are forced to invest heavily in developing custom-built systems that attempt to provide real-time insights, data synchronization, and engagement across B2B and B2C operations. However, such bespoke systems are often difficult to maintain, lack scalability, and do not offer a robust integration between different transaction models, such as subscription, consumption, and traditional models.

Further complicating the distribution landscape is the growing need for personalized financial solutions and bundled offerings. Modern consumers and businesses alike demand the ability to purchase hardware, software, SaaS, and subscriptions in the same transaction, expecting the kind of personalized recommendations and insights typically found in B2C e-commerce platforms. Yet, current B2B systems rarely offer such flexibility, resulting in a gap between the expectations of end customers and the capabilities of the platforms used by resellers. This disconnect often leads to operational inefficiencies, missed sales opportunities, and a subpar customer experience and operational efficiency, resulting in increased operational expenses to address these issues.

BRIEF SUMMARY OF THE INVENTION

The invention described herein addresses these challenges by introducing a platform that provides a combined B2B and B2C solution within a single, integrated environment. Unlike traditional distribution platforms, this system offers end-to-end connectivity, enabling engagement between vendors, resellers, and end customers. This platform is designed to aggregate and harmonize data from multiple sources, providing a unified view that improves decision-making and operational efficiency. Moreover, the system integrates advanced machine learning algorithms to offer personalized product recommendations, pricing strategies, and financial solutions based on real-time data analysis, catering to both the B2B and B2C markets. This ensures that resellers no longer need to build custom systems, reducing complexity and cost while significantly enhancing the overall user experience.

By enabling resellers to bundle hardware, software, SaaS, and subscriptions within the same transaction, the platform meets the growing demand for flexible, comprehensive purchasing options. Furthermore, the system offers personalized insights and financial solutions that allow end customers to make more informed decisions, streamlining the procurement process. This solution not only bridges the gap between B2B and B2C operations but also positions resellers to meet evolving customer expectations in a dynamic and increasingly complex marketplace.

Embodiments are provided herein that present a unified platform designed to address the long-standing challenges of the IT distribution industry by integrating business-to-business (B2B) and business-to-consumer (B2C) transactions. The platform provides end-to-end connectivity across the supply chain, allowing resellers, vendors, and end customers to interact within a single system. By eliminating the need for resellers to build their own custom solutions, the platform significantly reduces operational complexity and improves efficiency.

Disclosed systems and methods provide a flexible and scalable solution that aggregates data from various sources such as customer relationship management (CRM) systems, enterprise resource planning (ERP) systems, vendor databases, and third-party applications. Through this aggregation, the platform provides a unified, real-time view of all transactions, including inventory levels, pricing, customer data, and order status. The platform's integration capabilities allow for data exchange between vendors, resellers, and end customers, creating a cohesive user experience for managing both B2B and B2C transactions.

In some embodiments, systems and methods provide the ability to offer personalized recommendations and insights based on real-time data analysis. Using advanced machine learning models, the platform analyzes historical data, customer preferences, and market trends to generate tailored product recommendations and dynamic pricing strategies. This allows resellers to provide a personalized purchasing experience similar to what is typically offered in B2C e-commerce environments, but with the added complexity of B2B transactions, such as bulk ordering, negotiated pricing, and contract management. The platform also includes targeted financial solutions, enabling resellers to offer customized payment options and bundles that combine hardware, software, SaaS, and subscriptions within a single transaction.

By offering end-to-end billing capabilities, the platform simplifies the management of complex transactions that involve multiple products and services. This includes real-time updates on inventory and pricing, automated invoicing, and fulfillment analytics, all within a single user interface. The platform's ability to integrate financial solutions and provide personalized recommendations ensures that both resellers and end customers benefit from a more streamlined, efficient procurement process.

The invention also addresses the industry's increasing demand for flexible storefronts that emulate the functionality of B2C e-commerce platforms. The system allows resellers to create customized storefronts, offering the same case of use and real-time connectivity found in consumer-facing platforms but tailored to the specific needs of the IT distribution industry. This flexibility ensures that resellers can adapt to market demands, providing end customers with a consistent, user-friendly experience across both B2B and B2C transactions.

The platform provides a comprehensive solution for managing the complexities of modern IT distribution. By offering a unified, real-time view of both B2B and B2C operations, the system enables resellers to streamline their business processes, reduce operational costs, and provide personalized customer experiences. The integration of targeted financial solutions, personalized insights, and the ability to bundle hardware, software, SaaS, and subscriptions into a single transaction make this platform a game-changer in the IT distribution industry. It not only enhances the reseller's operational efficiency but also elevates the end customer experience, creating a more cohesive and efficient distribution ecosystem.

AI-Based end-user views for managing B2B and B2C transactions aim to address deficiencies in the distribution industry by providing a unified platform experience. This platform integrates various activities and systems into a single interface and enables users to streamline the entire process. It reduces the time required for activities like inventory management, customer interaction, order placement, and data harmonization. Therefore, a technology solution that can effectively integrate, streamline, and accelerate these complex processes while also ensuring data security and compliance is critically needed.

In the global distribution industry, challenges such as inefficient distribution management, SKU management, and the transition to direct-to-consumer models necessitate innovative solutions. Traditional distribution methods are increasingly insufficient, particularly with shifts in consumer expectations and regulations. The invention addresses these challenges by integrating a comprehensive set of functionalities focused on distribution management, supply chain management, and customer visibility into one platform.

According to some embodiments, the system can be integrated with a Real-Time Data Mesh (RTDM) and a Single Pane of Glass User Interface (SPoG UI). The system uses AI algorithms to optimize user interactions based on real-time inventory and customer data. It also employs generative AI technologies to aggregate data into a canonical, agnostic format, ensuring consistency and accuracy.

In a non-limiting example, the system employs machine learning models like neural networks for tailored recommendations and dynamic pricing strategies. The platform can provide personalized product recommendations and dynamic pricing strategies based on real-time data analysis.

In some embodiments, systems and methods dynamically manage SKUs and synchronizing inventory levels across multiple channels in real-time, providing a comprehensive view for both B2B and B2C transactions. This method can include user authentication, data ingestion from multiple sources, real-time inventory updates, automated stock alerts, vendor integration, customer-specific pricing, and a unified product catalog. This comprehensive data management approach provides resellers with an integrated view of their operations.

In some embodiments, systems and methods perform processing and fulfillment for orders from both B2B and B2C customers, providing an integrated view and streamlined operations. This method can include order placement, real-time inventory checks, dynamic pricing, order validation, order confirmation, real-time tracking, automated invoicing, returns management, and fulfillment analytics. The use of generative AI technologies within the AAML module optimizes the entire process, providing resellers with a unified platform to manage their orders.

In some embodiments, systems and methods enable personalizing customer interactions and engagement for both B2B and B2C customers, leveraging data analytics and machine learning. This method can include customer data integration, segmentation, personalized marketing, customized portals, real-time support, loyalty programs, feedback loops, and real-time analytics. The integration of generative AI technologies ensures that the personalization is dynamic and data-driven.

Embodiments disclosed herein integrate multiple systems, automate processes, and validate data configurations based on intelligent rules. This enables efficient execution of complex tasks without specialized knowledge, reducing time and minimizing errors. Moreover, the invention is adaptable and configurable to meet evolving market and customer demands, thereby maintaining the relevance and sustainability of the distribution model. The invention thus provides an efficient, integrated, and adaptable solution for managing end-user views for B2B and B2C transactions in the distribution industry.

Single Pane of Glass

The Single Pane of Glass (SPoG) can provide a comprehensive solution that is configured to address these multifaceted challenges. It can be configured to provide an intuitive and efficient platform that provides a distribution process.

According to some embodiments, SPoG can be configured to address supply chain and distribution management by enhancing visibility and control over the supply chain process. Through real-time tracking and analytics, SPoG can deliver valuable insights into inventory levels and the status of goods, ensuring that the process of supply chain and distribution management is handled efficiently.

According to some embodiments, SPoG can integrate multiple touchpoints into a single platform to emulate a direct consumer channel into a distribution platform. This integration provides a unified direct channel for consumers to interact with distributors, significantly reducing the complexity of the supply chain and enhancing the overall customer experience.

SPoG offers an innovative solution for improved inventory management through advanced forecasting capabilities. These predictive analytics can highlight demand trends, guiding companies in managing their inventory more effectively and mitigating the risks of stockouts or overstocks.

According to some embodiments, SPoG can include a global compliance database. Updated in real-time, this database enables distributors to stay abreast with the latest international laws and regulations. This feature significantly reduces the burden of manual tracking, ensuring smooth and compliant cross-border transactions.

According to some embodiments, to facilitate generating end-user views in a customized dashboard for resellers, SPoG integrates data from various OEMs into a single platform. This not only ensures data consistency but also significantly reduces the potential for errors. Furthermore, it provides capabilities to generate B2B and B2C views efficiently, thereby aligning with specific market needs and requirements.

According to some embodiments, SPoG is its highly configurable and user-friendly platform. Its intuitive interface allows users to easily access and purchase technology, thereby aligning with the expectations of the new generation of tech buyers.

Moreover, SPoG's advanced analytics capabilities offer invaluable insights that can drive strategy and decision-making. It can track and analyze trends in real-time, allowing companies to stay ahead of the curve and adapt to changing market conditions.

SPoG's flexibility and scalability make it a future-proof solution. It can adapt to changing business needs, allowing companies to expand or contract their operations as needed without significant infrastructural changes.

SPoG's innovative approach to resolving the challenges in the distribution industry makes it an invaluable tool. By enhancing supply chain visibility, streamlining inventory management, ensuring compliance, simplifying generating a resller dashboard, and delivering a superior customer experience, it offers a comprehensive solution to the complex problems that have long plagued the distribution sector. Through its implementation, distributors can look forward to increased efficiency, reduced errors, and improved customer satisfaction, leading to sustained growth in the ever-evolving global market.

Real-Time Data Mesh (RTDM)

The platform can be include implementation(s) of a Real-Time Data Mesh (RTDM), according to some embodiments. The RTDM offers an innovative solution to address these challenges. RTDM, a distributed data architecture, enables real-time data availability across multiple sources and touchpoints. This feature enhances supply chain visibility, allowing for efficient management and enabling distributors to handle disruptions more effectively.

RTDM's predictive analytics capability offers a solution for efficient inventory control. By providing insights into demand trends, it aids companies in managing inventory, reducing risks of overstocking or stockouts.

RTDM's global compliance database, updated in real-time, ensures distributors are current with international regulations. It significantly reduces the manual tracking burden, enabling cross-border transactions.

The RTDM also simplifies SKU management and localization by integrating data from various OEMs, ensuring data consistency and reducing error potential. Its capabilities for generating a real-time view of end users with specific needs in the B2B and B2C markets efficiently.

The RTDM enhances customer experience with its intuitive interface, allowing easy access and purchase of technology, meeting the expectations of the new generation of tech buyers.

Advantages of SPoG and RTDM Integration

Integrating SPoG platform with the RTDM provides a myriad of advantages. It offers a unified solution to complex problems in the distribution industry. With the RTDM's capabilities, SPoG can enhance supply chain visibility, streamline inventory management, ensure compliance, simplify SKU management, and deliver a superior customer experience.

The real-time tracking and analytics offered by RTDM improve SPoG's ability to manage the supply chain and inventory effectively. It provides accurate and current information, enabling distributors to make informed decisions quickly.

Integrating SPoG with RTDM also ensures data consistency and reduces errors in SKU management. By providing a centralized platform for managing data from various OEMs, it simplifies product localization and helps to align with market needs.

The global compliance database of RTDM, integrated with SPoG, facilitates and compliant cross-border transactions. It also reduces the burden of manual tracking, saving significant time and resources.

In some embodiments, a distribution platform incorporates SPoG and RTDM to provide an improved and comprehensive distribution system. The platform can leverage the advantages of a distribution model, addresses its existing challenges, and positions it for sustained growth in the ever-evolving global market.

BRIEF DESCRIPTION OF THE DRAWINGS/FIGURES

DETAILED DESCRIPTION OF THE INVENTION

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 1:
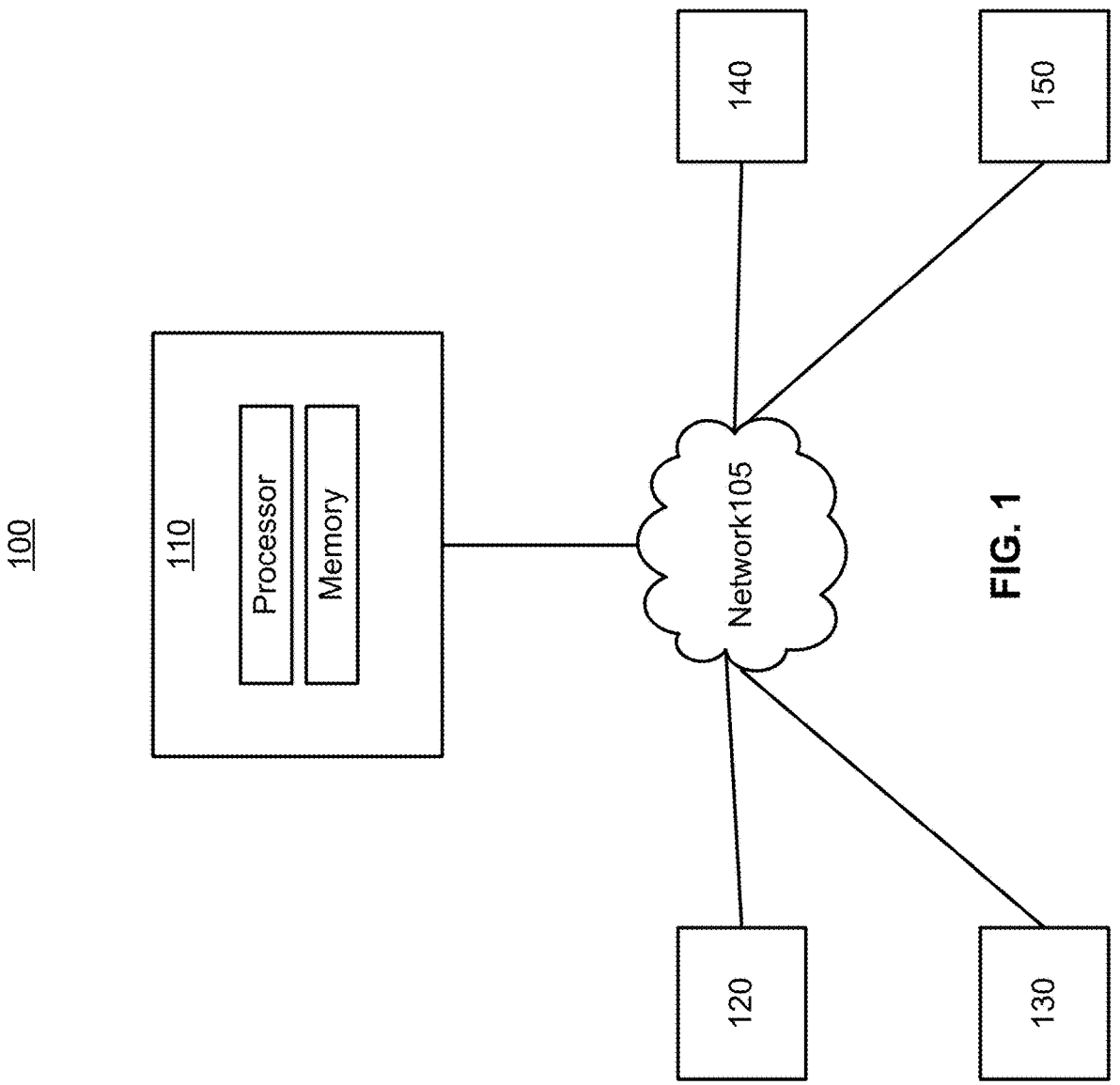
FIG. 1 illustrates one embodiment of an operating environment of a distribution platform, referred to as System in this embodiment.

FIG. 1 illustrates an operating environment 100 of a distribution platform, referred to as System 110 in this embodiment. System 110 operates within the context of an information technology (IT) distribution model, catering to various users such as customers 120, end customers 130, vendors 140, resellers 150, and other entities involved in the distribution process. This operating environment encompasses a broad range of characteristics and dynamics that contribute to the success and efficiency of the distribution platform.

Customers 120 within the operating environment of System 110 represent businesses or individuals seeking IT solutions to meet their specific needs. These customers may require a diverse range of IT products such as hardware components, software applications, networking equipment, or cloud-based services. System 110 provides customers with a user-friendly interface, allowing them to browse, search, and select the most suitable IT solutions based on their requirements. Customers can also access real-time data and analytics through System 110, empowering them to make informed decisions and optimize their IT infrastructure.

End customers 130 can be the ultimate beneficiaries of the IT solutions provided by System 110. They may include businesses or individuals who utilize IT products and services to enhance their operations, productivity, or daily activities. End customers rely on System 110 to access a wide array of IT solutions, ensuring they have access to the latest technologies and innovations in the market. System 110 enables end customers to track their orders, receive updates on delivery status, and access customer support services, thereby enhancing their overall experience.

Vendors 140 play a crucial role within the operating environment of System 110. These vendors encompass manufacturers, distributors, and suppliers who offer a diverse range of IT products and services. System 110 acts as a centralized platform for vendors to showcase their offerings, manage inventory, and facilitate transactions with customers and resellers. Vendors can leverage System 110 to streamline their supply chain operations, manage pricing and promotions, and gain insights into customer preferences and market trends. By integrating with System 110, vendors can expand their reach, access new markets, and enhance their overall visibility and competitiveness.

Resellers 150 can be intermediaries within the distribution model who bridge the gap between vendors and customers. They play a vital role in the IT distribution ecosystem by connecting customers with the right IT solutions from various vendors. Resellers may include retailers, value-added resellers (VARs), system integrators, or managed service providers. System 110 enables resellers to access a comprehensive catalog of IT solutions, manage their sales pipeline, and provide value-added services to customers. By leveraging System 110, resellers can enhance their customer relationships, optimize their product offerings, and increase their revenue streams.

Within the operating environment of System 110, there can be various dynamics and characteristics that contribute to its effectiveness. These dynamics include real-time data exchange, integration with existing enterprise systems, scalability, and flexibility. System 110 ensures that relevant data can be exchanged in real-time between users, enabling accurate decision-making and timely actions. Integration with existing enterprise systems such as enterprise resource planning (ERP) systems, customer relationship management (CRM) systems, and warehouse management systems allows for communication and interoperability, eliminating data silos and enabling end-to-end visibility.

System 110 can achieve scalability and flexibility. It can accommodate the growing demands of the IT distribution model, whether it involves an expanding customer base, an increasing number of vendors, or a wider range of IT products and services. System 110 can be configured to handle large-scale data processing, storage, and analysis, ensuring that it can support the evolving needs of the distribution platform. Additionally, System 110 leverages a technology stack that includes .NET, Java, and other suitable technologies, providing a robust foundation for its operations.

In summary, the operating environment of System 110 within the IT distribution model encompasses customers 120, end customers 130, vendors 140, resellers 150, and other entities involved in the distribution process. System 110 serves as a centralized platform that facilitates efficient collaboration, communication, and transactional processes between these users. By leveraging real-time data exchange, integration, scalability, and flexibility, System 110 empowers users to optimize their operations, enhance customer experiences, and drive business success within the IT distribution ecosystem.

Figure 2:
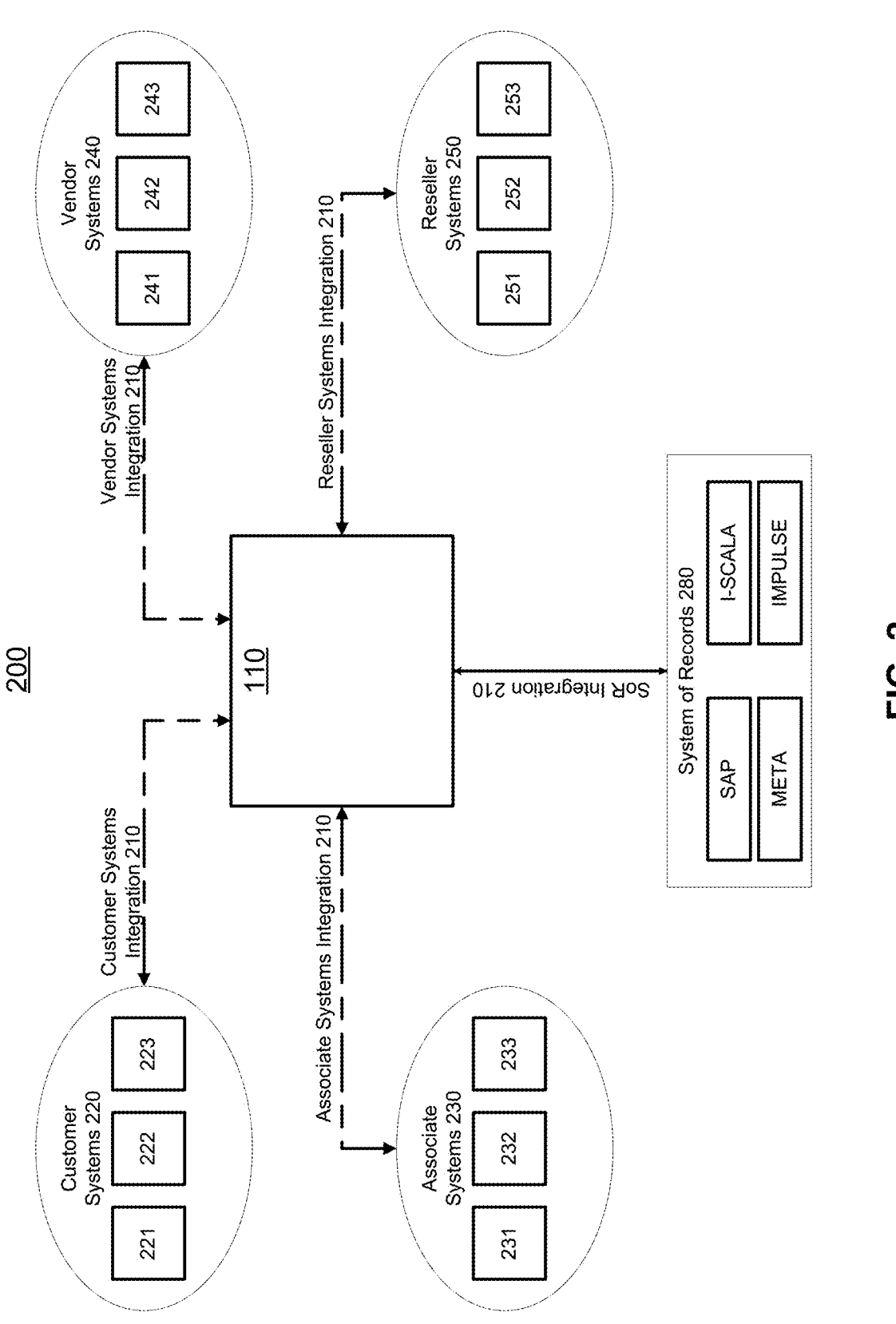
FIG. 2 illustrates one embodiment of an operating environment of the distribution platform, which builds upon the elements introduced in FIG. 1.

FIG. 2 illustrates an operating environment 200 of the distribution platform, which builds upon the elements introduced in FIG. 1. This operating environment is arranged to enable an end-user view for managing both B2B and B2C transactions within a unified platform. Within this operating environment, integration points 210 facilitate data flow and connectivity between various customer systems 220, vendor systems 240, reseller systems 260, and other entities involved in the distribution process. The diagram showcases the interconnectedness and the mechanisms that enable efficient collaboration and data-driven decision-making. This operating environment is configured to enable an end-user view for both B2B and B2C transactions utilizing advanced Artificial Intelligence (AI) and Machine Learning (ML) technologies to integrate, process, and analyze data. In this configuration, AI algorithms can be applied for real-time inventory management, customer interaction optimization, and data harmonization to ensure a unified user experience. Machine learning models such as neural networks and decision trees can be employed to provide refined and personalized options to users. The system can also use generative AI technologies to aggregate data into a canonical, agnostic format, ensuring data consistency and accuracy.

Operating environment 200 can include System 110 as a distribution platform that serves as the central hub for managing and facilitating the distribution process. System 110 can provide a unified interface for end-users to manage and view all aspects of B2B and B2C transactions, ensuring interaction and data consistency. System 110 can be configured to perform functions and operations as a bridge between customer systems 220, vendor systems 240, reseller systems 260, and other entities within the ecosystem. It can integrate communication, data exchange, and transactional processes, providing users with a unified and streamlined experience. Moreover, operating environment 200 can include one or more integration points 210 to ensure smooth data flow and connectivity. These integration points include:

Customer System Integration: Integration point 210 can enable System 110 to connect with customer systems 220, enabling efficient data exchange and synchronization. Customer systems 220 may include various entities such as customer system 221, customer system 222, and customer system 223. These systems represent the internal systems utilized by customers, such as enterprise resource planning (ERP) or customer relationship management (CRM) systems. Integration with customer systems 220 empowers customers to access real-time inventory information, pricing details, order tracking, and other relevant data, enhancing their visibility and decision-making capabilities. The integration with System 110 ensures that customer systems 220 can access real-time inventory information, pricing details, order tracking, and other relevant data for both B2B and B2C transactions, enhancing their visibility and decision-making capabilities. The application of end-user view processes ensures that customer systems 220 can engage in real-time product interaction and data access processes through integration with System 110. Specifically, the system can receive data requests from customer systems 220, fetch real-time inventory and customization options from its own databases, and return optimized data views. This integration ensures that end-users have a comprehensive, real-time view of their supply chain and customer interactions, enabling data-driven decision-making and enhanced operational efficiency for both B2B and B2C contexts.

Associate System Integration: Integration point 210 can enable System 110 to connect with associate systems 230, enabling efficient data exchange and synchronization. Associate systems 230 may include various entities such as associate system 231, associate system 232, and associate system 233. Integration with associate systems 230 empowers customers to access real-time inventory information, pricing details, order tracking, and other relevant data, enhancing their visibility and decision-making capabilities.

Vendor System Integration: Integration point 210 facilitates the connection between System 110 and vendor systems 240. Vendor systems 240 may include entities such as vendor system 241, vendor system 242, and vendor system 243, representing the inventory management systems, pricing systems, and product catalogs employed by vendors. Integration with vendor systems 240 ensures that vendors can efficiently update their product offerings, manage pricing and promotions, and receive real-time order notifications and fulfillment details. Integration with System 110 enables vendor systems 240 to efficiently update their product offerings, manage pricing and promotions, and receive real-time order notifications and fulfillment details, supporting both B2B and B2C transactions. End-user view processes and components within System 110 enable vendor systems 240 to automate and optimize various aspects of product interaction and data management. For instance, the system can use AI algorithms to request specific inventory or customization options from the vendor systems. This aids vendors in aligning their stock or manufacturing processes with real-time market demands.

Reseller System Integration: Integration point 210 provides capabilities for reseller systems 260 to connect with System 110. Reseller systems 260 may encompass entities such as reseller system 261, reseller system 262, and reseller system 263, representing the sales systems, customer management systems, and service delivery platforms employed by resellers. Integration with reseller systems 260 empowers resellers to access current product information, manage customer accounts, track sales performance, and provide value-added services to their customers.

Other Entity System Integration: Integration point 210 also enables connectivity with other entities involved in the distribution process. These entities may include entities such as entity system 271, entity system 272, and entity system 273. Integration with these systems ensures communication and data exchange, facilitating collaboration and efficient distribution processes. In some embodiments, integration of end-user view processes with other entity systems can ensure that entity systems 271 engage in real-time product interaction and data access processes via System 110.

Integration points 210 also enable connectivity with System of Records 280, for additional data management and integration. System of Records 280 can represent enterprise resource planning (ERP) systems or customer relationship management (CRM) systems, including both future systems as well as legacy ERP systems such as SAP, Impulse, META, I-SCALA, and others. System of Records 280 can include one or more storage repositories of critical and legacy business data. It facilitates integration of data exchange and synchronization between the distribution platform, System 110, and the ERPs, enabling real-time updates and ensuring the availability of accurate and up-to-date information. Integration points 210 establish connectivity between the System of Records 280 and the distribution platform, allowing stakeholders to leverage rich data stored in the ERPs for efficient collaboration, data-driven decision-making, and streamlined distribution processes. These systems represent the internal systems utilized by customers, vendors, and others.

Integration points 210 within the operating environment 200 can be facilitated through standardized protocols, APIs, and data connectors. These mechanisms ensure compatibility, interoperability, and secure data transfer between the distribution platform and the connected systems. System 110 can employ industry-standard protocols, such as RESTful APIs, SOAP, or GraphQL, to establish communication channels and enable data exchange.

In some embodiments, System 110 can incorporate authentication and authorization mechanisms to ensure secure access and data protection. Technologies such as OAuth or JSON Web Tokens (JWT) can be employed to authenticate users, authorize data access, and maintain the integrity and confidentiality of the exchanged information.

In some embodiments, integration points 210 and data flow within the operating environment 200 enable users to operate within a connected ecosystem. Data generated at various stages of the distribution process, including customer orders, inventory updates, shipment details, and sales analytics, flows between customer systems 220, vendor systems 240, reseller systems 260, and other entities. This data exchange facilitates real-time visibility, enables data-driven decision-making, and enhances operational efficiency throughout the distribution platform.

In some embodiments, System 110 can use advanced technologies such as Typescript, NodeJS, ReactJS, .NET Core, C#, and other suitable technologies to support the integration points 210 and enable communication within the operating environment 200. These technologies can provide a robust foundation for System 110, ensuring scalability, flexibility, and efficient data processing capabilities. Moreover, the integration points 210 may also employ algorithms, data analytics, and machine learning techniques to derive valuable insights, optimize distribution processes, and personalize customer experiences. Integration points 210 and data flow within the operating environment 200 can enable users to operate within a connected ecosystem. Data generated at various touchpoints, including customer orders, inventory updates, pricing changes, or delivery status, flows between the different entities, systems, and components. The integrated data can be processed, harmonized, and made available in real-time to relevant users through System 110. This real-time access to accurate and current information empowers users to make informed decisions, optimize supply chain operations, and enhance customer experiences.

Several elements in the operating environment depicted in FIG. 2 can include conventional, well-known elements that are explained only briefly here. For example, each of the customer systems, such as customer systems 220, can include a desktop personal computer, workstation, laptop, PDA, cell phone, or any wireless access protocol (WAP) enabled device, or any other computing device capable of interfacing directly or indirectly with the Internet or other network connection. Each of the customer systems typically can run an HTTP client, such as Microsoft's Edge browser, Google's Chrome browser, Opera's browser, or a WAP-enabled browser for mobile devices, allowing customer systems to access, process, and view information, pages, and applications available from the distribution platform over the network.

Moreover, each of the customer systems can typically be equipped with user interface devices such as keyboards, mice, trackballs, touchpads, touch screens, pens, or similar devices for interacting with a graphical user interface (GUI) provided by the browser. These user interface devices enable users of customer systems to navigate the GUI, interact with pages, forms, and applications, and access data and applications hosted by the distribution platform.

The customer systems and their components can be operator-configurable using applications, including web browsers, which run on central processing units such as Intel Pentium processors or similar processors. Similarly, the distribution platform (System 110) and its components can be operator-configurable using applications that run on central processing units, such as the processor system, which may include Intel Pentium processors or similar processors, and/or multiple processor units.

Computer program product embodiments can include machine-readable storage media containing instructions to program computers to perform the processes described herein. The computer code for operating and configuring the distribution platform and the customer systems, vendor systems, reseller systems, and other entities' systems to intercommunicate, process webpages, applications, and other data, can be downloaded and stored on hard disks or any other volatile or non-volatile memory medium or device, such as ROM, RAM, floppy disks, optical discs, DVDs, CDs, micro-drives, magneto-optical disks, magnetic or optical cards, nano-systems, or any suitable media for storing instructions and data.

Furthermore, the computer code for implementing the embodiments can be transmitted and downloaded from a software source over the Internet or any other conventional network connection using communication mediums and protocols such as TCP/IP, HTTP, HTTPS, Ethernet, etc. The code can also be transmitted over extranets, VPNs, LANs, or other networks, and executed on client systems, servers, or server systems using programming languages such as C, C++, HTML, Java, JavaScript, ActiveX, VBScript, and others.

It will be appreciated that the embodiments can be implemented in various programming languages executed on client systems, servers, or server systems, and the choice of language may depend on the specific requirements and environment of the distribution platform.

Therefore, operating environment 200 can couple a distribution platform with one or more integration points 210 and data flow to enable efficient collaboration and streamlined distribution processes.

Figure 3:
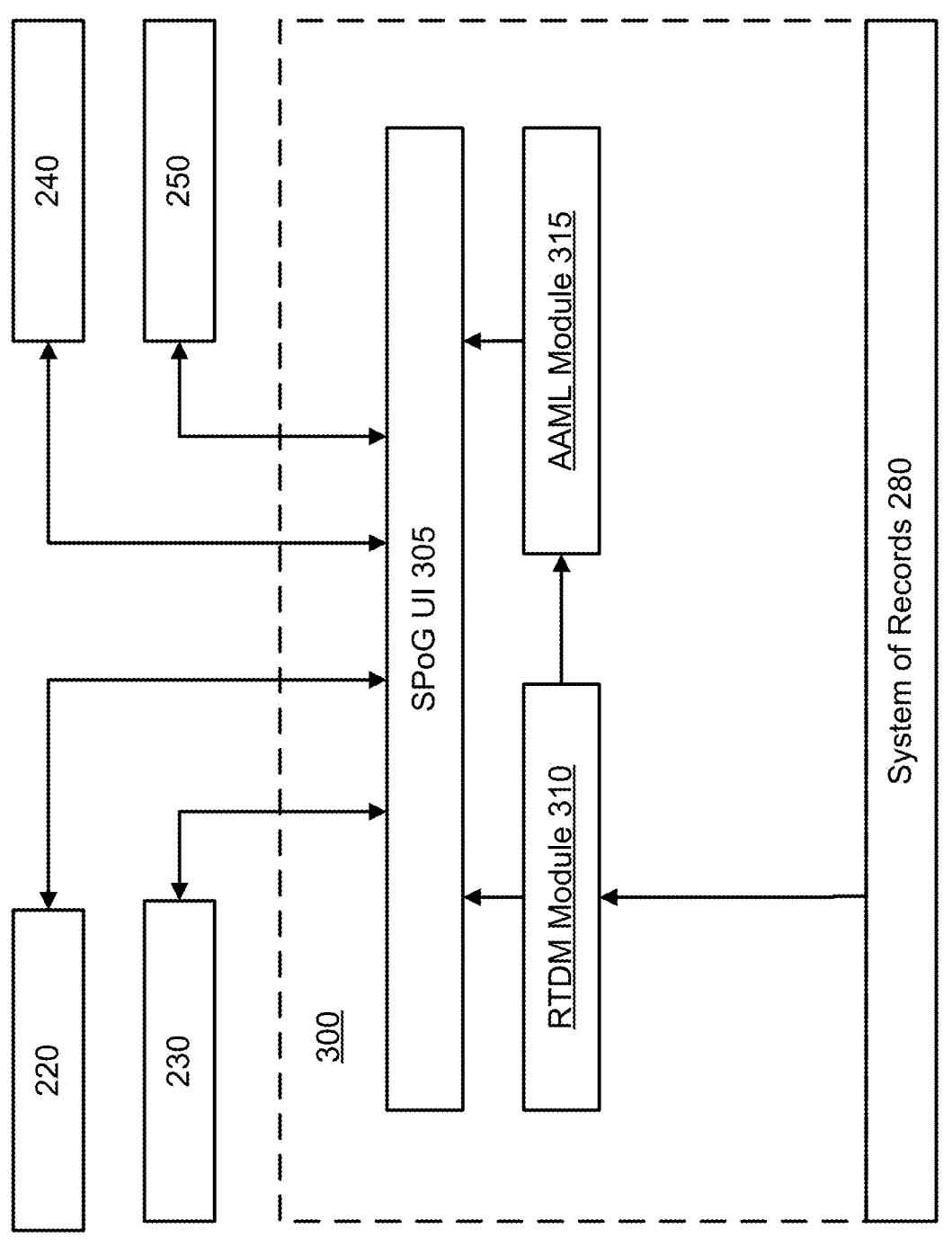
FIG. 3 illustrates an embodiment of a system for distribution management.

FIG. 3 illustrates a system 300 for supply chain and distribution management. System 300 (FIG. 3) is a supply chain and distribution management solution configured to address the challenges faced by fragmented distribution ecosystems in the global distribution industry. System 300 can include several interconnected components and modules that work in harmony to optimize supply chain and distribution operations, enhance collaboration, and drive business efficiency.

The Single Pane of Glass (SPoG) UI 305 serves as a centralized user interface, providing users with a unified view of the entire supply chain. It consolidates information from various sources and presents real-time data, analytics, and functionalities tailored to the specific roles and responsibilities of users. By offering a customizable and intuitive dashboard-style layout, the SPoG UI enables users to access relevant information and tools, empowering them to make data-driven decisions and efficiently manage their supply chain and distribution activities.

For example, a logistics manager can use the SPoG UI to monitor the status of shipments, track delivery routes, and view real-time inventory levels across multiple warehouses. They can visualize data through interactive charts and graphs, such as a map displaying the current location of each shipment or a bar chart showing inventory levels by product category. By having a unified view of the supply chain, the logistics manager can identify bottlenecks, optimize routes, and ensure timely delivery of goods.

The SPoG UI 305 integrates with other modules of System 300, facilitating real-time data exchange, synchronized operations, and streamlined workflows. Through API integrations, data synchronization mechanisms, and event-driven architectures, SPoG UI 305 ensures smooth information flow and enables collaborative decision-making across the distribution ecosystem. SPoG UI 305 is designed with a user-centric approach, featuring an intuitive and responsive layout. It utilizes front-end technologies to render dynamic and interactive data visualizations. Customizable dashboards allow users to tailor their views based on specific roles and requirements. The UI supports drag-and-drop functionality for ease of use, and its adaptive design ensures compatibility across various devices and platforms. Advanced filtering and search capabilities enable users to efficiently navigate and access relevant supply chain data and insights.

For instance, when a purchase order is generated in the SPoG UI, the system automatically updates the inventory levels, triggers a notification to the warehouse management system, and initiates the shipping process. This integration enables efficient order fulfillment, reduces manual errors, and enhances overall supply chain visibility.

The Real-Time Data Mesh (RTDM) module 310 is another component of System 300, responsible for ensuring the flow of data within the distribution ecosystem. It aggregates data from multiple sources, harmonizes it, and ensures its availability in real-time.

In a distribution network, the RTDM module collects data from various systems, including inventory management systems, point-of-sale terminals, and customer relationship management systems. It harmonizes this data by aligning formats, standardizing units of measurement, and reconciling any discrepancies. The harmonized data can be then made available in real-time, allowing users to access accurate and current information across the supply chain.

The RTDM module 310 can be configured to capture changes in data across multiple transactional systems in real-time. It employs a sophisticated Change Data Capture (CDC) mechanism that constantly monitors the transactional systems, detecting any updates or modifications. The CDC component can be specifically configured to work with various transactional systems, including legacy ERP systems, Customer Relationship Management (CRM) systems, and other enterprise-wide systems, ensuring compatibility and flexibility for businesses operating in diverse environments.

By having access to real-time data, users can make timely decisions and respond quickly to changing market conditions. For example, if the RTDM module detects a sudden spike in demand for a particular product, it can trigger alerts to the production team, enabling them to adjust manufacturing schedules and prevent stockouts.

The RTDM module 310 facilitates data management within supply chain operations. It enables real-time harmonization of data from multiple sources, freeing vendors, resellers, customers, and end customers from constraints imposed by legacy ERP systems. This enhanced flexibility supports improved efficiency, customer service, and innovation.

Another component of System 300 is the Advanced Analytics and Machine Learning (AAML) module 315. Leveraging powerful analytics tools and algorithms such as Apache Spark, TensorFlow, or scikit-learn, the AAML module extracts valuable insights from the collected data. It enables advanced analytics, predictive modeling, anomaly detection, and other machine learning capabilities.

For instance, the AAML module can analyze historical sales data to identify seasonal patterns and predict future demand. It can generate forecasts that help optimize inventory levels, ensure stock availability during peak seasons, and minimize excess inventory costs. By leveraging machine learning algorithms, the AAML module automates repetitive tasks, predicts customer preferences, and optimizes supply chain processes.

In addition to demand forecasting, the AAML module can provide insights into customer behavior, enabling targeted marketing campaigns and personalized customer experiences. For example, by analyzing customer data, the module can identify cross-selling or upselling opportunities and recommend relevant products to individual customers.

Furthermore, the AAML module can analyze data from various sources, such as social media feeds, customer reviews, and market trends, to gain a deeper understanding of consumer sentiment and preferences. This information can be used to inform product development decisions, identify emerging market trends, and adapt business strategies to meet evolving consumer expectations.

System 300 emphasizes integration and interoperability to connect with existing enterprise systems such as ERP systems, warehouse management systems, and customer relationship management systems. By establishing connections and data flows between these systems, System 300 enables smooth data exchange, process automation, and end-to-end visibility across the supply chain. Integration protocols, APIs, and data connectors facilitate communication and interoperability among different modules and components, creating a unified, interconnected distribution ecosystem.

The implementation and deployment of System 300 can be tailored to meet specific business needs. It can be deployed as a cloud-native solution using containerization technologies like Docker and orchestration frameworks like Kubernetes. This approach ensures scalability, easy management, and efficient updates across different environments. The implementation process involves configuring the system to align with specific supply chain requirements, integrating with existing systems, and customizing the modules and components based on the business's needs and preferences.

System 300 for supply chain and distribution management is a comprehensive and innovative solution that addresses the challenges faced by fragmented distribution ecosystems. It combines the power of the SPoG UI 305, the RTDM module 310, and the AAML module 315, along with integration with existing systems. By leveraging a diverse technology stack, scalable architecture, and robust integration capabilities, System 300 provides end-to-end visibility, data-driven decision-making, and optimized supply chain operations. The examples and options provided in this description are non-limiting and can be customized to meet specific industry requirements, driving efficiency and success in supply chain and distribution management.

Figure 4:
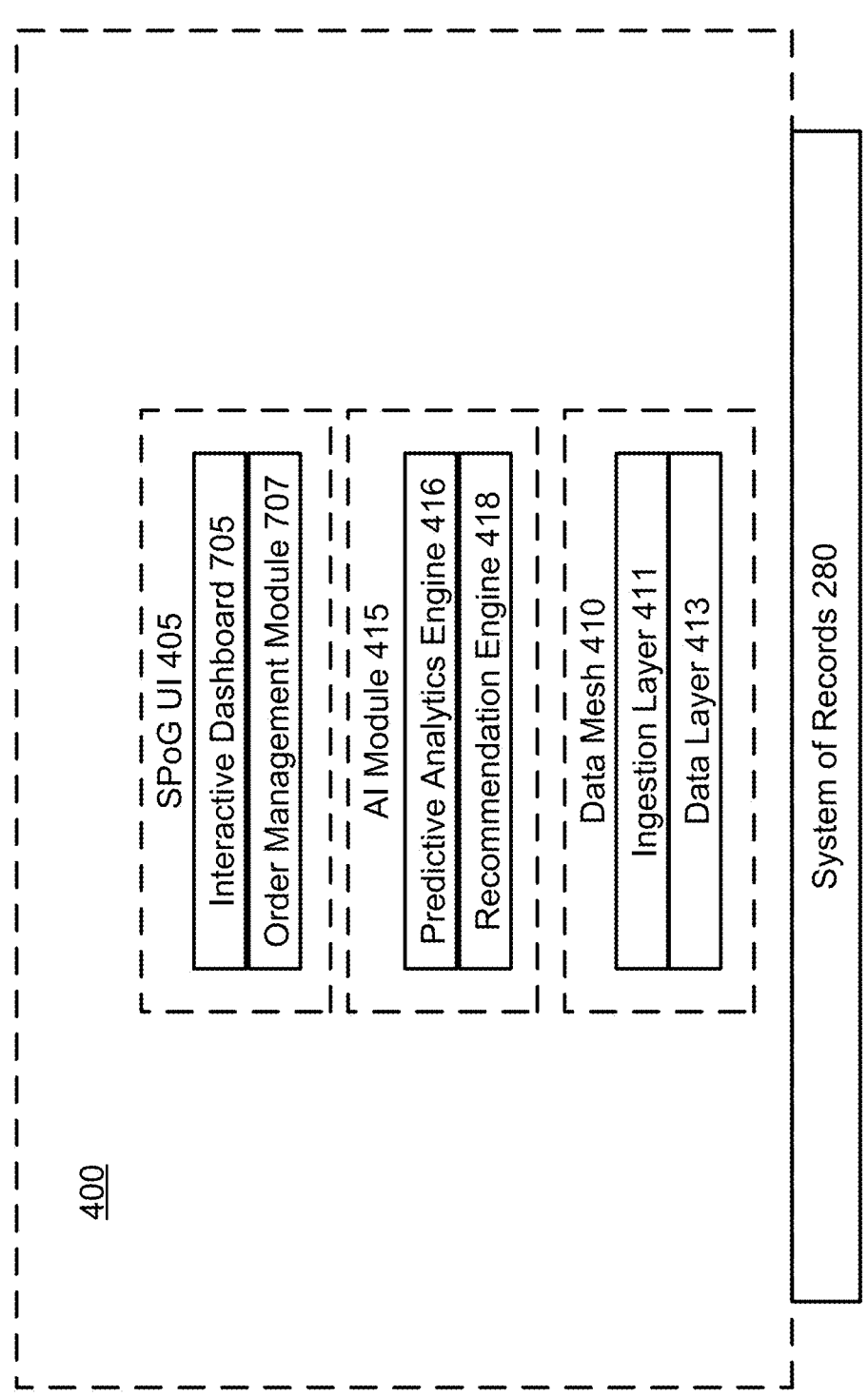
FIG. 4 depicts a system for generating an end-user view for resellers, according to an embodiment.

FIG. 4 illustrates a system 400 configured to enable end-users to view and manage B2B and B2C transactions. System 400 provides a comprehensive, real-time, and integrated platform for resellers to manage their operations within a single environment, similar to a Shopify model, allowing them to view both their supply and end-user customer interactions in one agile, end-to-end view.

System 400 can include SPoG UI 405, RTDM 410, and AAML Module 415. SPoG UI 405 can serve as the primary interface for users, providing access to various functionalities through a unified and intuitive interface. This interface can be developed using web-based technologies, making it accessible from various devices, including desktop computers, laptops, tablets, and smartphones.

RTDM 410 can function as the data integration layer, aggregating data from multiple sources such as vendor platforms, customer relationship management (CRM) systems, enterprise resource planning (ERP) systems, and third-party databases. RTDM 410 can standardize this data into a uniform format, ensuring consistency and accuracy across the platform. This data can include real-time inventory levels, pricing information, customer data, and transaction history.

AAML 415 can act as the processing layer, employing advanced algorithms and machine learning models to analyze and interpret the data aggregated by RTDM 410. AAML 415 can provide functionalities such as predictive analytics, anomaly detection, and personalized recommendations. These capabilities can help resellers optimize their operations, forecast demand, and improve customer satisfaction.

In some embodiments, SPoG UI 405 can include an Interactive Dashboard 406 that provides a comprehensive view of all business activities. Interactive Dashboard 406 can integrate both supply chain data and customer interactions, enabling resellers to monitor and manage orders, inventory, and customer engagements in real-time, thus providing an agile and unified platform for end-to-end business management. SPoG UI 405 can also include an Order Management Sub-System 407. Order Management Sub-System 407 can facilitate the creation, tracking, and management of orders from both B2B and B2C customers. SPoG UI 405 enables resellers to configure and manage bundled offerings that combine hardware, software, SaaS, and subscriptions in a single transaction. This provides the flexibility to address diverse customer needs, offering a personalized user experience typical of B2C platforms but with the backend infrastructure required for B2B operations. The platform further allows resellers to offer targeted financial solutions based on customer-specific data, enabling optimized procurement and purchase decisions through dynamic pricing and financial modeling. By consolidating order processing within the SPoG UI 405, resellers can efficiently handle transactions and reduce the complexity of managing multiple sales channels.

In a non-limiting example, when a user accesses SPoG UI 405, they can view a comprehensive dashboard displaying real-time data and insights from both their supply side and end-user customer interactions. For example, a reseller can see current inventory levels, pending orders, customer interactions, and sales analytics all in one place. The interface can provide interactive charts and graphs, enabling users to drill down into specific data points for detailed analysis. SPoG UI 405 can also allow users to initiate actions such as creating quotes, placing orders, and managing customer accounts directly from the interface.

RTDM 410 can continuously ingest data from various sources, ensuring that the information displayed on SPoG UI 405 is current. In some embodiments, RTDM 410 can use data replication mechanisms to capture real-time changes from transactional systems, such as ERP and CRM systems. This data can be processed and harmonized, making it available for analysis and reporting.

RTDM 410 can enable data from both B2B and B2C transactions to be aggregated and harmonized in real-time, enabling end-to-end connectivity across resellers, vendors, and customers. The integrated system offers real-time insights into inventory levels, customer purchasing trends, and financial performance, ensuring that resellers can optimize both procurement processes and customer interactions. This end-to-end connectivity allows resellers to efficiently manage both the supply and customer sides of their operations without the need for custom-built platforms.

RTDM 410 can include an Integration Layer 411 that collects data from various sources such as vendor platforms, CRM systems, ERP systems, and third-party databases. Integration Layer 411 ensures that all relevant data is integrated into a single platform, providing a holistic view of both supply-side and end-user activities.

RTDM 410 can further include a Data Layer 413 that processes and updates data in real-time. Data Layer 413 ensures that the information presented on the SPoG UI 405 is always current, enabling resellers to make informed decisions based on the latest data.

AAML 415 can analyze the data in real-time, generating insights and recommendations that are displayed on SPoG UI 405. For example, AAML 415 can use machine learning models to predict future demand for specific products, allowing resellers to adjust their inventory levels accordingly. AAML 415 can also detect anomalies in transaction data, such as unusual spikes in order volume, and alert users to potential issues.

AAML Module 415 can provide personalized recommendations to customers by analyzing historical purchasing data and real-time transactional activity. These recommendations can include bundled hardware/software/SaaS offerings, and the like, or targeted financial solutions that reflect the end-user's specific needs and preferences. The predictive analytics engine within AAML 415 can dynamically adjust pricing strategies and product recommendations based on evolving market trends and customer demands, further enhancing the platform's ability to streamline complex procurement workflows in real-time In some embodiments, AAML Module 415 can include a Predictive Analytics Engine 416. Predictive Analytics Engine 416 can analyze historical and current data to forecast demand and optimize inventory, helping resellers to adjust inventory levels accordingly. AAML Module 415 can also include a Recommendation Engine 418. Recommendation Engine 418 can generate personalized recommendations for inventory management, pricing strategies, and customer engagement, assisting resellers in making data-driven decisions.

In some embodiments, system 400 can include additional modules to enhance its functionality. For example, a Vendor Management Module can facilitate real-time negotiation of pricing and terms directly within SPoG UI 405. This module can integrate with vendor systems to provide real-time updates on product availability and pricing. Another module, the Compliance Management Module, can ensure that all transactions comply with relevant regulations and standards, providing audit trails and automated compliance checks.

System 400 can also support integration with external systems and applications through APIs and data connectors, allowing users to extend the platform's capabilities and integrate it with their existing IT infrastructure. For example, resellers can integrate system 400 with their warehouse management systems to streamline order fulfillment processes.

The flexibility and scalability of system 400 make it suitable for a wide range of use cases in the IT distribution industry. By providing a unified platform for managing B2B and B2C transactions, system 400 can help resellers improve efficiency, reduce errors, and enhance customer satisfaction. Its real-time data integration and advanced analytics capabilities ensure that users have access to accurate and actionable information, enabling them to make informed decisions and respond quickly to changing market conditions.

In a non-limiting example, system 400 is deployed by a reseller managing both enterprise (B2B) and consumer (B2C) sales channels. The reseller needs to provide bundled offerings combining hardware, software, and SaaS, while also offering personalized pricing and financial solutions to their end customers.

Using SPoG UI 405, the reseller creates a bundled solution for a B2B customer, integrating hardware and a 12-month SaaS subscription, alongside a custom software package. The platform, powered by RTDM 410, continuously updates the reseller on real-time inventory levels, ensuring that stock is available across multiple vendors. The reseller uses AAML Module 415 to analyze the customer's historical purchasing behavior, applying personalized pricing and offering a dynamic financial solution with flexible payment options tailored to the customer's procurement policies. The customer, utilizing the same interface, sees the bundle options with pricing recommendations directly within the system and can place an order immediately through the Order Management Sub-System 407. This integration of B2B and B2C processes allows the reseller to optimize its sales channels, reduce procurement complexity, and provide a personalized user experience to its end customers, all within the same platform.

Thereby, system 400 leverages SPoG UI 405, RTDM 410, and AAML 415 to provide a comprehensive solution for managing B2B and B2C transactions. It integrates data from multiple sources, processes it in real-time, and presents it through an intuitive interface, enabling resellers to manage their end-user business within their own environment. This innovative approach addresses the challenges of traditional IT distribution models and supports the industry's shift towards a more agile and efficient business environment, bringing together their own business into one place and providing a real-time, end-to-end view of both supply and customer interactions.

Figure 5:
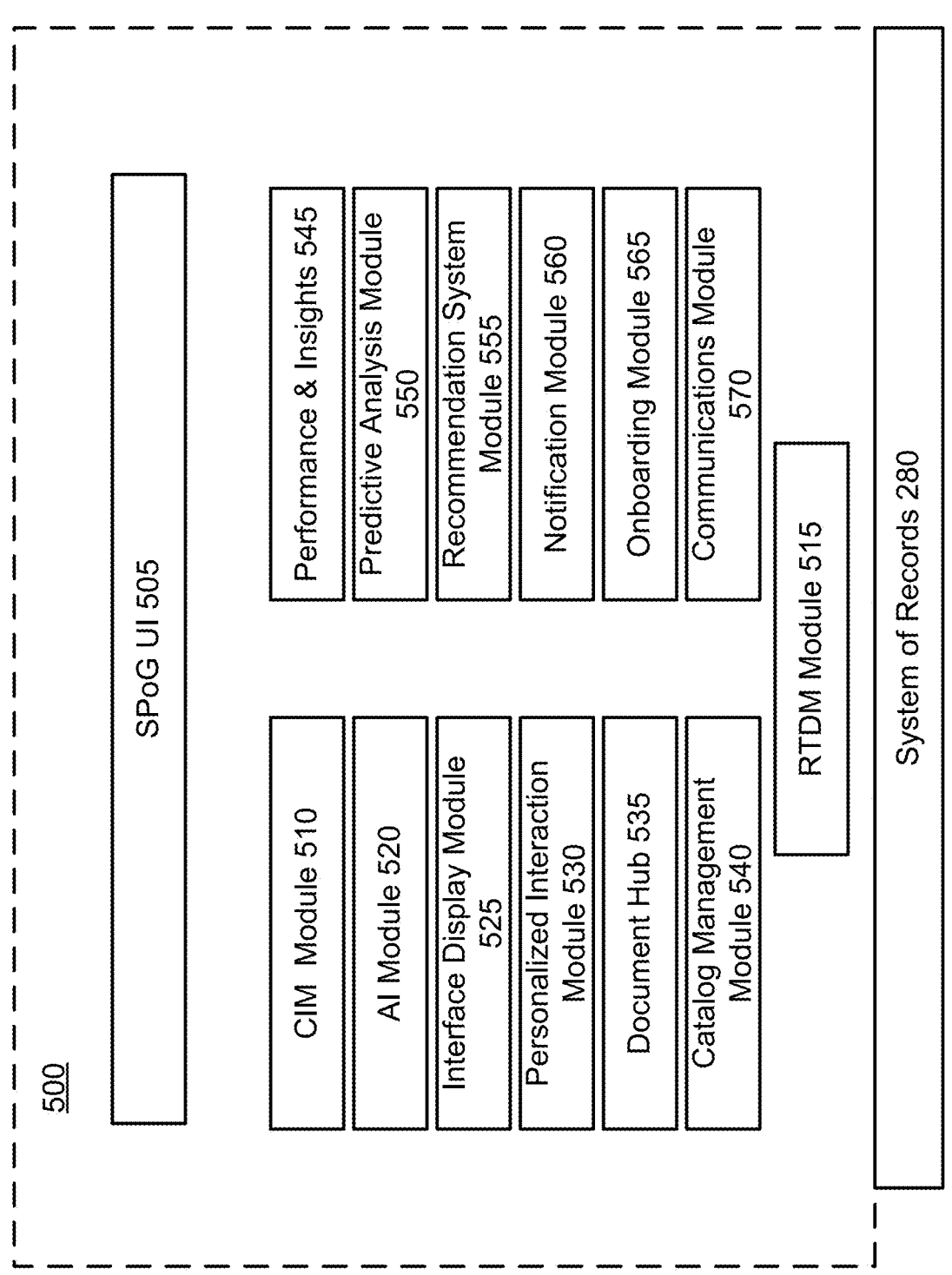
FIG. 5 illustrates an RTDM module, according to an embodiment.

FIG. 5 depicts an embodiment of an advanced distribution platform including System 500 for managing a complex distribution network, which can be an embodiment of System 300, and provides a technology distribution platform for optimizing the management and operation of distribution networks. System 500 includes several interconnected modules, each serving specific functions and contributing to the overall efficiency of supply chain operations. In some embodiments, these modules can include SPoG UI 505, CIM 510, RTDM module 515, AI module 520, Interface Display Module 525, Personalized Interaction Module 530, Document Hub 535, Catalog Management Module 540, Performance and Insight Markers Display 545, Predictive Analytics Module 550, Recommendation System Module 555, Notification Module 560, Self-Onboarding Module 565, and Communication Module 570.

System 500, as an embodiment of System 300, can use a range of technologies and algorithms to enable supply chain and distribution management. These technologies and algorithms facilitate efficient data processing, personalized interactions, real-time analytics, secure communication, and effective management of documents, catalogs, and performance metrics.

The SPoG UI 505, in some embodiments, serves as the central interface within System 500, providing users with a unified view of the entire distribution network. It utilizes frontend technologies such as ReactJS, TypeScript, and Node.js to create interactive and responsive user interfaces. These technologies enable the SPoG UI 505 to deliver a user-friendly experience, allowing users to access relevant information, navigate through different modules, and perform tasks efficiently.

The CIM 510, or Customer Interaction Module, employs algorithms and technologies such as Oracle Eloqua, Adobe Target, and Okta to manage customer relationships within the distribution network. These technologies enable the module to handle customer data securely, personalize customer experiences, and provide access control for users.

The RTDM module 515, or Real-Time Data Mesh module, is a component of System 500 that ensures the smooth flow of data across the distribution ecosystem. It utilizes technologies such as Apache Kafka, Apache Flink, or Apache Pulsar for data ingestion, processing, and stream management. These technologies enable the RTDM module 515 to handle real-time data streams, process large volumes of data, and ensure low-latency data processing. Additionally, the module employs Change Data Capture (CDC) mechanisms to capture real-time data updates from various transactional systems, such as legacy ERP systems and CRM systems. This capability allows users to access current and accurate information for informed decision-making.

The AI module 520 within System 500 can use advanced analytics and machine learning algorithms, including Apache Spark, TensorFlow, and scikit-learn, to extract valuable insights from data. These algorithms enable the module to automate repetitive tasks, predict demand patterns, optimize inventory levels, and improve overall supply chain efficiency. For example, the AI module 520 can utilize predictive models to forecast demand, allowing users to optimize inventory management and minimize stockouts or overstock situations.

The Interface Display Module 525 focuses on presenting data and information in a clear and user-friendly manner. It utilizes technologies such as HTML, CSS, and JavaScript frameworks like ReactJS to create interactive and responsive user interfaces. These technologies allow users to visualize data using various data visualization techniques, such as graphs, charts, and tables, enabling efficient data comprehension, comparison, and trend analysis.

The Personalized Interaction Module 530 utilizes customer data, historical trends, and machine learning algorithms to generate personalized recommendations for products or services. It employs technologies like Adobe Target, Apache Spark, and TensorFlow for data analysis, modeling, and delivering targeted recommendations. For example, the module can analyze customer preferences and purchase history to provide personalized product recommendations, enhancing customer satisfaction and driving sales.

The Document Hub 535 serves as a centralized repository for storing and managing documents within System 500. It utilizes technologies like SeeBurger and Elastic Cloud for efficient document management, storage, and retrieval. For instance, the Document Hub 535 can employ SeeBurger's document management capabilities to categorize and organize documents based on their types, such as contracts, invoices, product specifications, or compliance documents, allowing users to easily access and retrieve relevant documents when needed.

The Catalog Management Module 540 enables the creation, management, and distribution of current product catalogs. It ensures that users have access to the latest product information, including specifications, pricing, availability, and promotions. Technologies like Kentico and Akamai can be employed to facilitate catalog updates, content delivery, and caching. For example, the module can use Akamai's content delivery network (CDN) to deliver catalog information to users quickly and efficiently, regardless of their geographical location.

The Performance and Insight Markers Display 545 collects, analyzes, and visualizes real-time performance metrics and insights related to supply chain operations. It utilizes tools like Splunk and Datadog to enable effective performance monitoring and provide actionable insights. For instance, the module can utilize Splunk's log analysis capabilities to identify performance bottlenecks in the supply chain, enabling users to take proactive measures to optimize operations.

The Predictive Analytics Module 550 employs machine learning algorithms and predictive models to forecast demand patterns, optimize inventory levels, and enhance overall supply chain efficiency. It utilizes technologies such as Apache Spark and TensorFlow for data analysis, modeling, and prediction. For example, the module can utilize TensorFlow's deep learning capabilities to analyze historical sales data and predict future demand, allowing users to optimize inventory levels and minimize costs.

The Recommendation System Module 555 focuses on providing intelligent recommendations to users within the distribution network. It generates personalized recommendations for products or services based on customer data, historical trends, and machine learning algorithms. Technologies like Adobe Target and Apache Spark can be employed for data analysis, modeling, and delivering targeted recommendations. For instance, the module can use Adobe Target's recommendation engine to analyze customer preferences and behavior, and deliver personalized product recommendations across various channels, enhancing customer engagement and driving sales.

The Notification Module 560 enables the distribution of real-time notifications to users regarding important events, updates, or alerts within the supply chain. It utilizes technologies like Apigee X and TIBCO for message queues, event-driven architectures, and notification delivery. For example, the module can utilize TIBCO's messaging infrastructure to send real-time notifications to users' devices, ensuring timely and relevant information dissemination.

The Self-Onboarding Module 565 facilitates the onboarding process for new users entering the distribution network. It provides guided steps, tutorials, or documentation to help users become familiar with the system and its functionalities. Technologies such as Okta and Kentico can be employed to ensure secure user authentication, access control, and self-learning resources. For instance, the module can utilize Okta's identity and access management capabilities to securely onboard new users, providing them with appropriate access permissions and guiding them through the system's functionalities.

The Communication Module 570 enables communication and collaboration within System 500. It provides channels for users to interact, exchange messages, share documents, and collaborate on projects. Technologies like Apigee Edge and Adobe Launch can be employed to facilitate secure and efficient communication, document sharing, and version control. For example, the module can utilize Apigee Edge's API management capabilities to ensure secure and reliable communication between users, enabling them to collaborate effectively.

Thereby, System 500 can incorporate various modules that utilize a diverse range of technologies and algorithms to optimize supply chain and distribution management. These modules, including SPoG UI 505, CIM 510, RTDM module 515, AI module 520, Interface Display Module 525, Personalized Interaction Module 530, Document Hub 535, Catalog Management Module 540, Performance and Insight Markers Display 545, Predictive Analytics Module 550, Recommendation System Module 555, Notification Module 560, Self-Onboarding Module 565, and Communication Module 570, work together to provide end-to-end visibility, data-driven decision-making, personalized interactions, real-time analytics, and streamlined communication within the distribution network. The incorporation of specific technologies and algorithms enables efficient data management, secure communication, personalized experiences, and effective performance monitoring, contributing to enhanced operational efficiency and success in supply chain and distribution management.

Real Time Data Mesh

Figure 6:
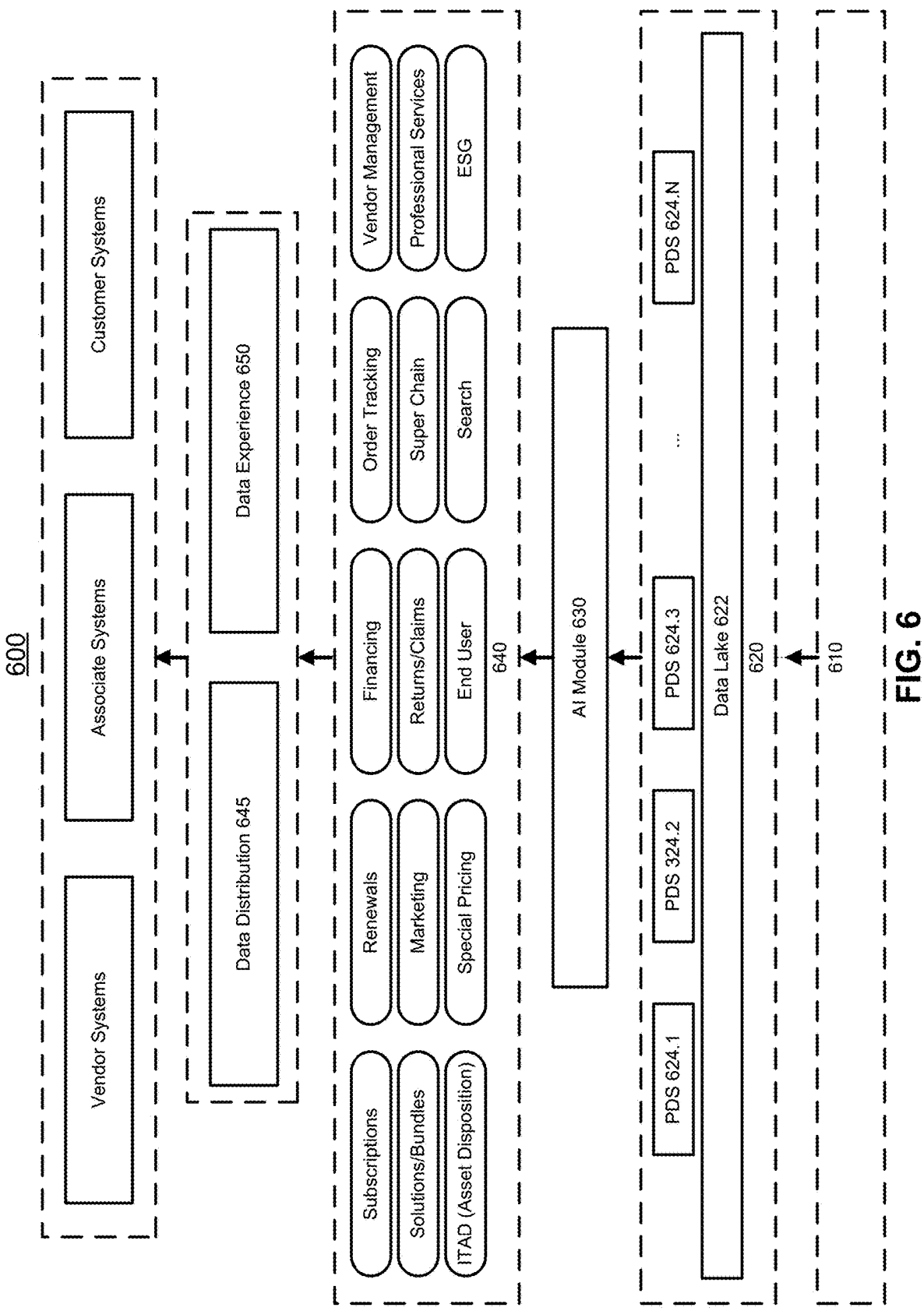
FIG. 6 illustrates a SPoG UI, according to an embodiment.

FIG. 6 illustrates RTDM module 600, according to an embodiment. RTDM module 600, which can be an embodiment of RTDM module 310, can include interconnected components, processes, and sub-systems configured to enable real-time data management and analysis.

The RTDM module 600, as depicted in FIG. 5, represents an effective data mesh and change capture component within the overall system architecture. The module can be configured to provide real-time data management and standardization capabilities, enabling efficient operations within the supply chain and distribution management domain.

RTDM module 600 can include an integration layer 610 (also referred to as a "system of records") that integrates with various enterprise systems. These enterprise systems can include ERPs such as SAP, Impulse, META, and I-SCALA, among others, and other data sources. Integration layer 610 can process data exchange and synchronization between RTDM module 600 and these systems. Data feeds can be established to retrieve relevant information from the system of records, such as sales orders, purchase orders, inventory data, and customer information. These feeds enable real-time data updates and ensure that the RTDM module operates with the most current and accurate data.

RTDM module 600 can include data layer 620 configured to process and translate data for retrieval and analysis. Data layer 620 includes data mesh, a cloud-based infrastructure configured to provide scalable and fault-tolerant data storage capabilities. Within the data mesh, multiple Purposive Datastores (PDS) can be deployed to store specific types of data, such as customer data, product data, or inventory data. Each PDS can be optimized for efficient data retrieval based on specific use cases and requirements. The PDSes can be configured to store specific types of data, such as customer data, product data, finance data, and more. These PDS serve as repositories for canonized and/or standardized data, ensuring data consistency and integrity across the system.

In some embodiments, RTDM module 600 implements a data replication mechanism to capture real-time changes from multiple data sources, including transactional systems like ERPs (e.g., SAP, Impulse, META, I-SCALA). The captured data can then be processed and standardized on-the-fly, transforming it into a standardized format suitable for analysis and integration. This process ensures that the data is readily available and current within the data mesh, facilitating real-time insights and decision-making.

More specifically, data layer 620 within the RTDM module 600 can be configured as a powerful and flexible foundation for managing and processing data within the distribution ecosystem. In some embodiments, data layer 620 can encompasses a highly scalable and robust data lake, which can be referred to as data lake 622, along with a set of purposive datastores (PDSes), which can be denoted as PDSes 624.1 to 624.N. These components integrate to ensure efficient data management, standardization, and real-time availability.

Data layer 620 incudes data lake 622, a state-of-the-art storage and processing infrastructure configured to handle the ever-increasing volume, variety, and velocity of data generated within the supply chain. Built upon a scalable distributed file system, such as Apache Hadoop Distributed File System (HDFS) or Amazon S3, the data lake provides a unified and scalable platform for storing both structured and unstructured data. Leveraging the elasticity and fault-tolerance of cloud-based storage, data lake 622 can accommodate the influx of data from diverse sources.

Associated with data lake 622, a population of purposive datastores, PDSes 624.1 to 624.N, can be employed. Each PDS 624 can function as a purpose-built repository optimized for storing and retrieving specific types of data relevant to the supply chain domain. In some non-limiting examples, PDS 624.1 may be dedicated to customer data, storing information such as customer profiles, preferences, and transaction history. PDS 624.2 may be focused on product data, encompassing details about SKU codes, descriptions, pricing, and inventory levels. These purposive datastores allow for efficient data retrieval, analysis, and processing, catering to the diverse needs of supply chain users.

To ensure real-time data synchronization, data layer 620 can be configured to employ one or more change data capture (CDC) mechanisms. These CDC mechanisms can be integrated with the transactional systems, such as legacy ERPs like SAP, Impulse, META, and I-SCALA, as well as other enterprise-wide systems. CDC constantly monitors these systems for any updates, modifications, or new transactions and captures them in real-time. By capturing these changes, data layer 620 ensures that the data within the data lake 622 and PDSes 624 remains current, providing users with real-time insights into the distribution ecosystem.

In some embodiments, data layer 620 can be implemented to facilitate integration with existing enterprise systems using one or more frameworks, such as. .NET or Java, ensuring compatibility with a wide range of existing systems and providing flexibility for customization and extensibility. For example, data layer 620 can utilize the Java technology stack, including frameworks like Spring and Hibernate, to facilitate integration with a system of records having a population of diverse ERP systems and other enterprise-wide solutions. This can facilitate smooth data exchange, process automation, and end-to-end visibility across the supply chain.

In terms of data processing and analytics, data layer 620 can use the capabilities of distributed computing frameworks, such as Apache Spark or Apache Flink in some non-limiting examples. These frameworks can enable parallel processing and distributed computing across large-scale datasets stored in the data lake and PDSes. By leveraging these frameworks, supply chain users can perform complex analytical tasks, apply machine learning algorithms, and derive valuable insights from the data. For instance, data layer 620 can use Apache Spark's machine learning libraries to develop predictive models for demand forecasting, optimize inventory levels, and identify potential supply chain risks.

In some embodiments, data layer 620 can incorporate robust data governance and security measures. Fine-grained access control mechanisms and authentication protocols ensure that only authorized users can access and modify the data within the data lake and PDSes. Data encryption techniques, both at rest and in transit, safeguard the sensitive supply chain information against unauthorized access. Additionally, data layer 620 can implement data lineage and audit trail mechanisms, allowing users to trace the origin and history of data, ensuring data integrity and compliance with regulatory requirements.

In some embodiments, data layer 620 can be deployed in a cloud-native environment, leveraging containerization technologies such as Docker and orchestration frameworks like Kubernetes. This approach ensures scalability, resilience, and efficient resource allocation. For example, data layer 620 can be deployed on cloud infrastructure provided by AWS, Azure, or Google Cloud, utilizing their managed services and scalable storage options. This allows for scaling of resources based on demand, minimizing operational overhead and providing an elastic infrastructure for managing supply chain data.

Data layer 620 of RTDM module 600 can incorporate a highly scalable data lake, data lake 622, along with purpose-built PDSes, PDSes 624.1 to 624.N, and employing CDC mechanisms, data layer 620 ensures efficient data management, standardization, and real-time availability. In a non-limiting example, Data Layer 620 can be implemented utilizing any appropriate technology, such as .NET or Java, and/or distributed computing frameworks like Apache Spark, enables powerful data processing, advanced analytics, and machine learning capabilities. With robust data governance and security measures, data layer 620 ensures data integrity, confidentiality, and compliance. Through its scalable infrastructure and integration with existing systems, data layer 620 enables supply chain users to make data-driven decisions, optimize operations, and drive business success in the dynamic and complex distribution environment.

RTDM module 600 can include an AI module 630 configured to implement one or more algorithms and machine learning models to analyze the stored data in data layer 620 and derive meaningful insights. In some non-limiting examples, AI module 630 can apply predictive analytics, anomaly detection, and optimization algorithms to identify patterns, trends, and potential risks within the supply chain. AI module 630 can continuously learns from new data inputs and adapts its models to provide accurate and current insights. AI module 630 can generate predictions, recommendations, and alerts and publish such insights to dedicated data feeds.

Data engine layer 640 comprises a set of interconnected systems responsible for data ingestion, processing, transformation, and integration. Data engine layer 640 of RTDM module 600 can include a collection of headless engines 640.1 to 640.N that operate autonomously. These engines represent distinct functionalities within the system and can include, for example, one or more recommendation engines, insights engines, and subscription management engines. Engines 640.1 to 640.N can use the standardized data stored in the data mesh to deliver specific business logic and services. Each engine can be configured to be pluggable, allowing for flexibility and future expansion of the module's capabilities. Exemplary engines are shorn in FIG. 5, which are not intended to be limiting. Any additional headless engine can be included in data engine layer 640 or in other exemplary layers of the disclosed system.

These systems can be configured to receive data from multiple sources, such as transactional systems, IoT devices, and external data providers. The data ingestion process involves extracting data from these sources and transforming it into a standardized format. Data processing algorithms can be applied to cleanse, aggregate, and enrich the data, making it ready for further analysis and integration.

Further, to facilitate integration and access to RTDM module 600, a data distribution mechanism can be employed. Data distribution mechanism 645 can be configured to include one or more APIs to facilitate distribution of data from the data mesh and engines to various endpoints, including user interfaces, micro front ends, and external systems.

Experience layer 650 focuses on delivering an intuitive and user-friendly interface for interacting with supply chain data. Experience layer 650 can include data visualization tools, interactive dashboards, and user-centric functionalities. Through this layer, users can retrieve and analyze real-time data related to various supply chain metrics such as inventory levels, sales performance, and customer demand. The user experience layer supports personalized data feeds, allowing users to customize their views and receive relevant updates based on their roles and responsibilities. Users can subscribe to specific data updates, such as inventory changes, pricing updates, or new SKU notifications, tailored to their preferences and roles.

Thereby, in some embodiments, RTDM module 600 for supply chain and distribution management can include an integration with a system of records and include one or more of a data layer with a data mesh and purposive datastores, an AI component, a data engine layer, and a user experience layer. These components work together to provide users with intuitive access to real-time supply chain data, efficient data processing and analysis, and integration with existing enterprise systems. The technical feeds and retrievals within the module ensure that users can retrieve relevant, current information and insights to make informed decisions and optimize supply chain operations. Accordingly, RTDM module 600 facilitates supply chain and distribution management by providing a scalable, real-time data management solution. Its innovative architecture allows for the rich integration of disparate data sources, efficient data standardization, and advanced analytics capabilities. The module's ability to replicate and standardize data from diverse ERPs, while maintaining auditable and repeatable transactions, provides a distinct advantage in enabling a unified view for vendors, resellers, customers, end customers, and other entities in a distribution system, including an IT distribution system.

End User View FOR B2B/B2C Modes

Figure 7:
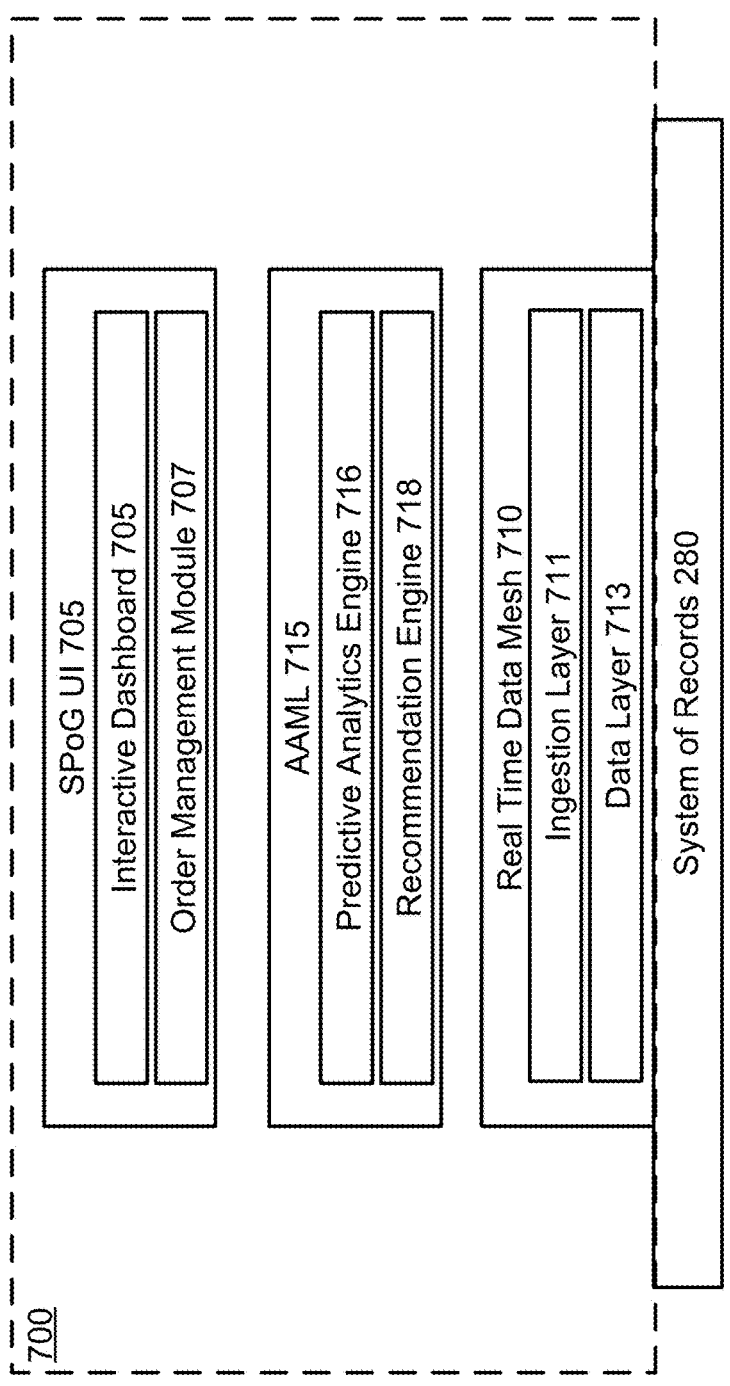
FIG. 7 illustrates a system for automated process for generating an end-user view for resellers according to an embodiment.

In an embodiment, FIG. 7 depicts system 700 configured to enable end-users to view and manage B2B and B2C transactions within a unified platform. System 700 provides a real-time, end-to-end solution for resellers to integrate their supply-side operations with end-user customer interactions. This system addresses the fragmented nature of traditional IT distribution models by offering a comprehensive and unified experience.

System 700 can include several key components such as the Single Pane of Glass User Interface (SPoG UI) 705, the Real-Time Data Mesh (RTDM) 710, and the Advanced Analytics and Machine Learning (AAML) Module 715. SPoG UI 705 can serve as the central interface for users, providing access to various functionalities through a unified and intuitive dashboard. This interface can be developed using web-based technologies, making it accessible from a variety of devices, including desktop computers, laptops, tablets, and smartphones.

In some embodiments, SPoG UI 705 can include an Interactive Dashboard 706 that provides a comprehensive view of all business activities. Interactive Dashboard 706 can integrate both supply chain data and customer interactions, enabling resellers to monitor and manage orders, inventory, and customer engagements in real-time, thus providing an agile and unified platform for end-to-end business management. SPoG UI 705 can also include an Order Management Sub-System 707. Order Management Sub-System 707 can facilitate the creation, tracking, and management of orders from both B2B and B2C customers. By consolidating order processing within the SPoG UI 705, resellers can efficiently handle transactions and reduce the complexity of managing multiple sales channels.

SPoG UI 705 can provide resellers with an integrated platform for managing both B2B and B2C transactions, offering end-users the ability to access tailored, personalized recommendations and bundled purchases combining hardware, software, and SaaS products. The platform supports real-time dynamic pricing and targeted financial solutions that reflect the customer's needs, making procurement similar to a B2C e-commerce experience but backed by the complex infrastructure required for B2B operations. Through this interface, resellers can create custom storefronts and offer product bundles tailored to individual customers or market segments.

RTDM 710 can function as the data integration layer, aggregating data from multiple sources such as vendor platforms, customer relationship management (CRM) systems, enterprise resource planning (ERP) systems, and third-party databases. RTDM 710 can standardize this data into a uniform format, ensuring consistency and accuracy across the platform. This data can include real-time inventory levels, pricing information, customer data, and transaction history.

RTDM 710 can facilitate end-to-end connectivity across B2B and B2C transactions by aggregating real-time data from vendor systems, CRM platforms, ERP systems, and third-party databases. This allows resellers to provide order fulfillment and manage inventory in real time, all while maintaining consistent, accurate insights into customer interactions. By integrating financial and operational data, the system provides resellers with the flexibility to offer complex, bundled transactions and dynamically adjust pricing based on market trends and customer data.

In some embodiments, RTDM 710 can include an Ingestion Layer 711 dedicated to the collection of data from various sources such as vendor platforms, CRM systems, ERP systems, and third-party databases. Data Aggregation Sub-System 711 ensures that all relevant data is integrated into a single platform, providing a holistic view of both supply-side and end-user activities. RTDM 710 can further include a Data Layer 713 that processes and updates data in real-time. Data Layer 713 ensures that the information presented on the SPoG UI 705 is maintained as current, enabling resellers to make informed decisions based on the latest data.

AAML 715 can act as the processing layer, employing advanced algorithms and machine learning models to analyze and interpret the data aggregated by RTDM 710. AAML 715 can provide functionalities such as predictive analytics, anomaly detection, and personalized recommendations. These capabilities can help resellers optimize their operations, forecast demand, and improve customer satisfaction.

AAML Module 715 can analyze data collected from RTDM 710 to deliver personalized recommendations for product bundles, targeted pricing models, and financial solutions that match the needs of each individual customer. For example, the system can dynamically bundle hardware, software, and SaaS subscriptions based on customer purchase history and real-time demand forecasts. The module can also recommend targeted financial solutions, including installment-based payments or volume-based discounts, specifically tailored for end customers in B2B and B2C environments.

AAML Module 715 can include a Predictive Analytics Engine 716. Predictive Analytics Engine 716 can analyze historical and current data to forecast demand and optimize inventory, helping resellers to adjust inventory levels accordingly. AAML Module 715 can also include a Recommendation Engine 718. Recommendation Engine 718 can generate personalized recommendations for inventory management, pricing strategies, and customer engagement, assisting resellers in making data-driven decisions.

When a user accesses SPoG UI 705, they can view a comprehensive dashboard displaying real-time data and insights from both their supply-side and end-user customer interactions. For example, a reseller can see current inventory levels, pending orders, customer interactions, and sales analytics all in one place. The interface can provide interactive charts and graphs, enabling users to drill down into specific data points for detailed analysis. SPoG UI 705 can also allow users to initiate actions such as creating quotes, placing orders, and managing customer accounts directly from the interface.

RTDM 710 can continuously ingest data from various sources, ensuring that the information displayed on SPoG UI 705 is current. In some embodiments, RTDM 710 can use data replication mechanisms to capture real-time changes from transactional systems, such as ERP and CRM systems. This data can be processed and harmonized, making it available for analysis and reporting.

AAML 715 can analyze the data in real-time, generating insights and recommendations that are displayed on SPoG UI 705. For example, AAML 715 can use machine learning models to predict future demand for specific products, allowing resellers to adjust their inventory levels accordingly. AAML 715 can also detect anomalies in transaction data, such as unusual spikes in order volume, and alert users to potential issues.

In some embodiments, system 700 can include additional modules to enhance its functionality. For example, a Vendor Management Module can facilitate real-time negotiation of pricing and terms directly within SPoG UI 705. This module can integrate with vendor systems to provide real-time updates on product availability and pricing. Another module, the Compliance Management Module, can ensure that all transactions comply with relevant regulations and standards, providing audit trails and automated compliance checks.

System 700 can also support integration with external systems and applications through APIs and data connectors, allowing users to extend the platform's capabilities and integrate it with their existing IT infrastructure. For example, resellers can integrate system 700 with their warehouse management systems to streamline order fulfillment processes.

The flexibility and scalability of system 700 make it suitable for a wide range of use cases in the IT distribution industry. By providing a unified platform for managing B2B and B2C transactions, system 700 can help resellers improve efficiency, reduce errors, and enhance customer satisfaction. Its real-time data integration and advanced analytics capabilities ensure that users have access to accurate and actionable information, enabling them to make informed decisions and respond quickly to changing market conditions.

In a non-limiting example, system 700 can be utilized by a technology distributor managing a mix of B2B and B2C customers. The distributor can interact via SPoG UI 705 to create custom storefronts where customers can browse a wide array of hardware, software, and SaaS offerings. The Interactive Dashboard 706 allows the distributor to view real-time inventory, pricing information, and customer purchase history, offering a consolidated view of their business activities.

For a specific B2B customer, the distributor uses RTDM 710 to gather real-time data from vendor systems and ERP platforms, ensuring that inventory levels and pricing information are up to date. The customer places a large order that bundles hardware and SaaS services. AAML Module 715 analyzes the customer's historical purchases and recommends a customized financial solution, offering tiered pricing based on the volume of the order and providing flexible payment terms. The system also generates personalized product recommendations, suggesting add-on services that complement the hardware purchased.

As the customer proceeds to checkout via the Order Management Sub-System 707, RTDM 710 verifies inventory availability and updates real-time pricing before confirming the transaction. The platform allows the distributor to provide both B2B-style bulk transactions and B2C-style personalization in an end-to-end process that optimizes the customer's procurement experience. This integration of both B2B and B2C capabilities enables the distributor to provide highly customized, flexible offerings while reducing operational complexity and maintaining real-time visibility into all transactional data.

Thereby, system 700 leverages SPoG UI 705, RTDM 710, and AAML 715 to provide a comprehensive solution for managing B2B and B2C transactions. It integrates data from multiple sources, processes it in real-time, and presents it through an intuitive interface, enabling resellers to manage their end-user business within their own environment. This innovative approach addresses the challenges of traditional IT distribution models and supports the industry's shift towards a more agile and efficient business environment, bringing together their own business into one place and providing a real-time, end-to-end view of both supply and customer interactions.

Figure 8:
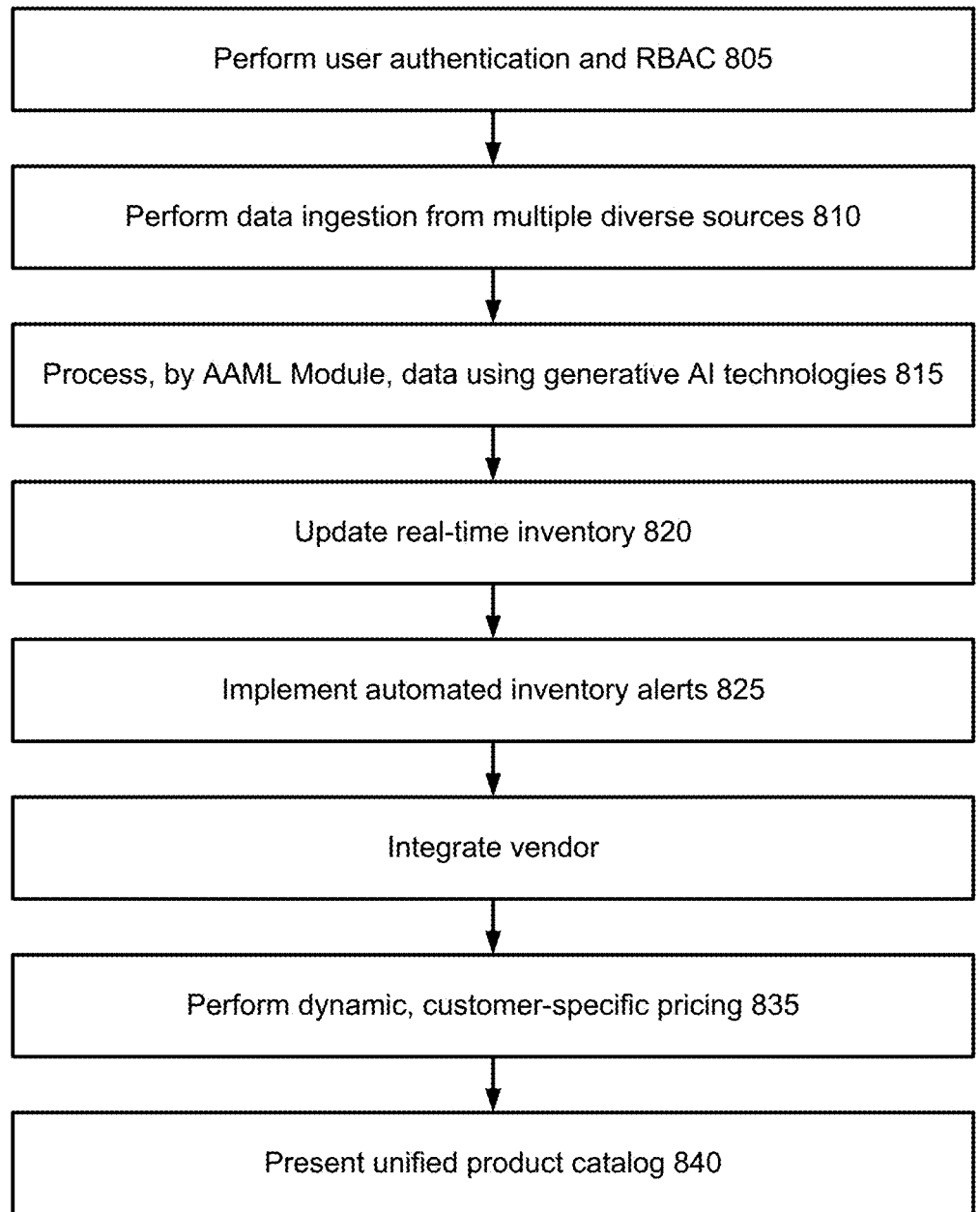
FIG. 8 is a flow diagram of a method or dynamically managing SKUs and synchronizing inventory levels across multiple channels in real-time, providing a comprehensive view for B2B and B2C transactions, according to some embodiments of the present disclosure.

FIG. 8 illustrates a method 800 for dynamically managing SKUs and synchronizing inventory levels across multiple channels in real-time, providing a comprehensive view for both B2B and B2C transactions. This method can utilize generative AI technologies within the Advanced Analytics and Machine Learning (AAML) module to aggregate data into a canonical, agnostic format.

Method 800 can begin with Operation 805, which can include user authentication and role-based access control. Users can authenticate through a secure login process, which can utilize multi-factor authentication (MFA) for enhanced security. Role-based access control mechanisms can then be applied to grant appropriate access levels based on user roles, such as reseller, vendor, or end-customer. This ensures that users can only access data and perform actions relevant to their specific roles.

Operation 810 can include the ingestion of data from multiple sources. The Real-Time Data Mesh (RTDM) can ingest data from vendor platforms, customer relationship management (CRM) systems, enterprise resource planning (ERP) systems, and third-party databases. The RTDM can aggregate this data continuously, ensuring that it is current. Data ingestion can use APIs and secure data connectors to facilitate integration with these external systems.

In Operation 815, the ingested data can be processed using generative AI technologies within the AAML module. These AI technologies can aggregate and transform the data into a canonical, agnostic format. This can include harmonizing the data by applying predefined rules and schemas, which can ensure consistency and accuracy across the platform. The generative AI can analyze the incoming data streams, identify patterns, and make real-time adjustments to the data schema as needed.

Operation 820 can include updating real-time inventory levels. The system can continuously synchronize inventory levels across all sales channels, including online stores, wholesale portals, and retail locations. The RTDM can provide real-time data replication mechanisms to capture changes in inventory levels as they occur. This ensures that the inventory data reflected in the Single Pane of Glass User Interface (SPoG UI) is always current.

In Operation 825, automated stock alerts can be implemented. The system can generate automated alerts for low stock levels, overstock situations, and stockouts based on predefined thresholds. These alerts can be communicated to users through the SPoG UI, allowing them to take immediate action. For example, a reseller can receive an alert when inventory levels fall below a critical threshold, prompting them to reorder stock from the vendor.

Operation 830 can include vendor integration. The system can integrate with vendor systems to automatically update SKU details and inventory levels based on real-time data from supplier feeds. This integration can use APIs to pull data from vendor databases and update the RTDM accordingly. This ensures that SKU information is always accurate and up-to-date, reducing the need for manual updates and minimizing the risk of errors.

In Operation 835, customer-specific pricing can be configured. The system can apply dynamic pricing rules within the AAML module to provide personalized pricing for different customer segments. For example, bulk discounts can be applied for B2B clients, while promotional pricing can be offered to B2C customers. These pricing rules can be managed through the SPoG UI, allowing users to adjust pricing strategies in real-time based on market conditions and inventory levels.

Operation 840 can include presenting a unified product catalog. The SPoG UI can display a unified product catalog that dynamically adjusts based on user roles. For instance, B2B users can see products and prices tailored to wholesale transactions, while B2C users can see retail products and pricing. The catalog can be interactive, allowing users to filter and search for products based on various criteria such as category, price range, and availability.

Throughout the method, the SPoG UI can serve as the central interface for users, providing access to various functionalities through a unified and intuitive dashboard. This interface can be developed using web-based technologies, making it accessible from a variety of devices, including desktop computers, laptops, tablets, and smartphones. The SPoG UI can provide interactive charts, graphs, and tables, enabling users to drill down into specific data points for detailed analysis.

The flexibility and scalability of method 800 can make it suitable for a wide range of use cases in the IT distribution industry. By providing a unified platform for managing B2B and B2C transactions, method 800 can help resellers improve efficiency, reduce errors, and enhance customer satisfaction. Its real-time data integration and advanced analytics capabilities can ensure that users have access to accurate and actionable information, enabling them to make informed decisions and respond quickly to changing market conditions.

Thereby, method 800 can leverage SPoG UI 405, RTDM 410, and AAML 415 to provide a comprehensive solution for managing B2B and B2C transactions. It can integrate data from multiple sources, process it in real-time using generative AI technologies, and present it through an intuitive interface. This enables resellers to manage their end-user business within their own environment, bringing together their own business into one place and providing a real-time, end-to-end view of both supply and customer interactions.

Figure 9:
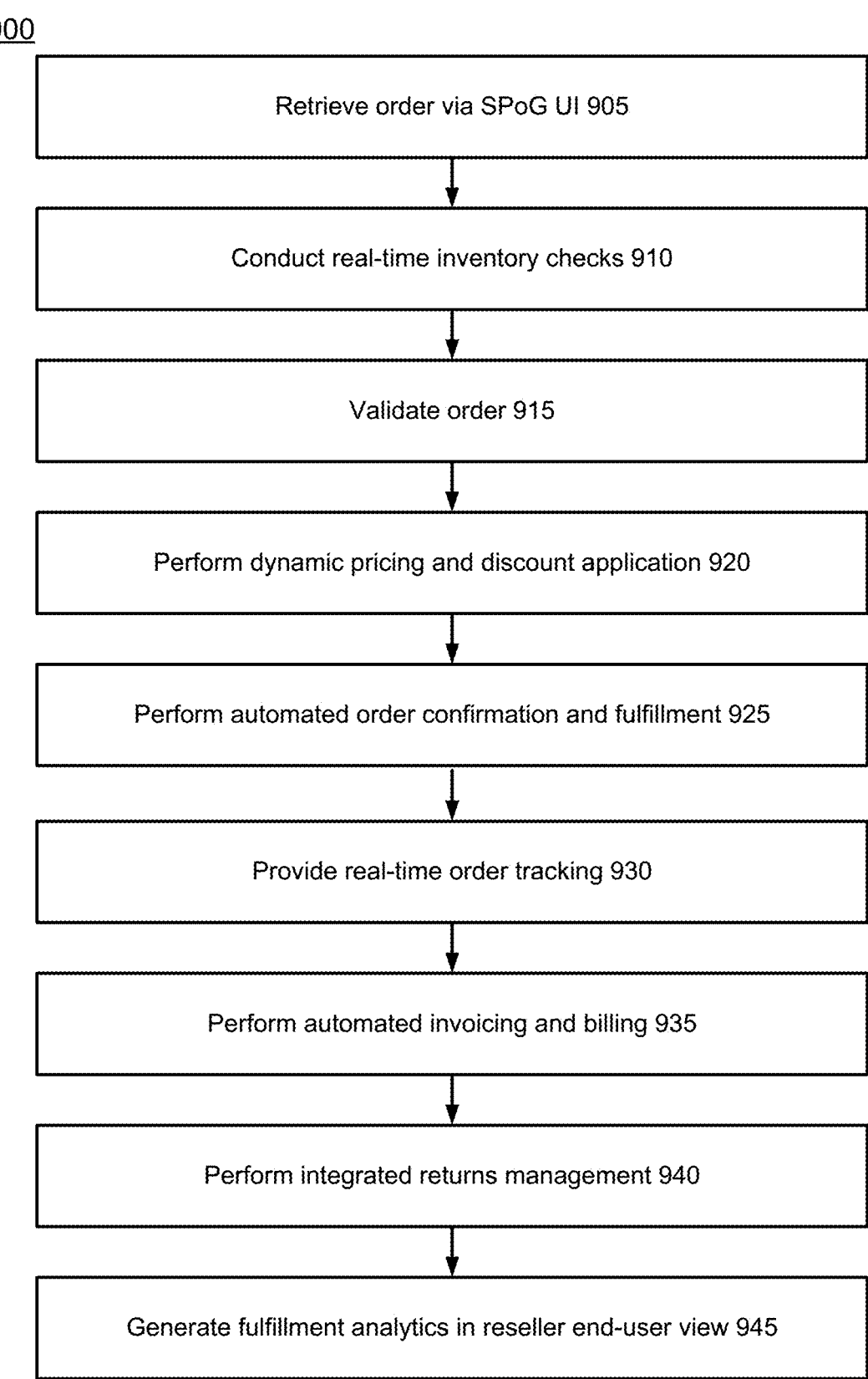
FIG. 9 is a flow diagram for automated processes for processing and fulfilling orders from B2B and B2C customers, according to some embodiments of the present disclosure.

FIG. 9 illustrates a method 900 for processing and fulfilling orders from both B2B and B2C customers, ensuring an integrated view and streamlined operations. This method can utilize generative AI technologies within the Advanced Analytics and Machine Learning (AAML) module to optimize the entire order processing workflow.

Method 900 can begin with Operation 905, which can include order placement through the Single Pane of Glass User Interface (SPoG UI). Users, whether B2B clients or B2C customers, can place orders by selecting products, specifying quantities, and choosing delivery options. The SPoG UI can provide a user-friendly interface that dynamically adjusts based on the user's role and the type of transaction.

Operation 910 can include real-time inventory checks. Once an order is placed, the system can use the Real-Time Data Mesh (RTDM) to check real-time inventory levels across multiple warehouses and vendor systems. This ensures that the system only allows orders for products that are currently available, reducing the risk of over-selling and stockouts.

In Operation 915, the system can validate the order details. The AAML module can apply predefined business rules and validation algorithms to ensure that the order meets all necessary criteria. This can include verifying customer information, checking payment details, and confirming shipping addresses. Any discrepancies or issues can be flagged for user review through the SPoG UI.

Operation 920 can include dynamic pricing and discount application. The system can apply dynamic pricing rules and discounts based on real-time data from the RTDM. For B2B clients, this can include volume discounts and negotiated pricing terms, while B2C customers can benefit from promotional offers and discounts. The AAML module can optimize these pricing strategies based on current market conditions and inventory levels.

Operation 925 can include order confirmation and fulfillment initiation. Once the order is validated and priced, the system can confirm the order and trigger the fulfillment process. The RTDM can update inventory levels in real-time to reflect the new order, and the system can notify the relevant warehouse or vendor to prepare the shipment. This ensures that the order is processed quickly and efficiently.

In Operation 930, the system can provide real-time order tracking. Customers and resellers can track the status of their orders through the SPoG UI, which displays updates from the logistics and shipping partners integrated with the system. This can include information such as shipment status, estimated delivery times, and any exceptions or delays.

Operation 935 can include automated invoicing and billing. The system can generate invoices and billing statements tailored to the specific terms and conditions of B2B and B2C transactions. These documents can be automatically sent to the customers and made available in their accounts within the SPoG UI. The invoicing process can also integrate with the user's accounting systems to ensure accurate financial records.

Operation 940 can include integrated returns management. The system can allow both B2B and B2C customers to initiate returns and track return statuses directly through the SPoG UI. The AAML module can analyze return patterns to identify potential issues with products or processes, helping to reduce future returns and improve customer satisfaction.

Operation 945 can include fulfillment analytics. The AAML module can analyze fulfillment data to identify bottlenecks, optimize shipping routes, and forecast future fulfillment needs. These insights can be presented to users through the SPoG UI, enabling them to make data-driven decisions to improve efficiency and reduce costs.

Throughout method 900, the SPoG UI can serve as the central interface for users, providing a unified view of all order processing and fulfillment activities. This interface can be developed using web-based technologies, making it accessible from various devices, including desktop computers, laptops, tablets, and smartphones. The SPoG UI can provide interactive visualizations and real-time updates, allowing users to monitor and manage their orders effectively.

The integration of generative AI technologies within the AAML module can enhance the system's ability to process and fulfill orders efficiently. By analyzing large volumes of data and identifying patterns, the AAML module can optimize pricing strategies, validate orders, and improve fulfillment processes. This ensures that method 900 provides an integrated solution for managing B2B and B2C transactions.

Thereby, method 900 can leverage SPoG UI 405, RTDM 410, and AAML 415 to provide a comprehensive solution for order processing and fulfillment integration. It can include order placement, real-time inventory checks, dynamic pricing, order validation, order confirmation, real-time tracking, automated invoicing, returns management, and fulfillment analytics. This enables resellers to manage their end-user business within their own environment, providing a real-time, end-to-end view of both supply and customer interactions.

Figure 10:
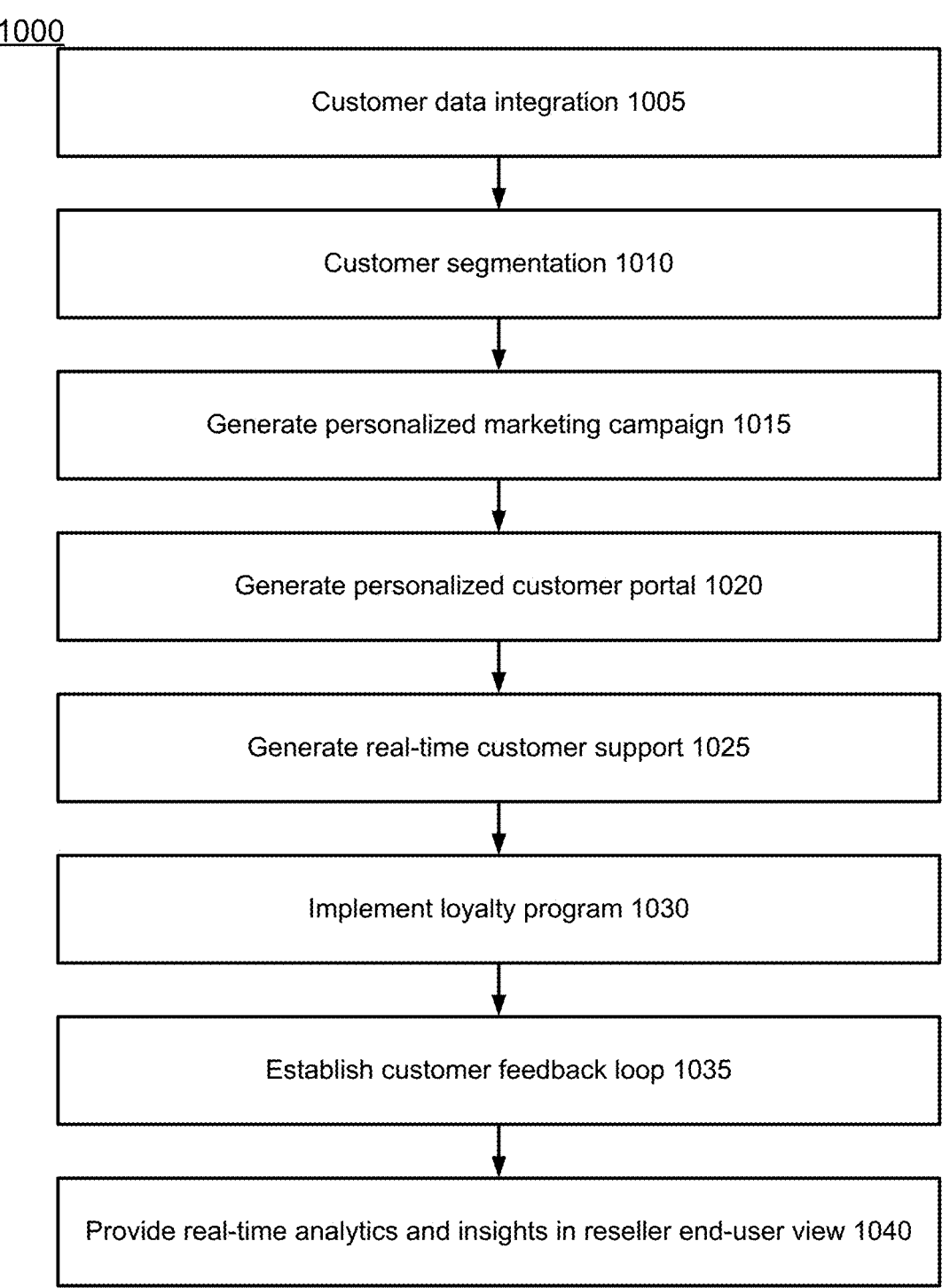
FIG. 10 is a flow diagram for automated personalization of customer interactions and engagement for B2B and B2C customers, according to some embodiments of the present disclosure.

FIG. 10 illustrates a method 1000 for personalizing customer interactions and engagement for both B2B and B2C customers, leveraging data analytics and machine learning. This method can utilize generative AI technologies within the Advanced Analytics and Machine Learning (AAML) module to enhance the personalization and effectiveness of customer engagement strategies.

Method 1000 can begin with Operation 1005, which can include customer data integration. The Real-Time Data Mesh (RTDM) can ingest data from multiple sources, such as customer relationship management (CRM) systems, enterprise resource planning (ERP) systems, sales records, and third-party databases. This data can be aggregated and standardized into a canonical, agnostic format by the AAML module, ensuring consistency and accuracy.

Operation 1010 can include customer segmentation. The AAML module can apply machine learning algorithms to analyze the integrated customer data and segment customers into distinct groups based on various criteria, such as purchase history, engagement levels, and demographics. These segments can be dynamic, updating in real-time as new data is ingested.

In Operation 1015, the system can create personalized marketing campaigns. Using the insights gained from customer segmentation, the system can generate targeted marketing campaigns tailored to the specific needs and preferences of each customer segment. These campaigns can include personalized product recommendations, targeted promotions, and customized content. The campaigns can be managed and executed through the Single Pane of Glass User Interface (SPoG UI).

Operation 1020 can include customization of the customer portal. The SPoG UI can provide a personalized experience for each customer, displaying customized dashboards, order histories, and product recommendations based on their segment and interaction history. This ensures that customers receive a relevant and engaging experience every time they interact with the platform.

Operation 1025 can include real-time customer support. The system can integrate real-time customer support features such as live chat, chatbots, and help desk systems into the SPoG UI. These support tools can be powered by the AAML module, which can analyze customer inquiries and provide immediate, context-aware responses. This ensures that customers receive timely and accurate assistance, improving their overall experience.

Operation 1030 can include the implementation of loyalty programs. The system can design and manage loyalty programs that reward both B2B and B2C customers for their purchases and engagement. These programs can offer personalized rewards and incentives based on customer behavior and preferences, tracked and managed through the SPoG UI. The AAML module can analyze loyalty program data to optimize rewards and identify opportunities for increasing customer loyalty.

In Operation 1035, the system can establish a customer feedback loop. The SPoG UI can provide mechanisms for collecting customer feedback through surveys, reviews, and support interactions. The AAML module can analyze this feedback to identify trends and areas for improvement. Actionable insights derived from this analysis can be presented to users through the SPoG UI, enabling them to make informed decisions to enhance products, services, and customer experiences.

Operation 1040 can include real-time analytics and insights. The AAML module can continuously analyze customer interaction data to generate real-time insights on customer behavior, preferences, and trends. These insights can be displayed on the SPoG UI, helping users to understand their customers better and make data-driven decisions to improve engagement and satisfaction.

Throughout method 1000, the SPoG UI can serve as the central interface for users, providing a unified and personalized view of all customer interactions and engagement activities. This interface can be developed using web-based technologies, making it accessible from various devices, including desktop computers, laptops, tablets, and smartphones. The SPoG UI can provide interactive visualizations, real-time updates, and actionable insights, allowing users to effectively manage and enhance customer engagement.

The integration of generative AI technologies within the AAML module can significantly enhance the personalization and effectiveness of customer engagement strategies. By analyzing large volumes of data and generating real-time insights, the AAML module can help users understand their customers better, create more effective marketing campaigns, and deliver personalized experiences. This ensures that method 1000 provides a comprehensive and integrated solution for managing customer interactions and engagement in both B2B and B2C contexts.

Thereby, method 1000 can leverage SPoG UI 405, RTDM 410, and AAML 415 to provide a comprehensive solution for personalized customer interaction and engagement. It can include customer data integration, segmentation, personalized marketing, customized portals, real-time support, loyalty programs, feedback loops, and real-time analytics. This enables resellers to manage their end-user business within their own environment, providing a real-time, end-to-end view of both supply and customer interactions, and enhancing overall customer satisfaction and loyalty.

Figure 11:
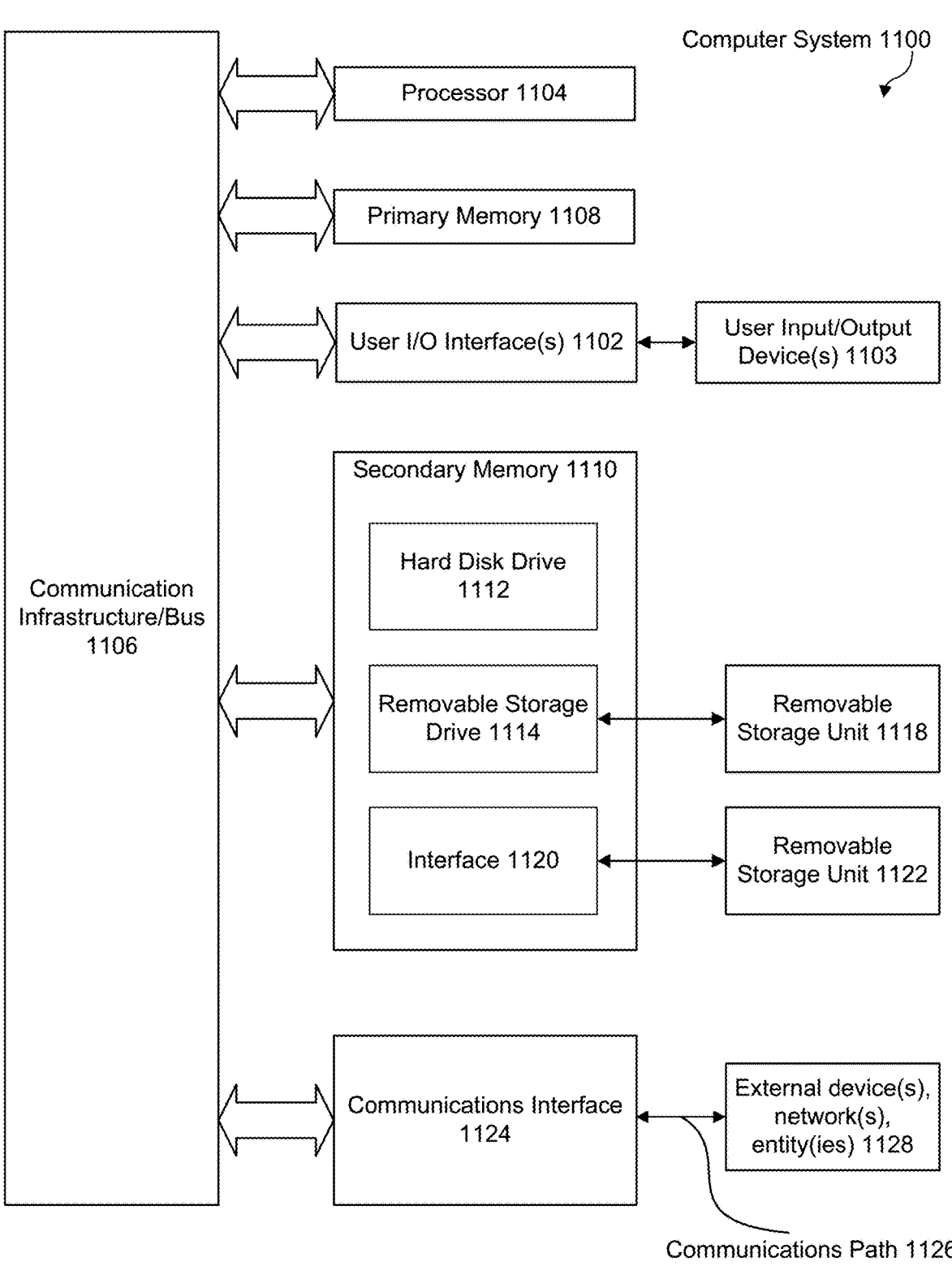
FIG. 11 is a block diagram of example components of device, according to some embodiments of the present disclosure.

FIG. 11 depicts a block diagram of example components of device 1100. One or more computer systems 1100 may be used, for example, to implement any of the embodiments discussed herein, as well as combinations and sub-combinations thereof. Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more processors 1104 may be a graphics processing unit (GPU). In an embodiment, a GPU may be a processor that can be a specialized electronic circuit configured to process mathematically intensive applications. The GPU may have a parallel structure that can be efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114.

Removable storage drive 1114 may interact with a removable storage unit 1118. Removable storage unit 1118 may include a computer-usable or readable storage device having stored thereon computer software (control logic) and/or data. Removable storage unit 1118 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Figure 12A:
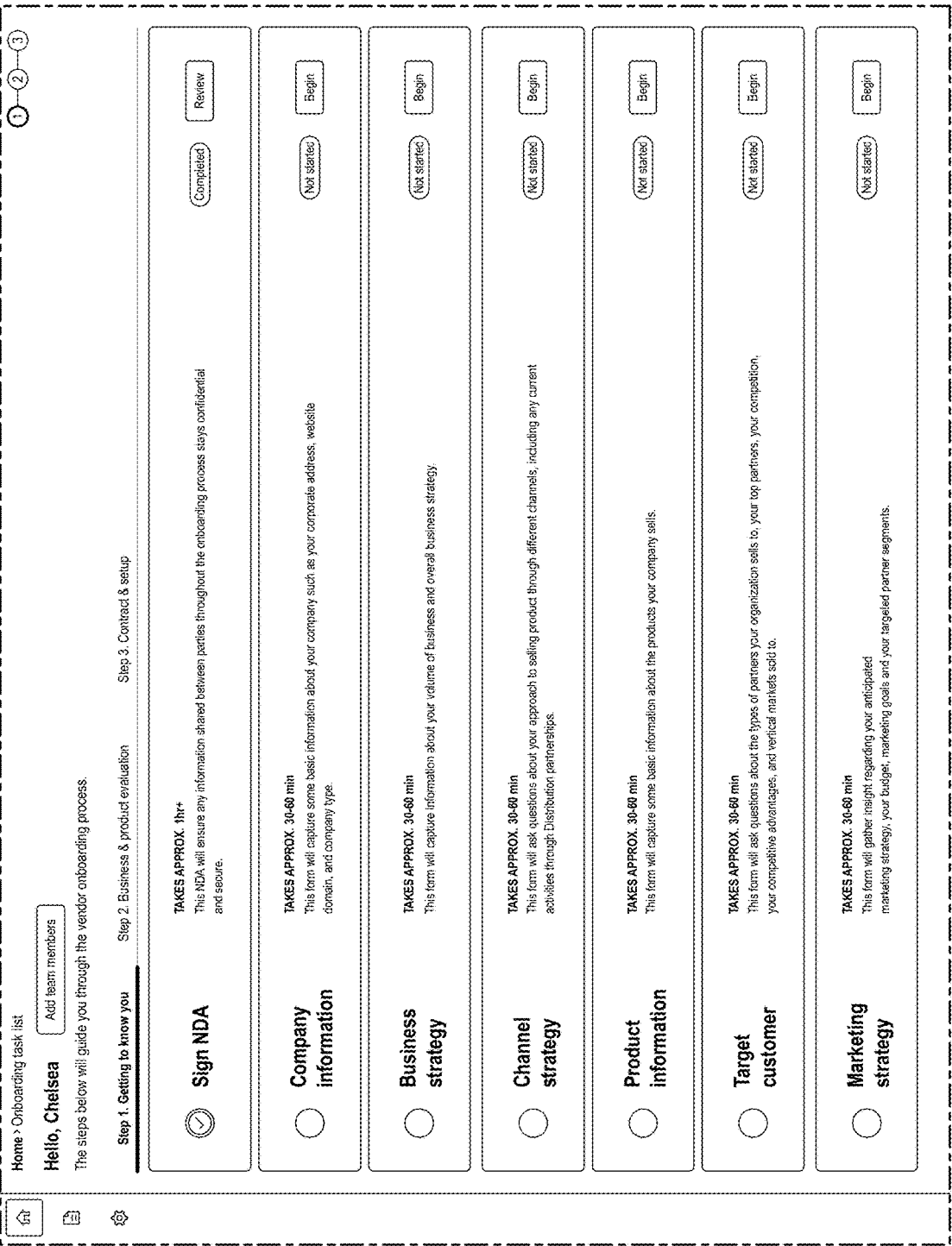
FIGS. 12A to 12Q depict various screens and functionalities of the SPoG UI, according to some embodiments.
Figure 12B:
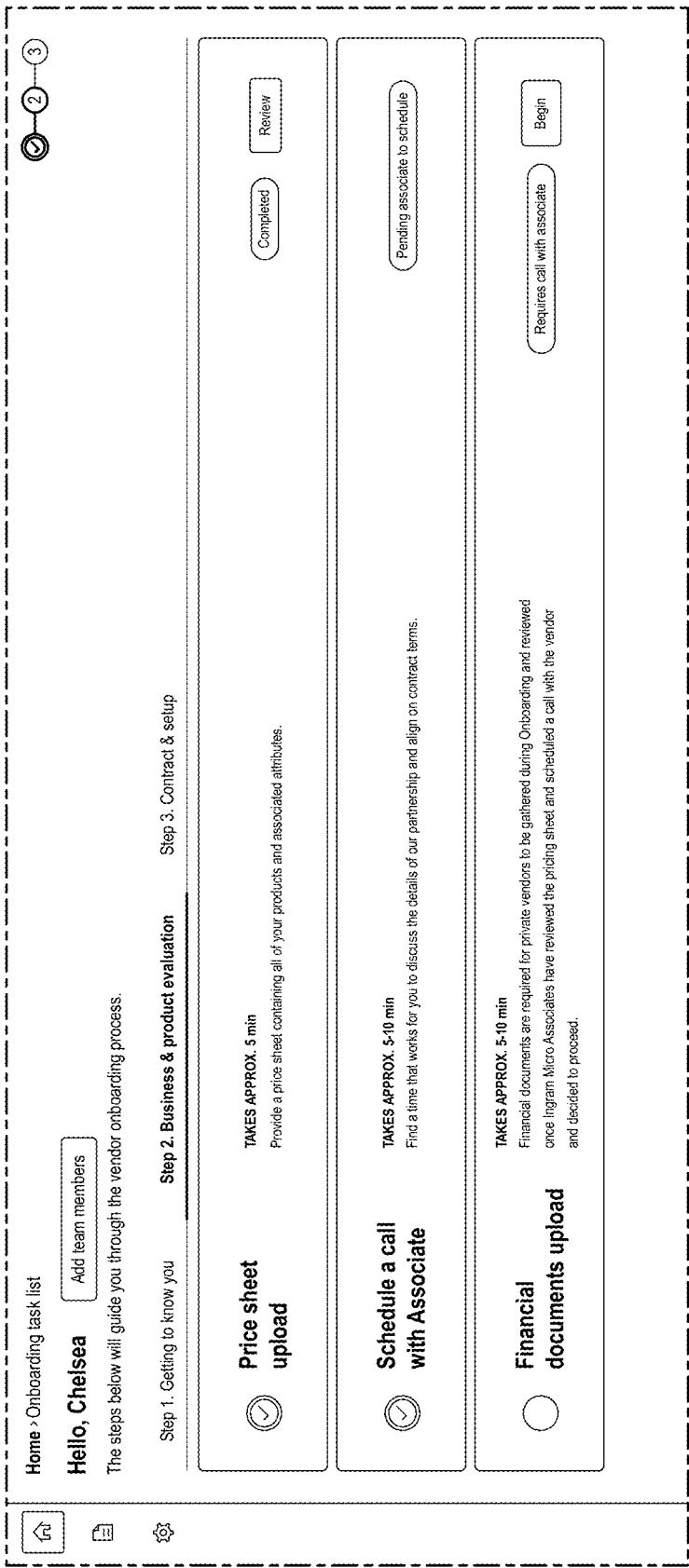
Figure 12C:
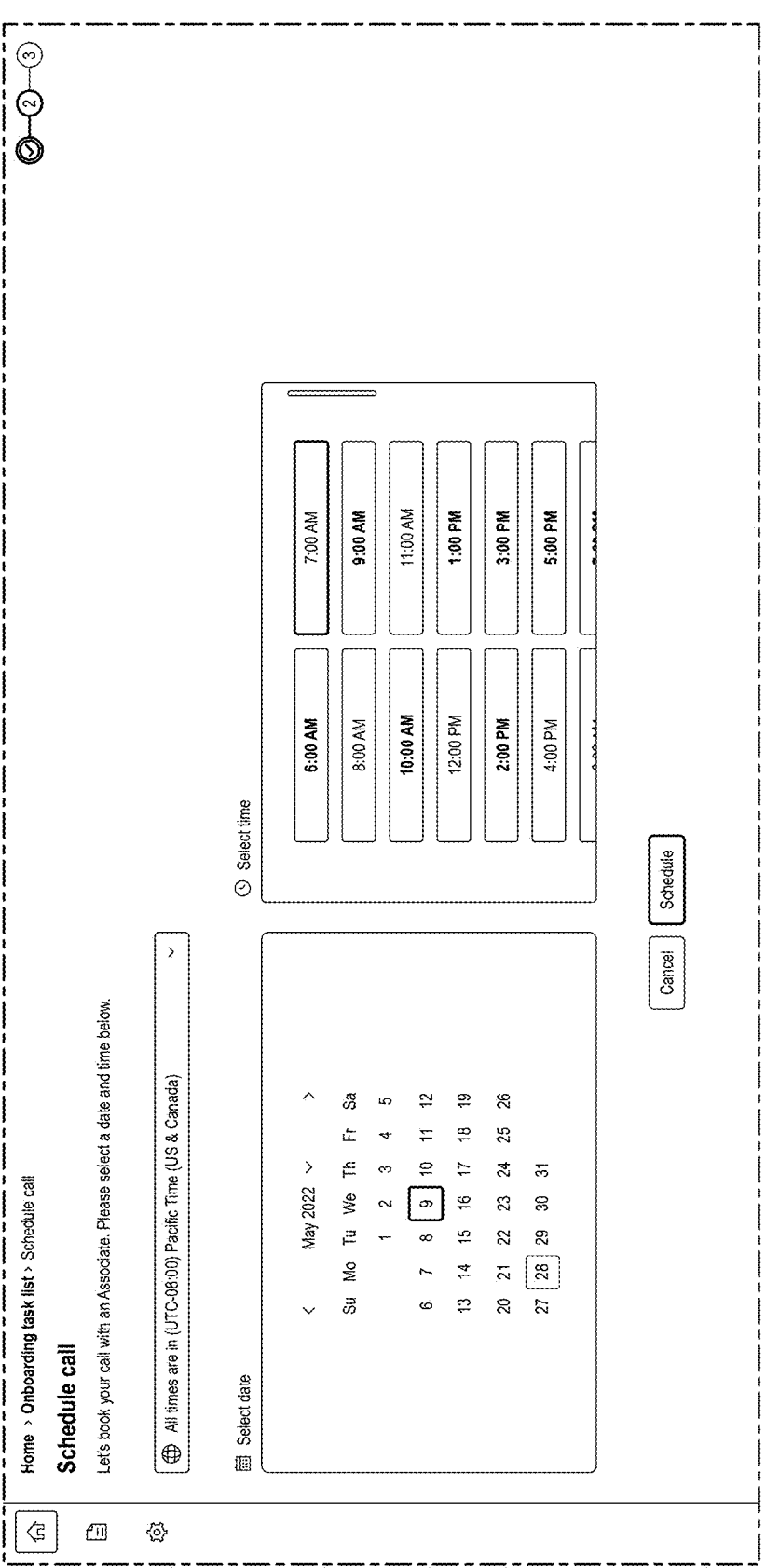
Figure 12D:
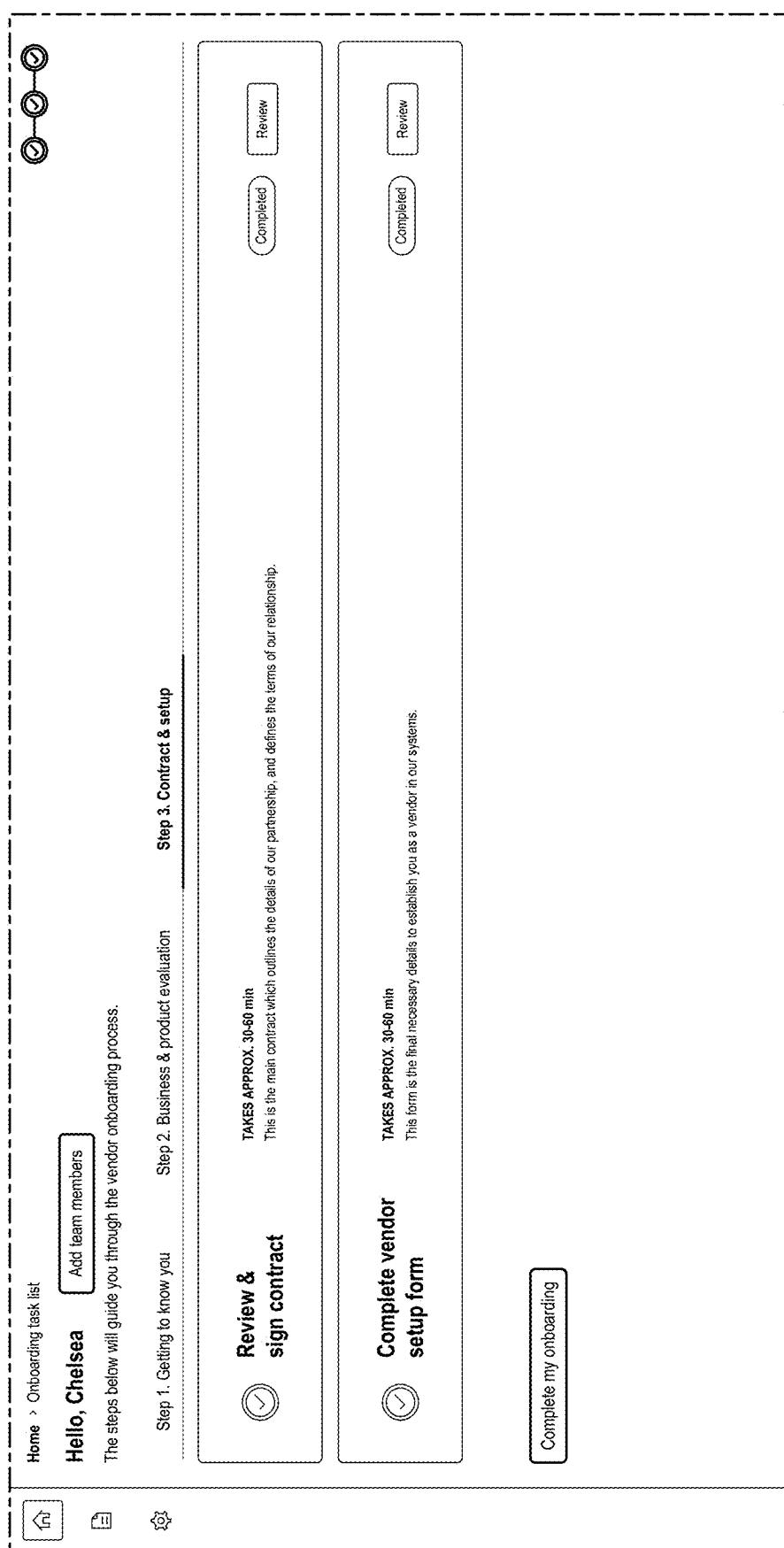
Figure 12E:
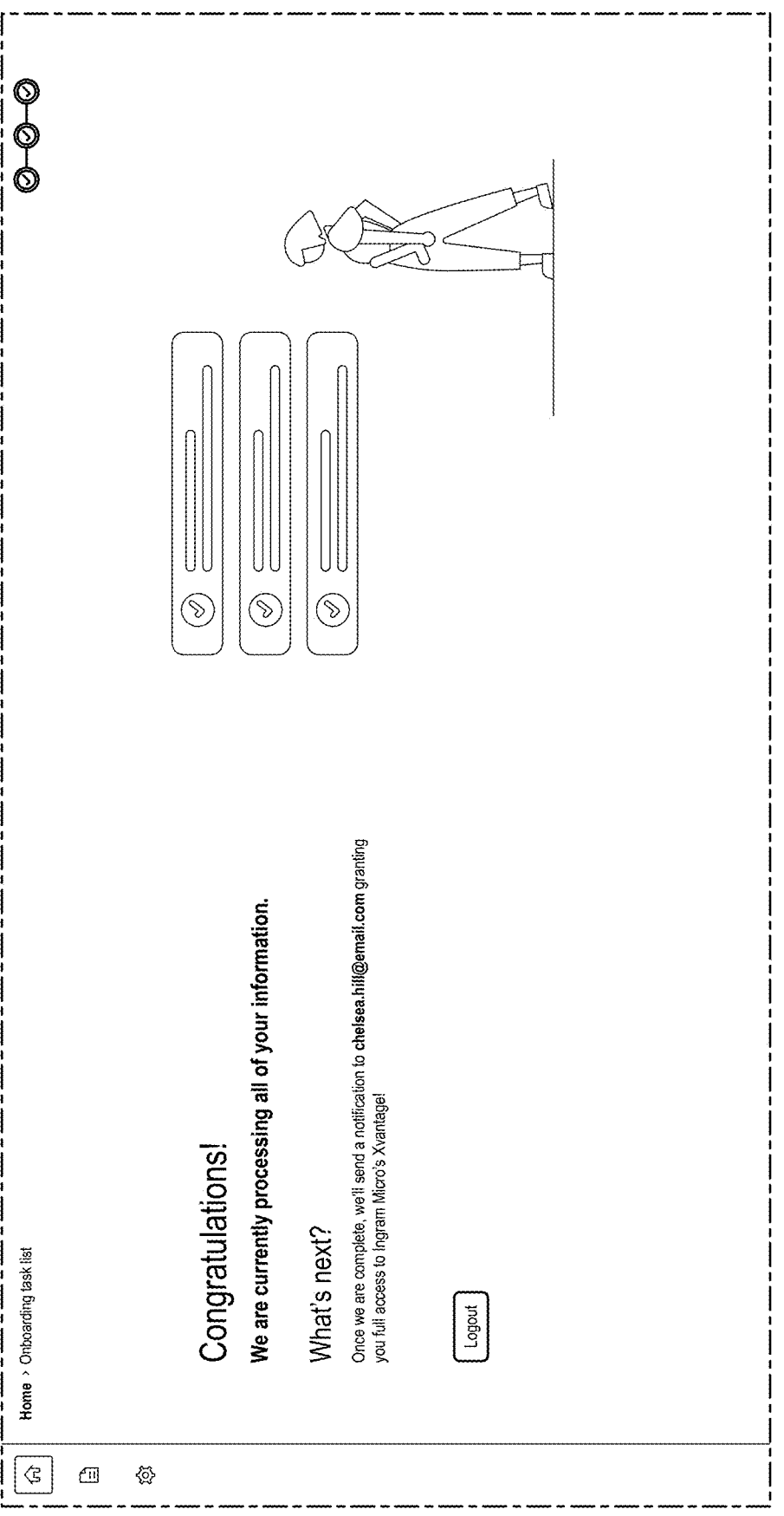
Figure 12F:
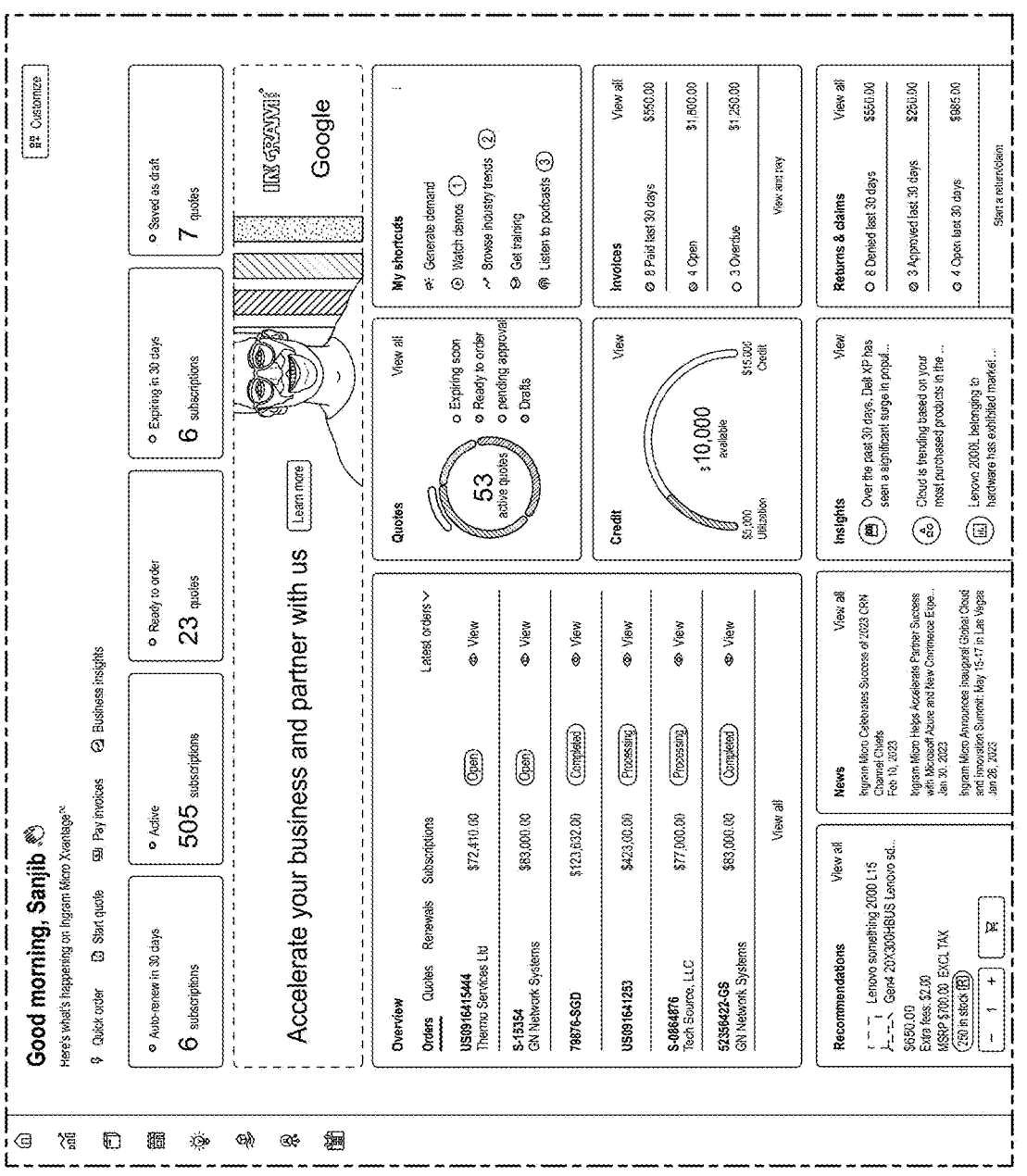
Figure 12G:
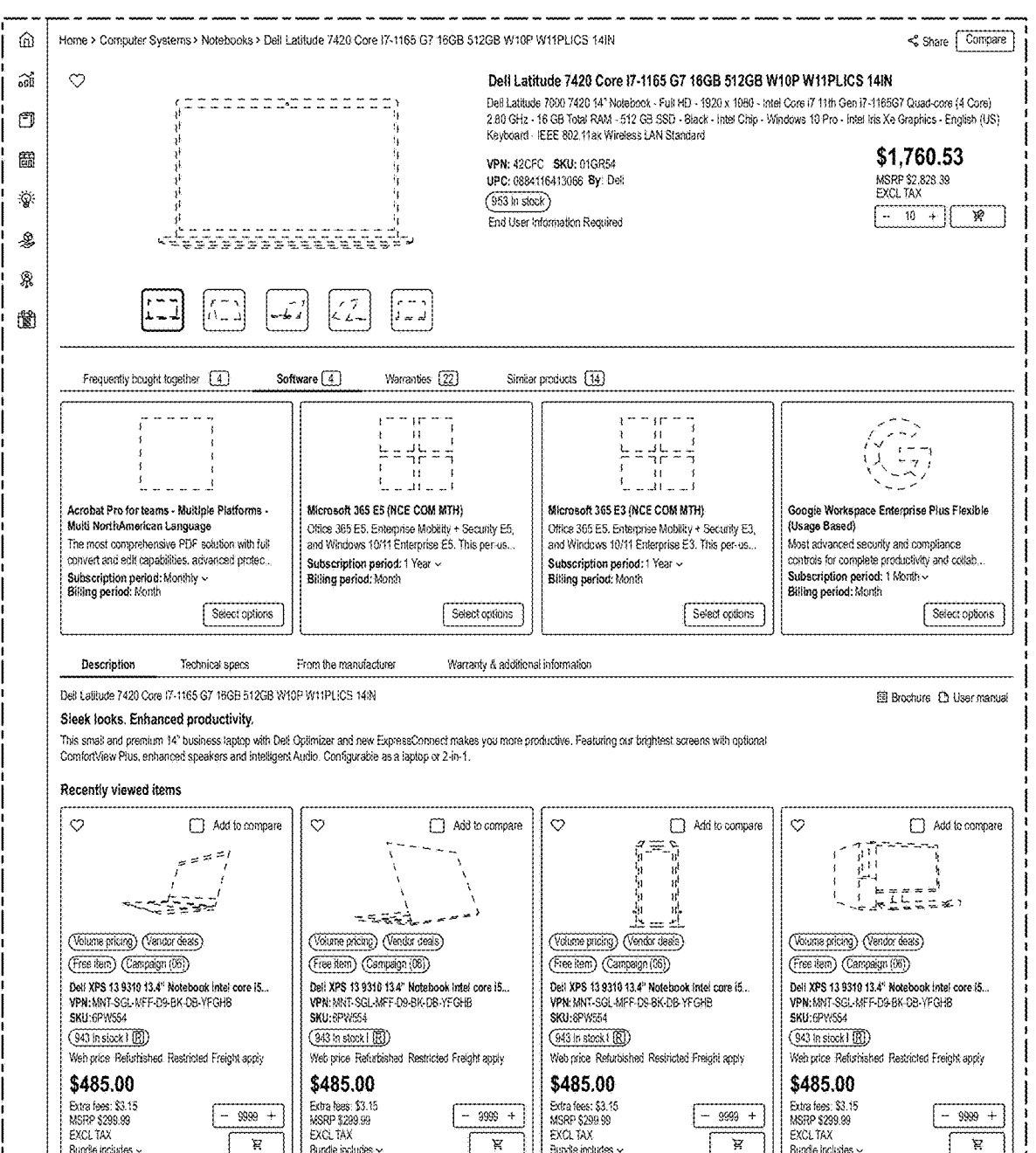
Figure 12H:
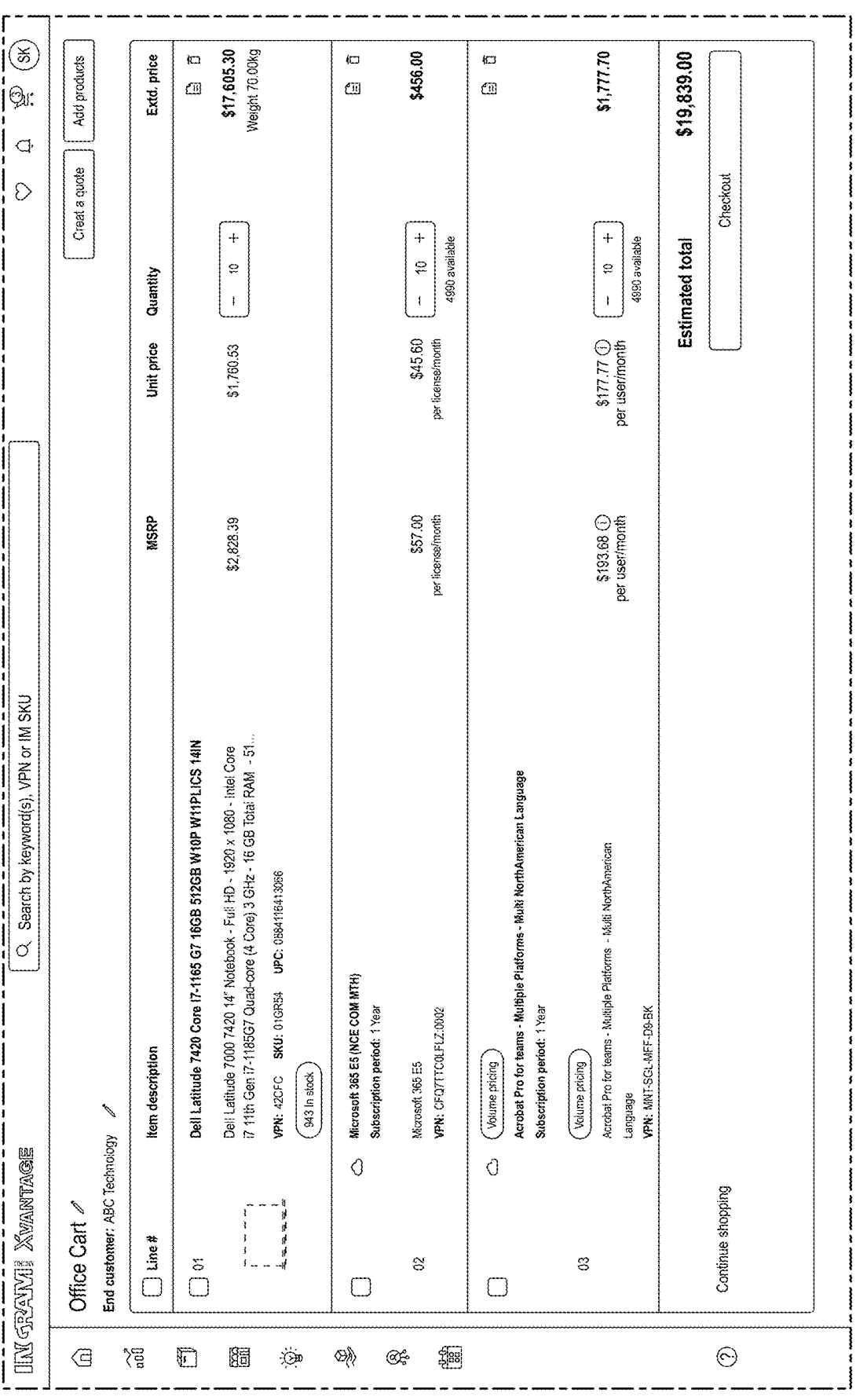
Figure 12J:
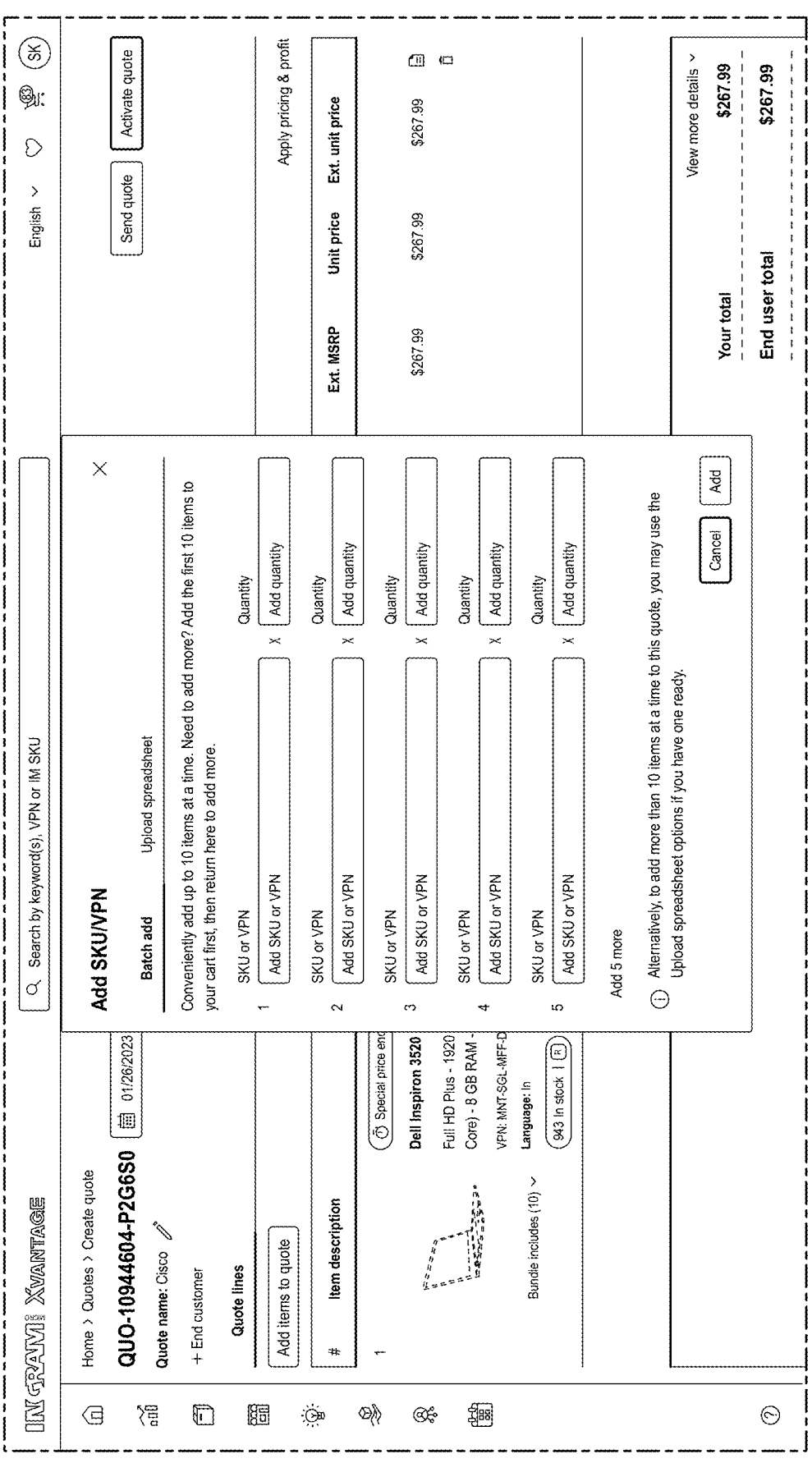
Figure 12K:
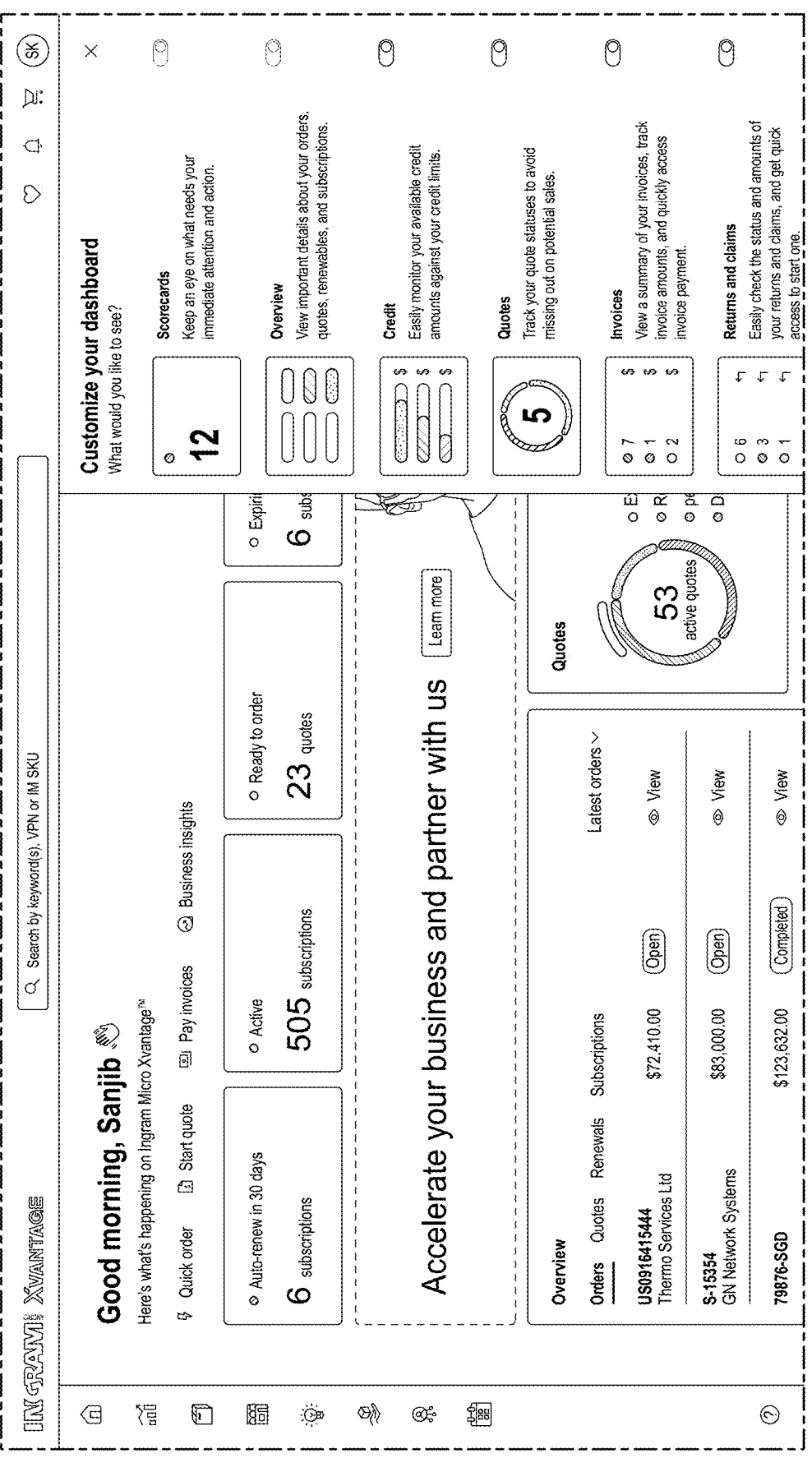
Figure 12L:
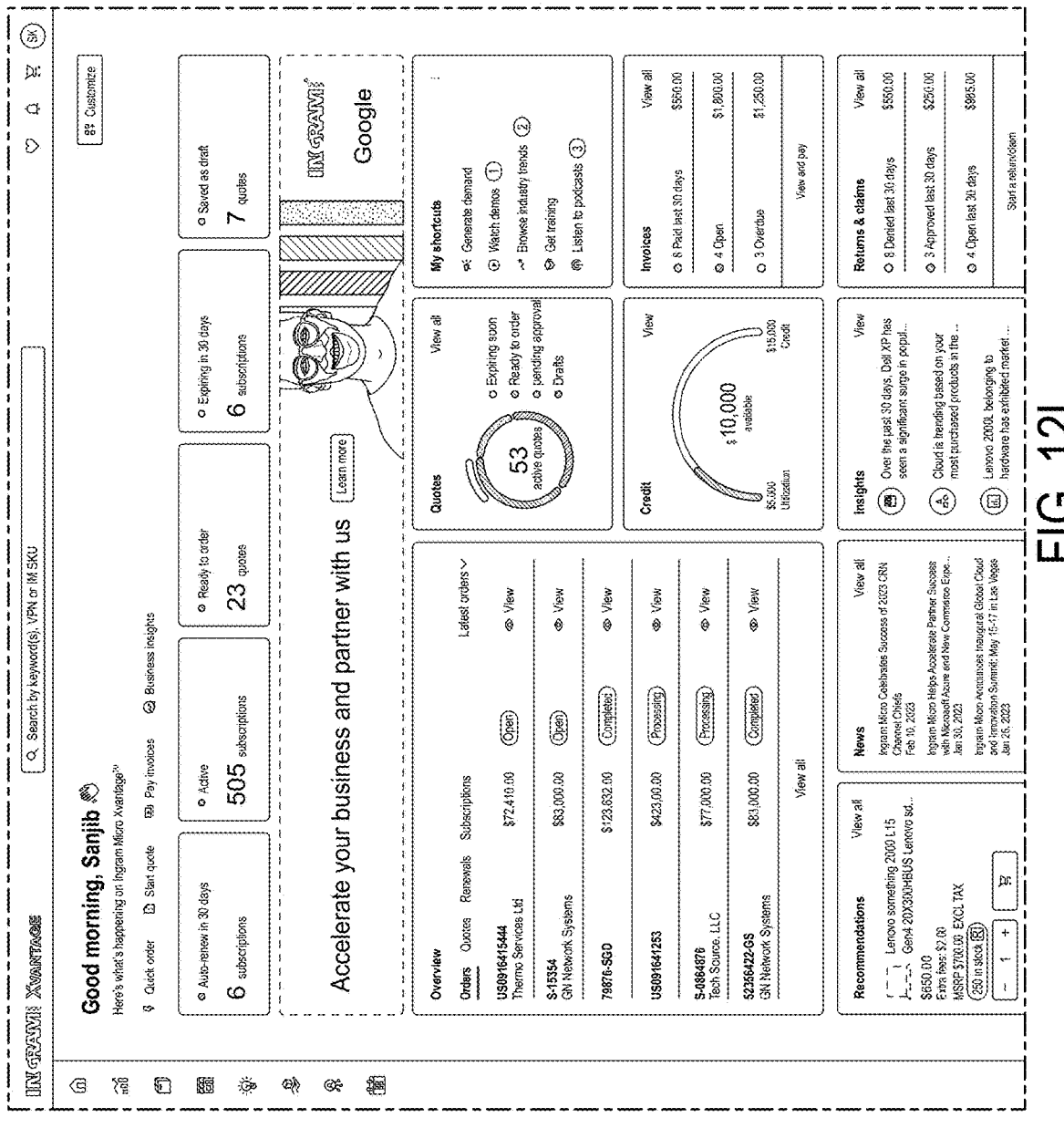
Figure 12M:
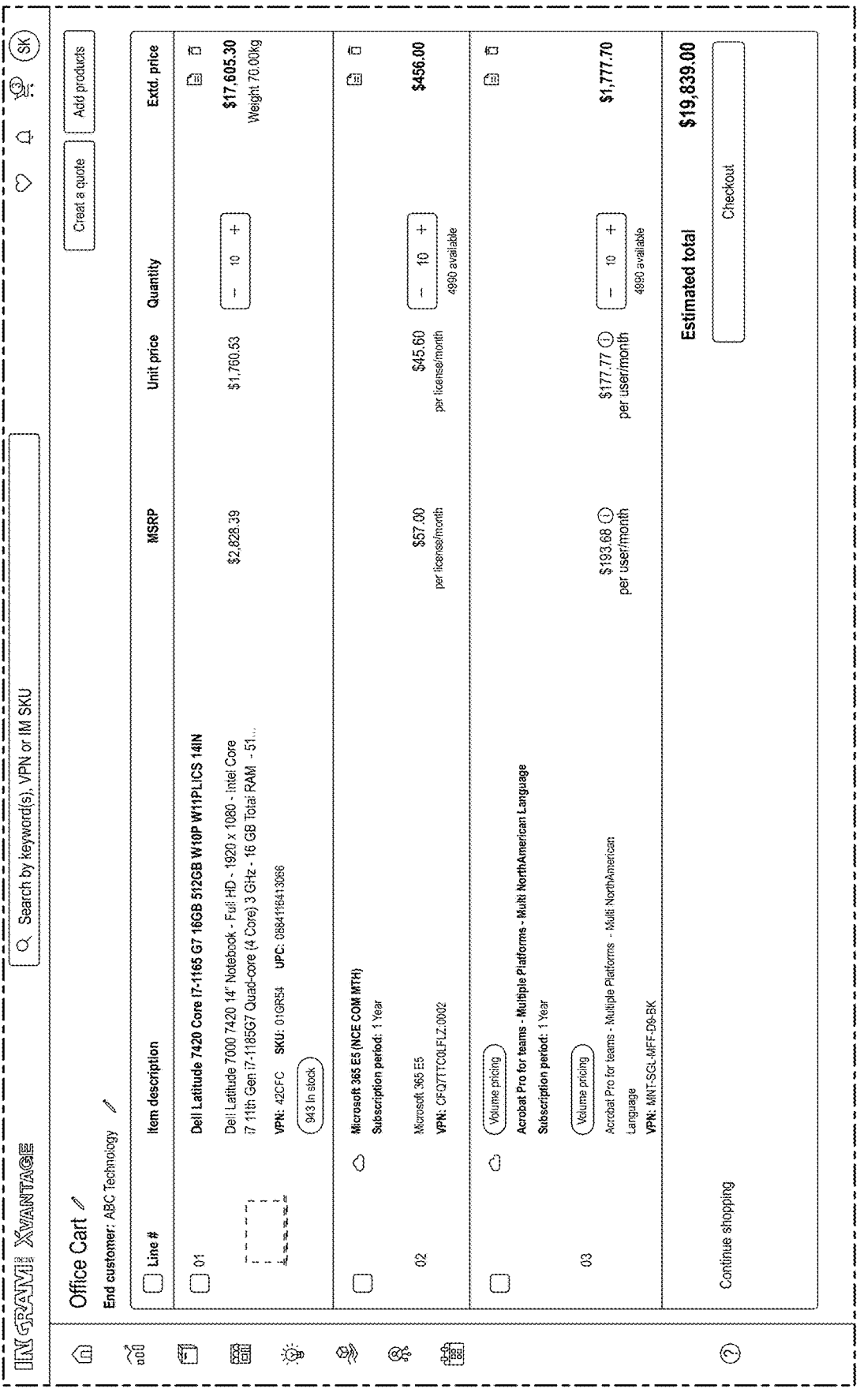
Figure 12N:
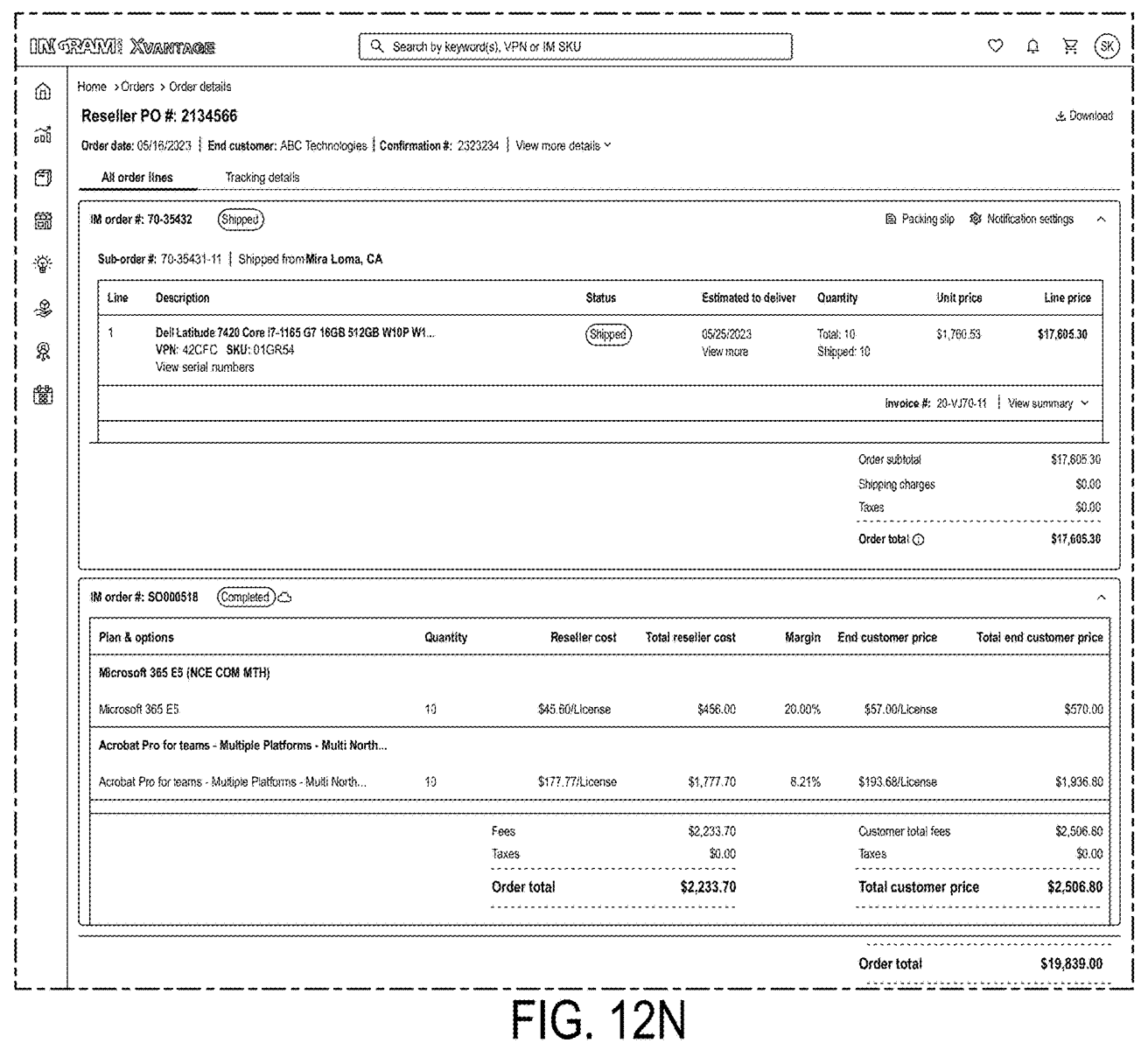
Figure 120:
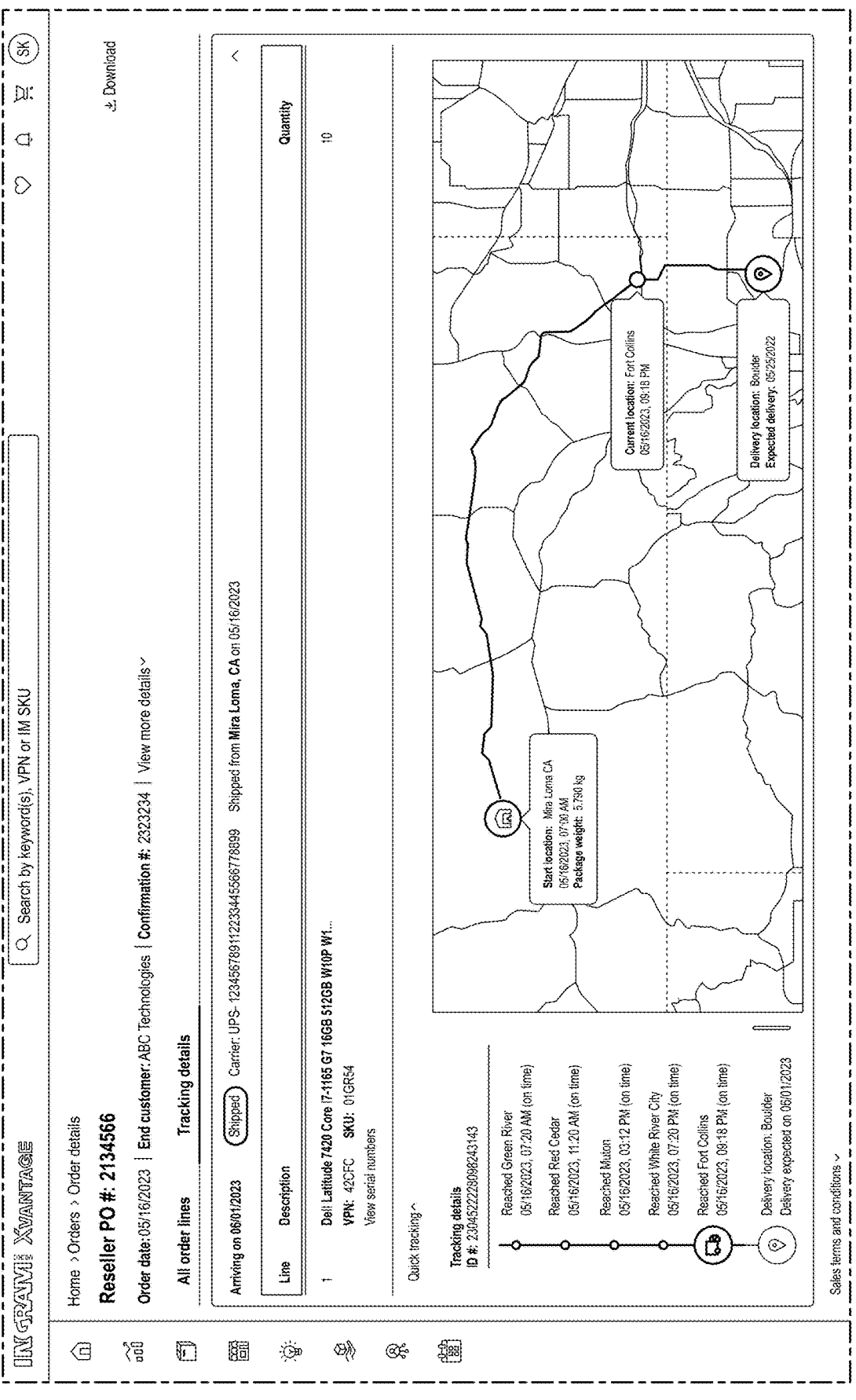
Figure 12Q:
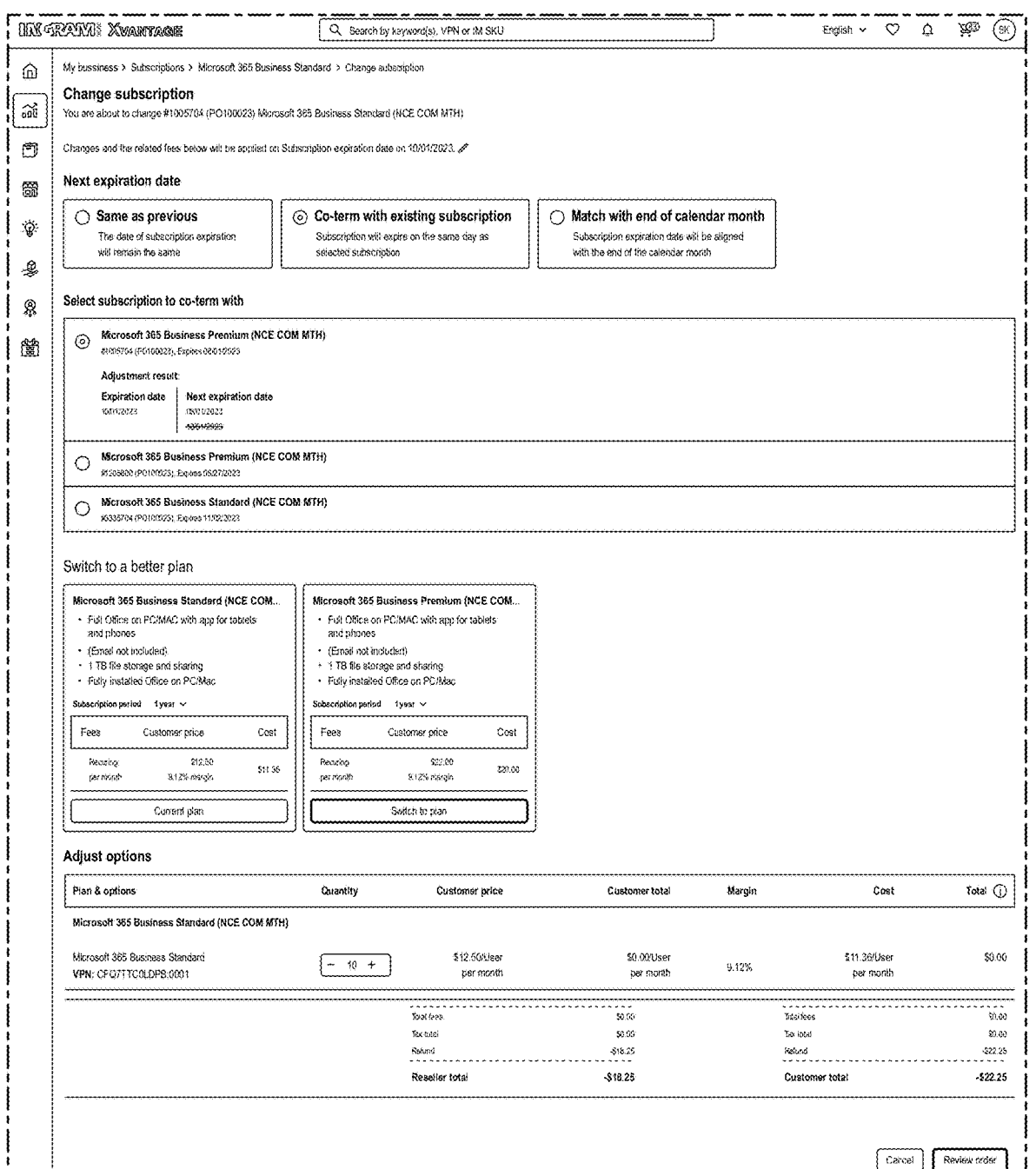

FIGS. 12A to 12Q depict various screens and functionalities of the SPoG UI related to vendor onboarding, partner dashboard, customer carts, order summary, SKU generation, order tracking, shipment tracking, subscription history, and subscription modifications. A detailed description of each figure is provided below:

FIG. 12A depicts a Vendor Onboarding Initiation screen that represents the initial step of the vendor onboarding process. It provides a form or interface where vendors can express their interest in joining the distribution ecosystem. Vendors can enter their basic information, such as company details, contact information, and product catalogs.

FIG. 12B depicts a Vendor Onboarding Guide that displays a step-by-step guide or checklist for vendors to follow during the onboarding process. It outlines the necessary tasks and requirements, ensuring that vendors have a clear understanding of the onboarding process and can progress smoothly.

FIG. 12C depicts a Vendor Onboarding Call Scheduler that facilitates scheduling calls or meetings between vendors and platform associates or representatives responsible for guiding them through the onboarding process. Vendors can select suitable time slots or request a call, ensuring effective communication and assistance throughout the onboarding journey.

FIG. 12D depicts a Vendor Onboarding Task List that presents a comprehensive task list or dashboard that outlines the specific steps and actions required for successful vendor onboarding. It provides an overview of pending tasks, completed tasks, and upcoming deadlines, helping vendors track their progress and ensure timely completion of each onboarding task.

FIG. 12E depicts a Vendor Onboarding Completion Screen that confirms the successful completion of the vendor onboarding process. It may display a congratulatory message or summary of the completed tasks, indicating that the vendor is now officially onboarded into the distribution ecosystem.

FIG. 12F depicts a Partner Dashboard that offers partners or users a centralized view of relevant information and metrics related to their partnership with the distribution ecosystem. It provides an overview of performance indicators, key data points, and actionable insights to facilitate effective collaboration and decision-making.

FIG. 12G depicts a Customer Product Cart that represents the customer's product cart, where they can add items they wish to purchase. It displays a list of selected products, quantities, prices, and other relevant details. Customers can review and modify their cart contents before proceeding to the checkout process.

FIG. 12H depicts a Customer Subscription Cart that allows customers to manage their subscription-based purchases. It displays the selected subscription plans, pricing, and duration. Customers can review and modify their subscription details before finalizing their choices.

FIG. 12I depicts a Customer Order Summary that provides a summary of the customer's order, including details such as the products or subscriptions purchased, quantities, pricing, and any applied discounts or promotions. It allows customers to review their order before confirming the purchase.

FIG. 12J depicts a Vendor SKU Generation screen for generating unique Stock Keeping Unit (SKU) codes for vendor products. It may include fields or options where vendors can specify the product details, attributes, and pricing, and the system automatically generates the corresponding SKU code.

FIGS. 12K and 12L depicts Dashboard Order Summary to display summarized information about orders placed within the distribution ecosystem. They present key order details, such as order number, customer name, product or subscription information, quantity, and order status. The dashboard provides an overview of order activity, enabling users to track and manage orders efficiently.

FIG. 12M depicts a Customer Subscription Cart that permits a customer to add, modify, or remove subscription plans. It can display a list of selected subscriptions, pricing, and renewal dates. Customers can manage their subscriptions and make changes according to their preferences and requirements.

FIG. 12N depicts a Customer Order Tracking screen that enables customers to track the status and progress of their orders within the supply chain. It displays real-time updates on order fulfillment, including processing, packaging, and shipping. Customers can monitor the movement of their orders and anticipate delivery times.

FIG. 12O depicts a Customer Shipment Tracking that provides customers with real-time tracking information about their shipments. It may include details such as the carrier, tracking number, current location, and estimated delivery date. Customers can stay informed about the whereabouts of their shipments.

FIG. 12P depicts a Customer Subscription History, that presents a historical record of the customer's subscription activities. It displays a list of previous subscriptions, including the subscription plan, duration, and status. Customers can review their subscription history, track past payments, and refer to previous subscription details.

FIG. 12Q depicts a Customer Subscription Modifications dialog, that allows customers to modify their existing subscriptions. It offers options to upgrade or downgrade subscription plans, change billing details, or adjust other subscription-related preferences. Customers can manage their subscriptions according to their evolving needs or preferences.

The depicted UI screens are not limiting. In some embodiments the UI screens of FIGS. 12A to 12Q collectively represent the diverse functionalities and features offered by the SPoG UI, providing users with a comprehensive and user-friendly interface for vendor onboarding, partnership management, customer interaction, order management, subscription management, and tracking within the distribution ecosystem.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for enabling resellers to manage their end-user business within their own business environment on a distribution platform, comprising: a server, coupled to a processor, and configured to execute instructions that:

provide a Single Pane of Glass User Interface (SPOG UI), the SPOG UI being defined by a unified dashboard accessible from multiple devices;

ingest, by a Real-Time Data Mesh (RTDM) module, data from multiple sources, the RTDM module comprising:

an ingestion layer configured to continuously aggregate data from vendor platforms, CRM systems, ERP systems, and third-party databases; and a data layer comprising a data mesh and a plurality of purposive datastores, the data layer configured to harmonize the aggregated data into canonical data using a canonical format, the canonical data comprising historical and real-time inventory and sales data;

analyze, by a predictive analytics engine of an Advanced Analytics and Machine Learning (AAML) module, the canonical data to forecast demand based on the historical and real-time inventory and sales data;

generate, by a recommendation engine of the AAML module, personalized product or financial solution recommendations for each reseller based on the forecasted demand and canonical data; and present by the SPOG UI, a reseller-specific interactive dashboard configured to display one or more of real-time inventory, order status, pricing, and customer engagement metrics, wherein the reseller-specific interactive dashboard permits each reseller to view and process transaction data, wherein processing transaction data comprises performing at least one of: creating quotes, placing orders, and managing customer accounts directly through the SPOG UI.

2. The system of claim 1, wherein the RTDM module continuously ingests and standardizes data from multiple sources, ensuring consistency and accuracy across the platform by using data replication mechanisms to capture real-time changes from transactional systems.

3. The system of claim 1, wherein the AAML models predict future demand for products, allowing resellers to adjust inventory levels accordingly by employing machine learning algorithms to analyze historical data and forecast trends.

4. The system of claim 1, wherein the AAML models detect anomalies in transaction data and alert users to potential issues by analyzing transaction patterns and identifying deviations from expected behavior.

5. The system of claim 1, further comprising a Vendor Management Module for facilitating real-time negotiation of pricing and terms directly within the SPOG UI, integrating with vendor systems to provide real-time updates on product availability and pricing, and enabling automated updates based on negotiated terms.

6. The system of claim 1, further comprising a Compliance Management Module for ensuring that all transactions comply with relevant regulations and standards, providing audit trails and automated compliance checks, and generating compliance reports accessible through the SPOG UI.

7. The system of claim 1, wherein the server is further configured to integrate with external systems and applications through APIs and data connectors, allowing resellers to extend the platform's capabilities and integrate it with their existing IT infrastructure, and performing data exchange and synchronization.

8. A computer-implemented method for enabling resellers to manage their end-user business within their own business environment on a distribution platform, comprising:

ingesting, by a Real-Time Data Mesh (RTDM) module, data from multiple sources, the RTDM module comprising:

an ingestion layer configured to continuously aggregate data from vendor platforms, CRM systems, ERP systems, and third-party databases; and a data layer comprising a data mesh and a plurality of purposive datastores, the data layer configured to harmonize the aggregated data into canonical data using a canonical format, the canonical data comprising historical and real-time inventory and sales data;

analyzing, by a predictive analytics engine of an Advanced Analytics and Machine Learning (AAML) module, the canonical data to forecast demand based on the historical and real-time inventory and sales data;

generating, by a recommendation engine of the AAML module, personalized product or financial solution recommendations for each reseller based on the forecasted demand and canonical data; and presenting, by a Single Pane of Glass User Interface (SPOG UI), a reseller-specific interactive dashboard configured to display one or more of real-time inventory, order status, pricing, and customer engagement metrics, wherein the reseller-specific interactive dashboard permits each reseller to view and process transaction data, wherein processing transaction data comprises performing at least one of: creating quotes, placing orders, and managing customer accounts directly through the SPOG UI.

9. The method of claim 8, further comprising predicting future demand for products using the AAML models by employing machine learning algorithms to analyze historical data and forecast trends.

10. The method of claim 8, further comprising detecting anomalies in transaction data and alerting users to potential issues using the AAML models by analyzing transaction patterns and identifying deviations from expected behavior.

11. The method of claim 8, further comprising facilitating real-time negotiation of pricing and terms directly within the SPOG UI using a Vendor Management Module, integrating with vendor systems to provide real-time updates on product availability and pricing, and enabling automated updates based on negotiated terms.

12. The method of claim 8, further comprising ensuring transaction compliance with relevant regulations and standards using a Compliance Management Module, providing audit trails and automated compliance checks, and generating compliance reports accessible through the SPOG UI.

13. The method of claim 8, further comprising integrating the system with external systems through APIs and data connectors, allowing resellers to extend the platform's capabilities and integrate it with their existing IT infrastructure, and performing data exchange and synchronization.

14. The method of claim 8, further comprising presenting interactive visualizations on the SPOG UI for detailed data analysis, allowing users to drill down into specific data points.

15. A non-transitory tangible computer-readable device having instructions stored thereon that, when executed by a computing device, cause the computing device to perform operations comprising:

ingesting, by a Real-Time Data Mesh (RTDM) module, data from multiple sources, the RTDM module comprising:

an ingestion layer configured to continuously aggregate data from vendor platforms, CRM systems, ERP systems, and third-party databases; and a data layer comprising a data mesh and a plurality of purposive datastores, the data layer configured to harmonize the aggregated data into canonical data using a canonical format, the canonical data comprising historical and real-time inventory and sales data;

analyzing, by a predictive analytics engine of an Advanced Analytics and Machine Learning (AAML) module, the canonical data to forecast demand based on the historical and real-time inventory and sales data;

generating, by a recommendation engine of the AAML module, personalized product or financial solution recommendations for each reseller based on the forecasted demand and canonical data; and presenting, by a Single Pane of Glass User Interface (SPOG UI), a reseller-specific interactive dashboard configured to display one or more of real-time inventory, order status, pricing, and customer engagement metrics, wherein the reseller-specific interactive dashboard permits each reseller to view and process transaction data, wherein processing transaction data comprises performing at least one of: creating quotes, placing orders, and managing customer accounts directly through the SPOG UI.

16. The computer-readable device of claim 15, wherein the instructions further cause the computing device to predict future demand for products using the AAML models by employing machine learning algorithms to analyze historical data and forecast trends.

17. The computer-readable device of claim 15, wherein the instructions further cause the computing device to detect anomalies in transaction data and alert users to potential issues using the AAML models by analyzing transaction patterns and identifying deviations from expected behavior.

18. The computer-readable device of claim 15, wherein the instructions further cause the computing device to facilitate real-time negotiation of pricing and terms directly within the SPOG UI using a Vendor Management Module, integrating with vendor systems to provide real-time updates on product availability and pricing, and enabling automated updates based on negotiated terms.

19. The computer-readable device of claim 15, wherein the instructions further cause the computing device to ensure transaction compliance with relevant regulations and standards using a Compliance Management Module, providing audit trails and automated compliance checks, and generating compliance reports accessible through the SPOG UI.

20. The computer-readable device of claim 15, wherein the instructions further cause the computing device to integrate the system with external systems through APIs and data connectors, allowing resellers to extend the platform's capabilities and integrate it with their existing IT infrastructure, and performing data exchange and synchronization.

* * * * *